(12) United States Patent
Kim et al.

(10) Patent No.: US 11,490,184 B2
(45) Date of Patent: Nov. 1, 2022

(54) ELECTRONIC DEVICE AND METHOD FOR OUTPUTTING AUDIO SIGNAL

(71) Applicant: Samsung Electronics Co., Ltd., Suwon-si (KR)

(72) Inventors: Heejin Kim, Suwon-si (KR); Ochae Kwon, Suwon-si (KR); Inje Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 111 days.

(21) Appl. No.: 16/924,640

(22) Filed: Jul. 9, 2020

(65) Prior Publication Data

US 2021/0014591 A1    Jan. 14, 2021

(30) Foreign Application Priority Data

Jul. 10, 2019 (KR) .......................... 10-2019-0083490

(51) Int. Cl.
| | | |
|---|---|---|
| *H04R 1/02* | (2006.01) | |
| *G06F 3/16* | (2006.01) | |
| *G06F 3/14* | (2006.01) | |

(52) U.S. Cl.
CPC .............. *H04R 1/028* (2013.01); *G06F 3/14* (2013.01); *G06F 3/165* (2013.01); *H04R 2430/01* (2013.01); *H04R 2499/15* (2013.01)

(58) Field of Classification Search
USPC .................................. 381/58, 104, 111, 388
See application file for complete search history.

(56) References Cited

U.S. PATENT DOCUMENTS

| | | |
|---|---|---|
| 7,590,772 B2 | 9/2009 | Marriott et al. |
| 8,245,258 B2 | 8/2012 | Park et al. |
| | (Continued) | |

FOREIGN PATENT DOCUMENTS

| | | | | |
|---|---|---|---|---|
| CN | 102033776 | * | 4/2011 | ............... G06F 3/16 |
| CN | 102033776 A | | 4/2011 | |

(Continued)

OTHER PUBLICATIONS

International Search Report dated Oct. 27, 2020, issued in International Patent Application No. PCT/KR2020/009134.

*Primary Examiner* — Yosef K Laekemariam
(74) *Attorney, Agent, or Firm* — Jefferson IP Law, LLP

(57) ABSTRACT

An electronic device is provided. The electronic device includes a display, at least one speaker, at least one memory configured to store instructions, and at least one processor operatively connected to the display, the at least one speaker, and the at least one memory, wherein, when executing the instructions, the at least one processor is configured to display a plurality of screens based on applications which are distinct from one another, within sub regions which are distinct from one another within a display region of the display, in a state where the plurality of screens are displayed, output a first audio signal provided from a first application from among the applications at a first volume through the at least one speaker, while outputting the first audio signal, identify a user input for outputting a second audio signal related to a second application within a screen provided from the second application from among the plurality of screens, in response to the user input being identified, reduce the first volume of the first audio signal being outputted through the at least one speaker, and output the second audio signal provided from the second applica- (Continued)

tion at a second volume which is higher than the reduced first volume through the at least one speaker.

18 Claims, 26 Drawing Sheets

(56) References Cited

U.S. PATENT DOCUMENTS

| | | |
|---|---|---|
| 9,182,901 B2 | 11/2015 | Bang |
| 2009/0036108 A1 | 2/2009 | Cho |
| 2014/0179380 A1 | 6/2014 | Roh |
| 2014/0340334 A1 | 11/2014 | Cho |
| 2016/0098246 A1 | 4/2016 | Lee |
| 2017/0192740 A1 | 7/2017 | Armstrong et al. |

FOREIGN PATENT DOCUMENTS

| | | | | |
|---|---|---|---|---|
| JP | H06110642 | * | 4/1994 | ............ G06F 3/01 |
| JP | 3426267 B2 | | 7/2003 | |
| KR | 10-2014-0081445 A | | 7/2014 | |
| KR | 10-1504681 B1 | | 3/2015 | |
| KR | 10-2016-0032897 A | | 3/2016 | |

\* cited by examiner

ELECTRONIC DEVICE AND METHOD FOR OUTPUTTING AUDIO SIGNAL

CROSS-REFERENCE TO RELATED APPLICATION(S)

This application is based on and claims priority under 35 U.S.C. § 119(a) of a Korean patent application number 10-2019-0083490, filed on Jul. 10, 2019, in the Korean Intellectual Property Office, the disclosure of which is incorporated by reference herein in its entirety.

BACKGROUND

1. Field

The disclosure relates to an electronic device for outputting an audio signal and an operating method thereof.

2. Description of Related Art

With the recent development of digital technology, various types of electronic devices such as mobile communication terminals, smartphones, tablet personal computers (PCs), electronic schedulers, personal digital assistants (PDAs), wearable devices, and the like are widely used. Electronic devices for easily accessing multimedia contents are developing. Such an electronic device may provide multimedia content by using a display and/or at least one speaker of the electronic device.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a solution for outputting a plurality of multimedia contents, concurrently, through a plurality of screens, when the plurality of screens provided from a plurality of applications are displayed on different partial portions of a display, on the basis of multi-tasking like a multi-window.

Additional aspects will be set forth in part in the description which follows and, in part, will be apparent from the description, or may be learned by practice of the presented embodiments.

In accordance with an aspect of the disclosure, an electronic device is provided. The electronic device includes a display, at least one speaker, at least one memory configured to store instructions, and at least one processor operatively connected to the display, the at least one speaker, and the at least one memory, and, when executing the instructions, the at least one processor may be configured to display a plurality of screens based on applications which are distinct from one another, within sub regions which are distinct from one another within a display region of the display, in a state where the plurality of screens are displayed, output a first audio signal provided from a first application from among the applications at a first volume through the at least one speaker, while outputting the first audio signal, identify a user input for outputting a second audio signal related to a second application within a screen provided from the second application from among the plurality of screens, in response to the user input being identified, reduce the first volume of the first audio signal being outputted through the at least one speaker, and output the second audio signal provided from the second application at a second volume which is higher than the reduced first volume through the at least one speaker.

In accordance with another aspect of the disclosure, an electronic device is provided. The electronic device includes a display, at least one speaker, at least one memory configured to store instructions, and at least one processor operatively connected to the display, the at least one speaker, and the at least one memory, and, when executing the instructions, the at least one processor is configured to identify a plurality of audio signals provided from a plurality of applications which are being executed in the processor, the plurality of applications displaying a plurality of screens within sub regions of the display which are distinct from one another, in response to the plurality of audio signals being identified, identify a first screen corresponding to a main window from among the plurality of screens, and a first audio signal corresponding to the first screen from among the plurality of audio signals, in response to the first audio signal being identified, obtain a first volume corresponding to the first audio signal, and at least one second volume corresponding to at least one second audio signal distinct from the first audio signal from among the plurality of audio signals, combine the plurality of audio signals including the first audio signal and the at least one second audio signal, on the basis of the first volume and the at least one second volume, and output the combined audio signals through the at least one speaker.

In accordance with another aspect of the disclosure, a method of an electronic device is provided. The method includes displaying a plurality of screens based on applications which are distinct from one another, within sub regions which are distinct from one another within a display region of a display of the electronic device, in a state where the plurality of screens are displayed, outputting a first audio signal provided from a first application from among the applications at a first volume through at least one speaker of the electronic device, while outputting the first audio signal, identifying a user input for outputting a second audio signal related to a second application within a screen provided from the second application from among the plurality of screens, in response to the user input being identified, reducing the first volume of the first audio signal being outputted through the at least one speaker, and outputting the second audio signal provided from the second application at a second volume which is higher than the reduced first volume through the at least one speaker.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
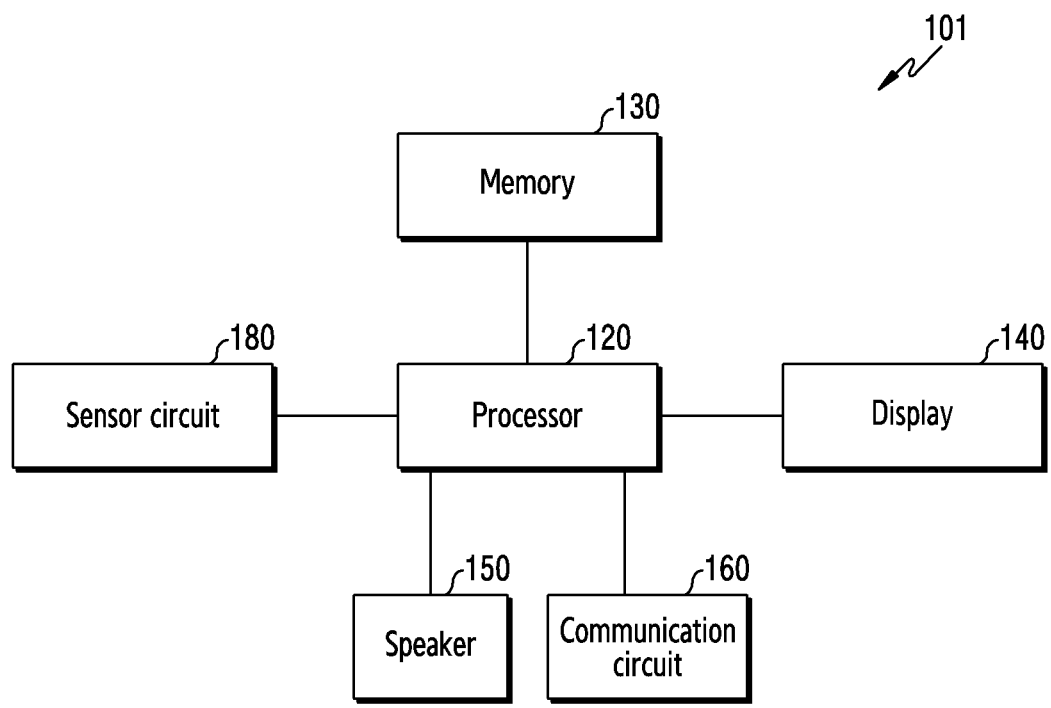
FIG. 1A is a view illustrating an example of a functional configuration of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure disclosed herein, the expressions "have," "may have," "include" and "comprise," or "may include" and "may comprise" used herein indicate existence of corresponding features (for example, elements such as numeric values, functions, operations, or components) and do not preclude the presence of additional features.

In the disclosure disclosed herein, the expressions "A or B," "at least one of A or/and B," or "one or more of A or/and B," and the like may include all possible combinations of the items enumerated together. For example, "A or B," "at least one of A and B," or "at least one of A or B" may refer to all of the case (1) where at least one A is included, the case (2) where at least one B is included, or the case (3) where both of at least one A and at least one B are included.

As used herein, such terms as "1st" and "2nd," or "first" and "second" may be used to simply distinguish a corresponding component from another, and does not limit the components in other aspect (e.g., importance and/or order). For example, "a first user device" and "a second user device" indicate different user devices regardless of the order or priority. For example, without departing from the scope of the disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), the element can be directly coupled with/to or connected to another element or coupled with/to or connected to another element via an intervening element (for example, a third element). In contrast, when an element (for example, a first element) is referred to as being "directly coupled with/to" or "directly connected to" another element (for example, a second element), it should be understood that there is no intervening element (for example, a third element) between the element and another element.

According to the situation, the term "configured to (or set to)" used in the disclosure may be interchangeably used with the terms "suitable for," "having the capacity to," "designed to," "adapted to," "made to," or "capable of". The term "configured to (or set to)" must not mean only "specifically designed to" in hardware. Instead, the expression "a device configured to" may mean that the device is "capable of" operating together with another device or other components. For example, "a processor configured (set) to perform A, B, and C" may refer, for example, and without limitation, to a dedicated processor (for example, an embedded processor) for performing a corresponding operation, or a generic-purpose processor (for example, a central processing unit (CPU) or an application processor (AP)), and the like, for performing corresponding operations by executing one or more software programs stored in a memory device.

Terms used in the disclosure are used to describe specified embodiments and are not intended to limit the scope of other embodiments. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal way, unless expressly so defined herein in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistant (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable devices may include at least one of accessories (for example, watches, rings, bracelets, ankle bracelets, necklaces, glasses, contact lenses, head-mounted-devices (HMDs), and the like), fabric-mounted or clothing-mounted devices (for example, electronic apparels), body-mounted devices (for example, skin pads, tattoos, and the like), or bio-implantable circuits.

According to some embodiments, the electronic devices may be home appliances. The home appliances include at least one of, for example, televisions (TVs), digital video disk (DVD) players, audios, refrigerators, air conditioners, cleaners, ovens, microwave ovens, washing machines, air cleaners, set-top boxes, home automation control panels, security control panels, TV boxes (for example, Samsung HomeSync™ Apple TV™, or Google TV™), game consoles (for example, Xbox™ and PlayStation™), electronic dictionaries, electronic keys, camcorders, or electronic picture frames.

According to another embodiment, the electronic devices may include at least one of medical devices (for example, various portable medical measurement devices (for example, a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, global navigation satellite systems (GNSS), event data recorders (EDRs), flight data recorders (FDRs), vehicle infotainment devices, electronic equipment for vessels (for example, navigation systems and gyrocompasses), avionics, security devices, head units for vehicles, industrial or home robots, automatic teller's machines (ATMs) of financial institutions, points of sales (POSs) of stores, or Internet of things (for example, light bulbs, various sensors, electricity or gas meters, sprinkler devices, fire alarms, thermostats, street lamps, toasters, exercise equipment, hot water tanks, heaters, boilers, and the like).

According to an embodiment, the electronic devices may include at least one of furniture, a part of buildings/structures, electronic boards, electronic signature receiving devices, projectors, or various measuring instruments (for example, water meters, electricity meters, gas meters, or wave meters). In various embodiments, the electronic devices may be one or a combination of two or more devices of the above-mentioned devices. According to a certain embodiment, the electronic device may be a flexible electronic device or a foldable electronic device. Also, the electronic devices according to various embodiments of the disclosure are not limited to the above-mentioned devices, and may include new electronic devices according to technology development.

In the disclosure, the term "user" may refer to a person who uses the electronic device or a device that uses the electronic device (for example, an artificial intelligence electronic device).

Hereinafter, various embodiments will be described in detail with reference to the accompanying drawings. However, dimensions of elements in the drawings may be exaggerated or reduced for convenience of explanation. For example, sizes and thicknesses of respective elements shown in the drawings are arbitrarily illustrated for convenience of explanation, and thus the disclosure should not be limited to the illustrations of the drawings.

Figure 1B:
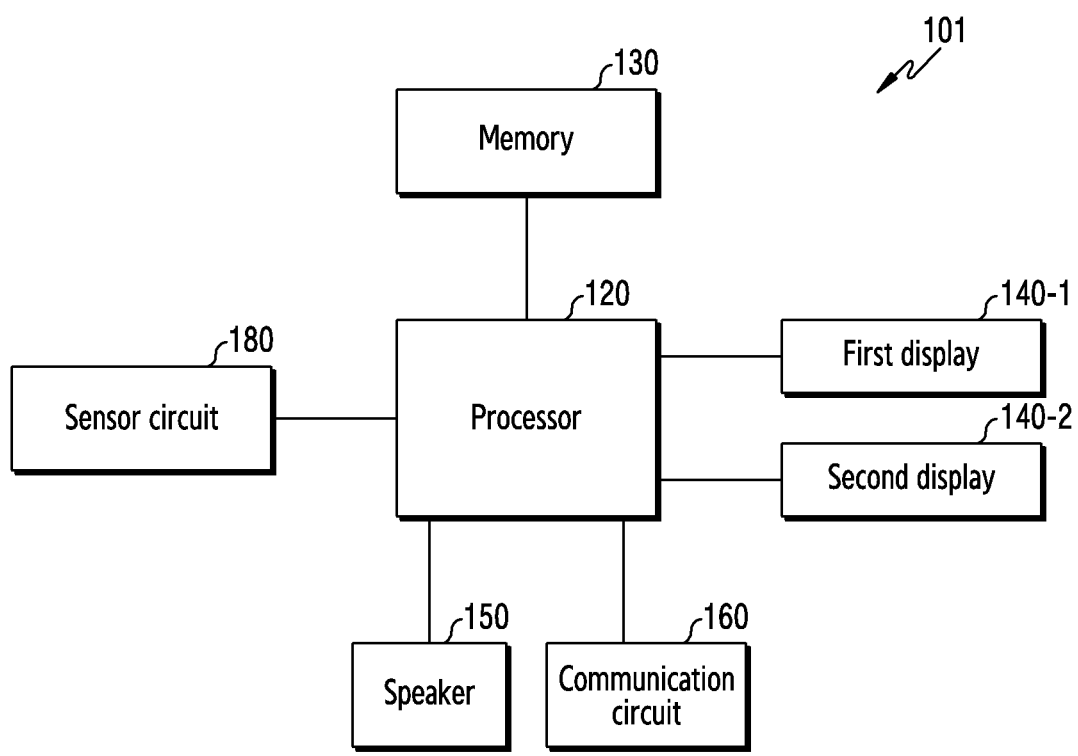
FIG. 1B is a view illustrating an example of a functional configuration of an electronic device according to an embodiment of the disclosure.

FIGS. 1A and 1B are views illustrating an example of a functional configuration of an electronic device according to various embodiments of the disclosure.

Referring to FIG. 1A, an electronic device 101 may include a processor 120, a memory 130, a display 140, a speaker 150, a communication circuit 160, and a sensor circuit 180.

The processor 120 may control overall operations of the electronic device 101. For example, the processor 120 may execute applications for providing an advertisement, Internet, a game, a video, etc. In various embodiments, the processor 120 may include a single processor core or may include a plurality of processor cores. For example, the processor 120 may include a multi-core such as a dual-core, a quad-core, a hexa-core, and the like. According to embodiments, the processor 120 may further include a cache memory positioned inside or outside the processor 120. The processor 120 may receive commands of other elements of the electronic device 101, may interpret a received command, and may perform computation or process data according to the interpreted command.

The processor 120 may process data or a signal which is generated or occurs in an application. For example, the processor 120 may request an instruction, data, or a signal from the memory 130 to execute or control an application. The processor 120 may record (or store) or refine an instruction, data, or a signal on the memory 130 to execute or control an application.

The processor 120 may interpret and process a message, data, an instruction, or a signal received from the memory 130, the display 140, the speaker 150, or the sensor circuit 180. The processor 120 may generate a new message, data, instruction, or signal on the basis of the received message, data, instruction, or signal. The processor 120 may provide the processed or generated message, data, instruction, or signal to the memory 130, the display 140, the speaker 150, or the sensor circuit 180.

An entirety or a portion of the processor 120 may be electrically or operably (or operatively) coupled with or connected to other elements (for example, the memory 130, the display 140, the speaker 150, or the sensor circuit 180) in the electronic device 101. The electronic device 101 according to an embodiment may further include a communication bus (not shown) to electrically connect the processor 120, the memory 130, the display 140, the speaker 150, and the sensor circuit 180.

According to various embodiments, the processor 120 may be configured with one or more processors. For example, the processor 120 may include one or more of an application processor (AP) for controlling an upper layer program such as an application program, a graphic processing unit (GPU) for controlling the display 140, or a communication processor (CP) for controlling a communication function.

The memory 130 may store an instruction, a control instruction code, control data, or user data for controlling the electronic device 101. For example, the memory 130 may include an application, an operating system (OS), middleware, a device driver.

The memory 130 may store an instruction related to an application and an instruction related to the OS. The OS is system software executed by the processor 120. The processor 120 may manage hardware components included in the electronic device 101 by executing the OS. The OS may provide an application programming interface (API) to applications which are the other software except for the system software.

One or more applications which are a set of a plurality of instructions may be installed in the memory 130. The application being installed in the memory 130 may mean that the application is stored in a format to be executed by the processor 120 connected to the memory 130. In a state where a plurality of applications are installed in the memory 130, the processor 120 may execute at least two of the plurality of applications concurrently. For example, the processor 120 may execute at least two applications concurrently on the basis of multi-tasking.

According to embodiments, the memory 130 may be configured with one or more memories. For example, the memory 130 may include one or more of a volatile memory or a non-volatile memory. The volatile memory may include a dynamic random access memory (DRAM), a static RAM (SRAM), a synchronous DRAM (SDRAM), a phase-change RAM (PRAM), a magnetic RAM (MRAM), a resistive RAM (RRAM), a ferroelectric RAM (ReRAM), and the like. The non-volatile memory may include a read only memory (ROM), a programmable ROM (PROM), an electrically programmable ROM (EPROM), an electrically erasable programmable ROM (EEPROM), a flash memory, and the like.

The memory 130 may include a non-volatile medium such as a hard disk drive (HDD), a solid state disk (SSD), an embedded multi media card (eMMC), a universal flash storage (UFS).

The memory 130 may include a graphic random access memory (GRAM). The processor 120 according to an embodiment may store frame data related to a screen to be displayed on the display 140 within the GRAM.

The speaker 150 may output an audio signal received from the processor 120 in a form of a sound wave. A magnitude of a sound wave outputted from the speaker 150 may be adjusted by a designated parameter such as a volume, for example. The volume may refer to a parameter for restricting a magnitude of a sound wave outputted from the electronic device and/or another electronic device (for example, a Bluetooth speaker) receiving an audio signal from the electronic device. The volume may be adjusted by a user input of pressing a designated button (for example, a volume-up button and/or a volume-down button) of the electronic device, and/or a user input which is received on the basis of a UI provided from the OS such as a control panel.

Although the single speaker 150 is illustrated in FIGS. 1A and 1B, the number of speakers included in the electronic device 101 may vary according to an embodiment. When the electronic device 101 includes a plurality of speakers, sound waves outputted from the plurality of speakers may be different from one another. For example, the processor 120 of the electronic device 101 may transmit at least one of a plurality of audio signals corresponding to a plurality of different channels to each of the plurality of speakers. The plurality of channels may refer to, for example, a stereo channel including a left channel and a right channel, and/or a plurality of channels which are based on the stereophonic sound standard such as Dolby 5.1.

The communication circuit 160 may connect the electronic device 101 to at least one of another electronic device (for example, an electronic device for outputting an audio signal, such as a Bluetooth speaker) or a network, on the basis of a wireless network such as Bluetooth, Wireless Fidelity (WiFi), near field communication (NFC), long term evolution (LTE), and a wired network such as local area network (LAN), Ethernet. The communication circuit 160 may include at least one of a communication modem supporting the wireless network or wired network, a communication processor (CP), and a communication interface.

The display 140 may output a content, data, or a signal. In various embodiments, the display 140 may display frame data which is processed by the processor 120. The display 140 may display the frame data on the basis of a plurality of pixels. The display 140 may include at least one circuit (for example, a display driver circuit (DDIC)) to control colors and/or brightness of the plurality of pixels. At least one DDIC included in the display 140 may control the colors and/or brightness of the plurality of pixels by scanning the frame data of the GRAM included in the memory 130, and may display the frame data.

According to various embodiments, the display 140 may be configured with an integrated touch screen by being coupled with a plurality of touch sensors (not shown), which may receive a touch input, and the like. When the display 140 is configured with the touch screen, the plurality of touch sensors may be disposed over the display 140 or under the display 140.

According to various embodiments, the display 140 may be configured with a display which has at least a portion of the display 140 foldable (for example, a foldable display). When the display 140 is configured with the foldable display, the electronic device 101 may have a structure that can have the display 140 folded. A structure and/or an operation of the electronic device 101 which can have the display 140 folded will be described in detail with reference to FIGS. 2C, 12, 13, and 14.

According to various embodiments, the number of the displays 140 included in the electronic device 101 may vary. Referring to FIG. 1B, the electronic device 101 according to an embodiment may include a first display 140-1 and a second display 140-2. At least one of the first display 140-1 and the second display 140-2 may be configured with a flexible display which can have at least a portion folded. DDICs included in the first display 140-1 and the second display 140-2 may share the GRAM included in the memory 140. In the electronic device 101 including the first display 140-1 and the second display 140-2, the processor 120 may selectively activate and/or selectively control any one of the first display 140-1 and the second display 140-2.

In an embodiment, the processor 120 may selectively activate and/or selectively control any one of the first display 140-1 and the second display 140-2, on the basis of a shape of the electronic device 101 and/or a shape of the first display 140-1 and/or the second display 130-2 corresponding to the flexible display. An operation of controlling the electronic device 101 by the processor 120, which is operatively connected to the first display 140-1 and the second display 140-2, on the basis of the shape of the electronic device 101, will be described in detail with reference to FIGS. 2C, 12, 13, and 14.

In a state where a plurality of applications are executed concurrently, the electronic device 101 according to various embodiments may display a plurality of screens corresponding to the plurality of applications, respectively, within the display (for example, the display 140 of FIG. 1A, the first display 140-1 and/or the second display 140-2 of FIG. 1B) concurrently. For example, the plurality of screens may be displayed within a plurality of sub-regions distinct from one another within the display of the electronic device 101. The electronic device 101 may identify audio signals corresponding to the plurality of applications, respectively, on the basis of the plurality of applications which are being executed. In response to the audio signals being identified, the electronic device 101 may output the audio signals through the speaker 150 by mixing the audio signals. A ratio for mixing the audio signals may be changed on the basis of a user input of adjusting an order in which the plurality of sub-regions are displayed, and/the ratio.

Figure 2A:
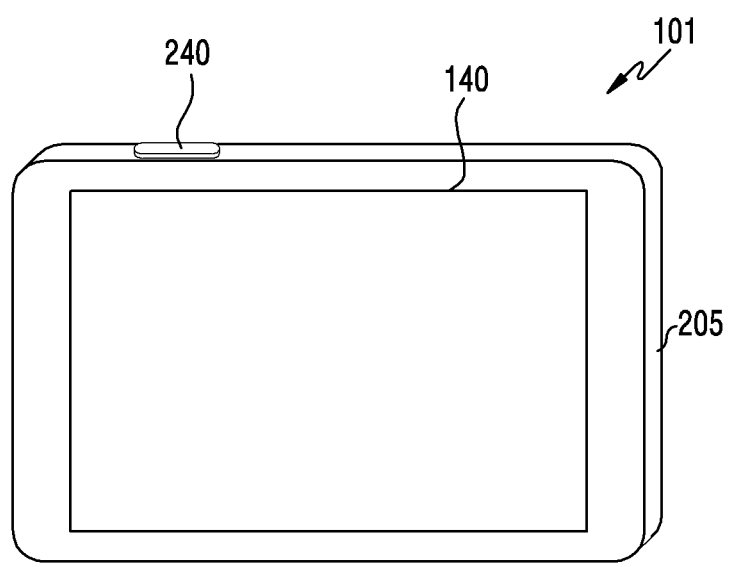
FIG. 2A is a view illustrating an example of an appearance of an electronic device according to an embodiment of the disclosure.
Figure 2B:
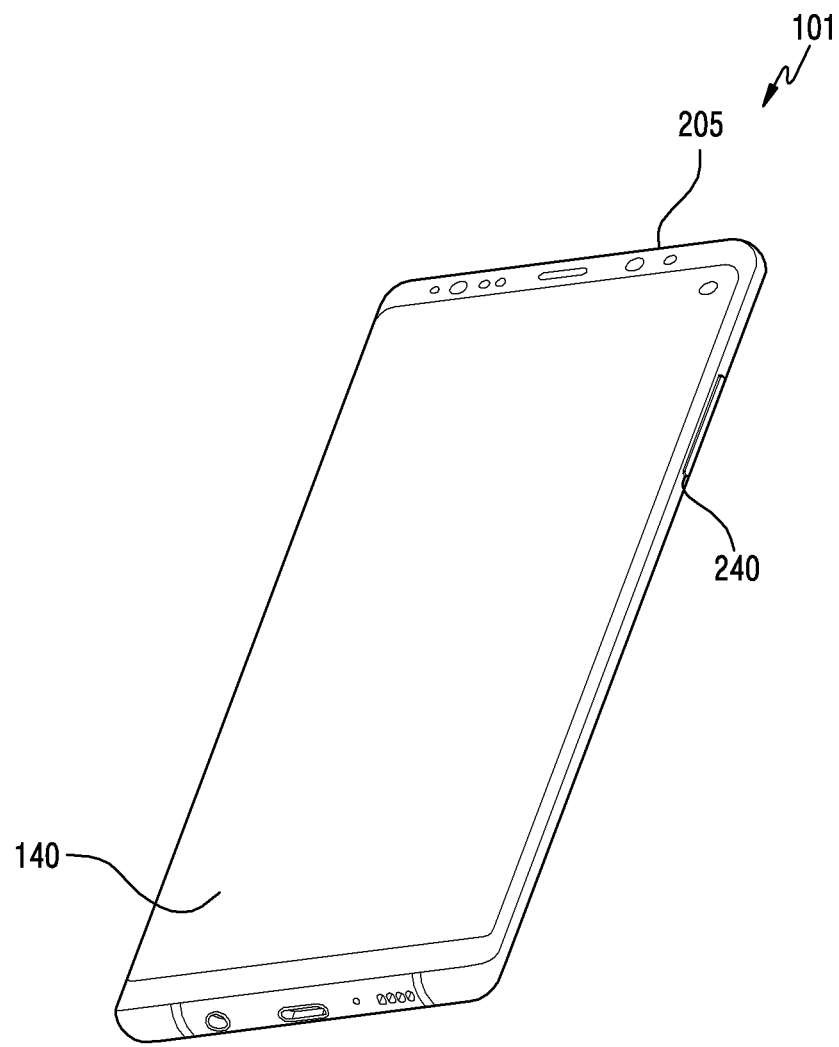
FIG. 2B is a view illustrating an example of an appearance of an electronic device according to an embodiment of the disclosure.
Figure 2C:
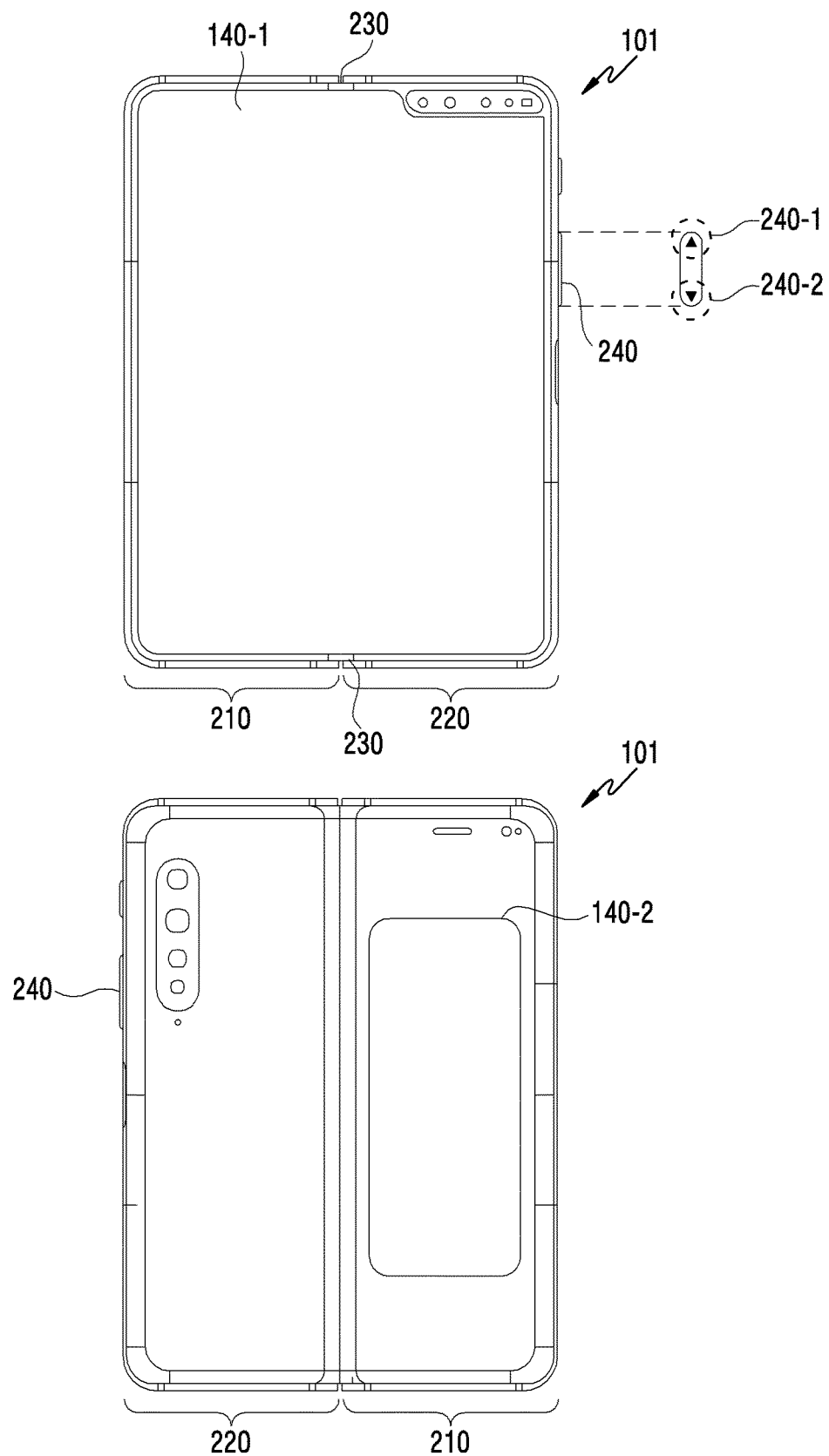
FIG. 2C is a view illustrating an example of an appearance of an electronic device according to an embodiment of the disclosure.

FIGS. 2A, 2B, and 2C are views illustrating an example of an appearance of an electronic device according to various embodiments of the disclosure.

The electronic device 101 of FIGS. 2A, 2B, and 2C may correspond to the electronic device 101 of FIGS. 1A and 1B. The appearance of the electronic device 101 may be related to at least one housing having various shapes. Referring to FIGS. 2A, 2B, and 2C, the electronic device 101 may include a housing 205. As shown in FIG. 2A, the housing 205 of the electronic device 101 may have a form factor which is based on at least one of a smart pad, a tablet PC. As shown in FIG. 2B, the housing 205 of the electronic device 101 may have a form factor which is based on a PDA, a smartphone and/or a mobile terminal. For example, the processor 120, the memory 130, the speaker 150, and/or the sensor circuit 180 of FIG. 1A may be disposed inside the housing 205. Referring to FIG. 2A, at least a portion of the display 140 may be exposed through at least one surface (for example, a front surface) of the housing 205.

In an embodiment, when the electronic device 101 includes a plurality of speakers (for example, the speaker 150 of FIGS. 1A and 1B), at least a portion of each of the plurality of speakers may be exposed through a different portion of the housing 205. For example, when the electronic device 101 includes two speakers based on a stereo channel, at least a portion of each of the two speakers may be exposed through each of a left surface and a right surface of the housing 205.

Referring to FIG. 2C, the electronic device 101 may include at least one of a first housing 210, a second housing 220, a folding portion 230, a first display 140-1, or a second display 140-2. As shown in FIG. 2C, a housing 250 of the electronic device 101 may have a form factor which is based on a foldable smartphone, a foldable tablet PC, and/or a foldable PC. In various embodiments, the first housing 210 may include a first surface and a second surface which is faced away from the first surface. In various embodiments, the second housing 220 may include a third surface and a fourth surface which is faced away from the third surface.

In various embodiments, the first housing 210 and the second housing 220 may be connected to each other by the folding portion 230. For example, the folding portion 230 may be configured to pivotably or rotatably connect between the first housing 210 and the second housing 220 by being coupled to a side surface of the first housing 210 and a side surface of the second housing 220 that faces the side surface of the first housing 210.

The first display 140-1 may be disposed on the first housing 210 and the second housing 220 across the folding portion 230. In various embodiments, the first display 140-1 may be installed to be supported by the first housing 210 and the second housing 220. In various embodiments, the first display 140-1 may be disposed on the first surface and the third surface across the folding portion 230. In various embodiments, the first display 140-1 may include a first area corresponding to the first surface and a second area corresponding to the third surface.

The electronic device 101 according to various embodiments may be folded with reference to the folding portion 230. For example, the folding portion 230 may be disposed between the first housing 210 and the second housing 220 of the electronic device 101 to make the electronic device 101 be crooked, bent, or folded. In various embodiments, the first housing 210 may be connected with the second housing 220 through the folding portion 230, and may be rotated about the folding portion 230. In various embodiments, the second housing 220 may be connected with the first housing 210 through the folding portion 230, and may be rotated about the folding portion 230. In various embodiments, the first housing 210 and the second housing 220 may be rotated about the folding portion 230, thereby being folded to face each other. In various embodiments, the first housing 210 and the second housing 220 may be substantially overlaid or superimposed one on the other. In an embodiment, the first display 140-1 may be configured with a flexible display, and may be crooked, bent, and/or folded as the electronic device 101 is folded.

In various embodiments, the electronic device 101 may provide a first state in which the first housing 210 and the second housing 220 are folded out by the folding portion 230. In various embodiments, in the first state, the first surface may be substantially flushed with the third surface. In various embodiments, the electronic device 101 may provide the first state in which the first housing 210 and the second housing 220 are substantially flushed with each other, by unfolding the folding portion 230. In various embodiments, the first state may refer to a state in which all of the first area corresponding to the first surface in the entire area of the first display 140-1, the second area corresponding to the third surface in the entire area of the first display 140-1, and a third area surrounding the folding portion 230 in the entire area of the first display 140-1 are provided within a user's field of view or angle of view facing the front surface of the electronic device 101. In various embodiments, the first state may be referred to as an outspread state or outspreading state or an unfolding state.

In various embodiments, the electronic device 101 may provide a second state in which the first housing 210 and the second housing 220 are folded in by the folding portion. In various embodiments, the first surface in the second state may be superimposed on the third surface (for example, in-folding). In various embodiments, the electronic device 101 may provide the second state in which the folding portion 230 is folded to make the front surface (for example, the first surface) of the first housing 210 and the front surface (for example, the third surface) of the second housing 220 face each other, and the first housing 210 and the second housing 220 are disposed in parallel with each other. In various embodiments, the second state may refer to a state in which the first display 140-1 is occluded within the user's field of view facing the front surface of the electronic device 101. In various embodiments, the second state may be referred to as a folded state or a folding state.

In an embodiment, the second state may refer to a state in which the rear surface (for example, the second surface) of the first housing 210 and the rear surface (for example, the fourth surface) of the second housing 220 are folded to face each other (for example, out-folding). In an embodiment, the second state may refer to a state in which at least a portion of the first display 140-1 (for example, a portion of the first display 140-1 corresponding to the first surface of the first housing 210) and the other portion of the first display 140-1 (for example, a portion of the first display 140-1 corresponding to the third surface of the second housing 220) are not provided concurrently within the user's field of view facing the front surface of the electronic device 101, or the other portion is occluded by the at least portion.

In various embodiments, the first display 140-1 may be disposed on the front surface of the second housing 220 (for example, the third surface) across the first housing 210 and the folding portion 230. In various embodiments, the electronic device 101 may be folded with reference to the folding portion 230. Since the first display 140-1 is disposed from the first housing 210 to the second housing 220 across the folding portion 230, the first display 140-1 may be bent by a folding operation of the electronic device 101. For example, unlike the first area disposed on the first surface of the first housing 210 and the second area disposed on the third surface of the second housing 220 on the first display 140-1, the third area disposed on the folding portion 230 may be bent by the folding operation of the electronic device 101. In various embodiments, the third area may be curved and bent to prevent a damage of the first display 140-1.

In various embodiments, one or more of the first area or the second area may further include a curved region like the third area. For example, a distal end disposed far away from the center of the first housing 210 may include a rounded region. In another example, a distal end disposed far away from the center of the second housing 220 may include a rounded region. In various embodiments, since a bent display region included within the first area and a bent display region included within the second area are disposed on the distal ends of the first housing 210 and the second housing 220, respectively, the bent display regions may be referred to as edge displays.

A sensor circuit (for example, the sensor circuit 180 of FIGS. 1A and 1B) may include at least one of a first sensor for obtaining information on a posture of the electronic device 101, or a second sensor for obtaining information on an angle between the first housing 210 and the second housing 220 of the electronic device 101.

In various embodiments, the first sensor may include one or more of a sensor for obtaining data regarding a change in a linear movement of the electronic device 101, a sensor for obtaining data regarding a change in a rotational movement of the electronic device 101, or a sensor for obtaining data regarding a geographical position of the electronic device 101. For example, the first sensor may include one or more of a geomagnetic sensor, a gyro sensor, or an infrared sensor.

In various embodiments, the second sensor may obtain information on an angle between the first housing 210 and the second housing 220 of the electronic device 101 in order to provide information on a state of the electronic device 101 (for example, the first state and the second state). In various embodiments, the second sensor may be included in the folding portion 230. An operation of the electronic device 101 according to an embodiment identifying and/or switching a state of the electronic device 101 on the basis of an angle between the first housing 210 and the second housing 220 will be described with reference to FIG. 12.

As described above, the number of displays 140 included in the electronic device 101 may vary according to embodiments. Referring to FIG. 2C, the electronic device 101 may further include the second display 140-2 distinct from the first display 140-1. The second display 140-2 may be disposed on another surface (for example, the second surface of the first housing 210) distinct from at least one surface of the first housing 210 and the second housing 220 on which the first display 140-1 is disposed. Sizes, pixel densities (for example, pixels-per-inch (PPI)), and/or resolutions of the first display 140-1 and the second display 140-2 may be independent from each other.

In various embodiments, a processor (for example, the processor 120 of FIGS. 1A and 1B) may display a variety of information by using at least one display (for example, the display 140 of FIGS. 2A and 2B, the first display 140-1 and/or the second display 140-2 of FIG. 2C) included in the electronic device 101. The information displayed by using at least one display may be related to at least one application which is being executed in the processor. For example, the electronic device 101 may display the information within at least a portion of a display region of the display, and/or may display an execution screen and/or a UI for receiving information from a user of the electronic device 101, on the basis of an operating system and/or at least one application which is being executed in the processor.

In various embodiments, the information may be displayed on at least one of a first region, a second region disposed below the first region, and a third region disposed above the first region within the display region of the at least one display. In various embodiments, the second region may include at least one executable object (for example, an executable object for providing a go-back-function, an executable object for retrieving an application which is being executed, an executable object for providing a cancel function) for controlling a screen displayed within the first region. In various embodiments, the at least one executable object displayed within the second region may disappear according to at least one of a type of the screen displayed within the first region or a type of a content provided through the screen displayed within the first region. In various embodiments, the at least one executable object displayed within the second region may be maintained independently from switching of the screen displayed within the first region or in regardless of switching of the screen displayed within the first region. In various embodiments, the second region may be referred to as a control region.

In various embodiments, the third region may include at least one indicator (for example, an indicator for indicating quality of cellular communication, an indicator for indicating whether a WiFi function is activated, an indicator for indicating a remaining capacity of a battery, and the like) for indicating a state of the electronic device 101. In various embodiments, the at least one indicator displayed within the third region may disappear according to at least one of the type of the screen displayed within the first region or the type of the content provided through the screen displayed within the first region. In various embodiments, the at least one indicator displayed within the third region may be maintained independently from switching of the screen displayed within the first region or in regardless of switching of the screen displayed within the first region.

In various embodiments, the first region may display a split screen. In the state where the split screen is displayed, the electronic device 101 according to various embodiments may output a plurality of audio signals identified from a plurality of applications related to the split screen, concurrently, through one or more speakers, by mixing the audio signals.

In an embodiment, when the electronic device 101 includes a plurality of speakers (for example, the speaker 150 of FIGS. 1A and 1B), at least a portion of each of the plurality of speakers may be exposed through any one of the first housing 210 and the second housing 220. For example, when the electronic device 101 includes two speakers based on a stereo channel, any one of the two speakers may be exposed through a portion of the first housing 210 (for example, the left surface of the first housing 210), and the other speaker may be exposed through a portion of the second housing 220 (for example, the right surface of the second housing 220). For example, the electronic device 101 may include a speaker for outputting a voice signal related to a telephone call, and at least a portion of the speaker may be exposed through the second surface of the first housing 210 on which the second display 140-2 is disposed.

The electronic device 101 according to an embodiment may include one or more buttons (for example, a button 240 of FIGS. 2A, 2B, and 2C) to receive a user input for adjusting a volume. Referring to FIGS. 2A, 2B, and 2C, at least a portion of the button 240 may be exposed through a side surface of the housing of the electronic device 101. The volume of the electronic device 101 may be adjusted by the user pressing the button 240. Referring to FIG. 2C, in response to a user input of pressing a portion 240-1 of the button 240, the electronic device 101 may increase the volume. Similarly, in response to a user input of pressing a portion 240-2 of the button 240, the electronic device 101 may reduce the volume.

Hereinafter, a split screen that the electronic device 101 according to an embodiment displays within a display region of at least one display (for example, within the first region) will be described in detail with reference to FIGS. 3A and 3B.

Figure 3A:
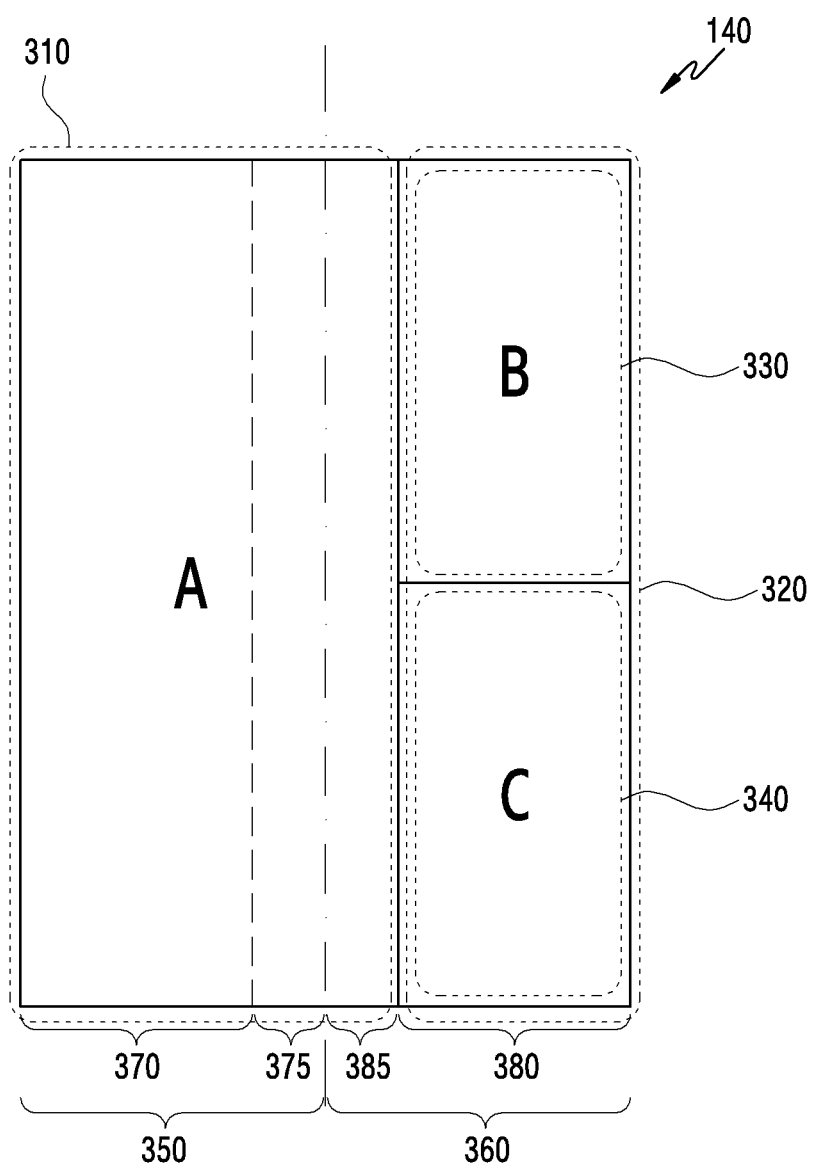
FIG. 3A is a view illustrating a structure of a split screen displayed on an electronic device according to an embodiment of the disclosure.
Figure 3B:
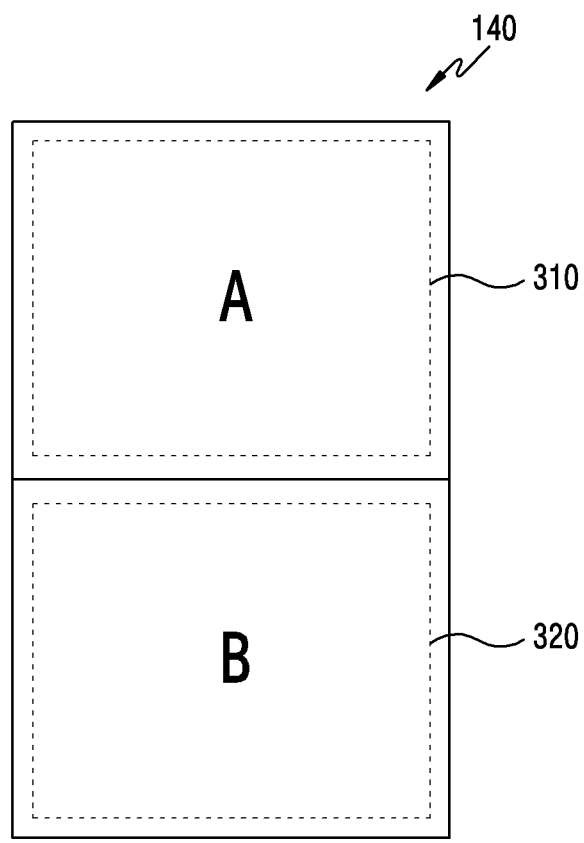
FIG. 3B is a view illustrating a structure of a split screen displayed on an electronic device according to an embodiment of the disclosure.

FIGS. 3A and 3B are views illustrating a structure of a split screen displayed in an electronic device according to various embodiments of the disclosure.

The electronic device of FIGS. 3A and 3B may display the split screen within the display 140. The electronic device of FIGS. 3A and 3B may correspond to the electronic device 101 of FIGS. 1A, 1B, 2A, 2B, and 2C. The display 140 of FIGS. 3A and 3B may correspond to the display 140 of FIGS. 1A, 2A, and 2B, or may correspond to at least one of the first display 140-1 and/or the second display 140-2 of FIGS. 1B and 2C.

Referring to FIGS. 3A and 3B, at least a portion (for example, the first region) of the display region may be configured with a first sub region 310 and a second sub region 320 or may include the first sub region 310 and the second sub region 320. In various embodiments, the second sub region 320 may be disposed beside the first sub region 310. For example, as shown in FIG. 3A, the second sub region 320 may be disposed adjacent to the first sub region 310 in a horizontal direction of the display 140. In another example, as shown in FIG. 3B, the second sub region 320 may be disposed adjacent to the first sub region 310 in a vertical direction of the display 140. In various embodiments, an area of the second sub region 320 may be smaller than an area of the first sub region 310. However, this should not be considered as limiting.

In various embodiments, the split screen may refer to a state in which a plurality of screens are provided concurrently or altogether. Each of the plurality of screens may correspond to each of a plurality of execution screens provided independently by at least one application and/or an operating system. For example, the electronic device may display the plurality of execution screens provided by the plurality of applications included in the electronic device on the plurality of screens. For example, the electronic device may display independent execution screens within different portions of the display, on the basis of an application which may generate a plurality of independent processes based on a multi-instance mode. In an embodiment, at least one of the plurality of screens may include a UI (for example, a menu for selecting an application to be executed within the screen) provided by the operating system installed in the electronic device.

Since the area of the first sub region 310 defined while the split screen is being provided is larger than the area of the second sub region 320, the user may intuitively recognize which region is a main region while the split screen is being provided. The electronic device 101 according to various embodiments may provide an enhanced user experience through such intuitive recognition. As described above, the area of the first sub region 310 may be larger than the area of the second sub region 320 in various embodiments. In various embodiments, since the area larger than the area of the second sub region 320 is provided, the first sub region 310 may be referred to as a main display region.

Since the second sub region 320 provides an area smaller than the area of the first sub region 310 in various embodiments, the second sub region 320 may be referred to as an auxiliary display region or an additional display region. The second sub region 320 may provide a single screen according to setting or configuration of the electronic device 101, or may provide multiple screens. For example, the second sub region 320 may provide a second screen 330 and a third screen 340 while a first screen is provided within the first sub region 310. In various embodiments, the third screen 340 may be disposed below the second screen 330.

In various embodiments, when the display 140 is configured with a foldable display (for example, the first display 140-1 of FIG. 2C), the first region may be configured with a plurality of portions. Referring to FIG. 3A, when the display 140 is configured with a foldable display, the first region may be configured with a portion 350 corresponding to a first surface of a first housing (for example, the first housing 210 of FIG. 2C) of the electronic device, and a portion 360 corresponding to a third surface of a second housing (for example, the second housing 220 of FIG. 2C), and may include the portion 350 and the portion 360. In various embodiments, the portion 350 may include a first portion 370 disposed on the first surface of the first housing, and a second portion 375 disposed on the first surface beside the first portion 370 and disposed on at least a portion of a folding portion (for example, the folding portion 130 of FIG. 2C), or may be configured with the first portion 370 and the second portion 375. In various embodiments, the portion 360 may include a third portion 380 disposed on the third surface of the second housing, and a fourth portion 385 disposed on the third surface beside the third portion 380 and disposed on at least a portion of the folding portion, or may be configured with the third portion 380 and the fourth portion 385.

Hereinafter, an embodiment will be described based on arrangements of the first sub region 310 and the second sub region 320 of FIG. 3A, but various embodiments are not limited thereto. An electronic device according to some embodiments may operate on the basis of arrangements of the first sub region 310 and the second sub region 320 of FIG. 3B.

In various embodiments, while the electronic device 101 provides the split screen, the first sub region 310 and the second sub region 320 may provide different screens. The different screens may correspond to different applications which are being executed in the electronic device 101. In response to different audio signals being identified from different applications, the electronic device 101 according to an embodiment may synthesize, mix, and/or combine the audio signals on the basis of information indicating volumes of the audio signals. The electronic device 101 may output the synthesized audio signals through a speaker. Hereinafter, an operation of the electronic device 101 according to various embodiment providing different screens on the basis of a plurality of sub regions will be described in detail with reference to FIGS. 4A, 4B, and 4C.

Figure 4A:
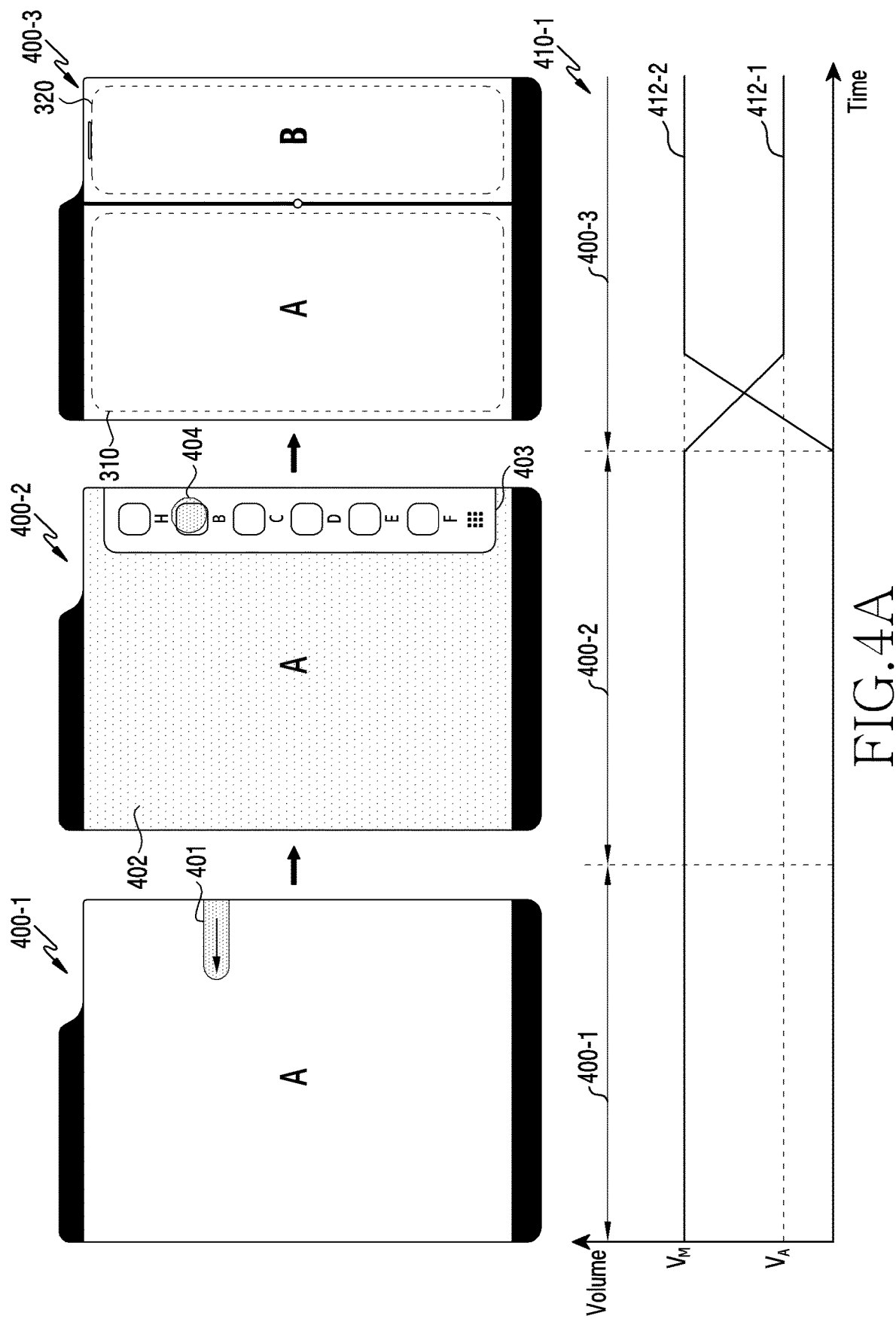
FIG. 4A is a view illustrating an example of a split screen displayed on an electronic device according to an embodiment of the disclosure.
Figure 4B:
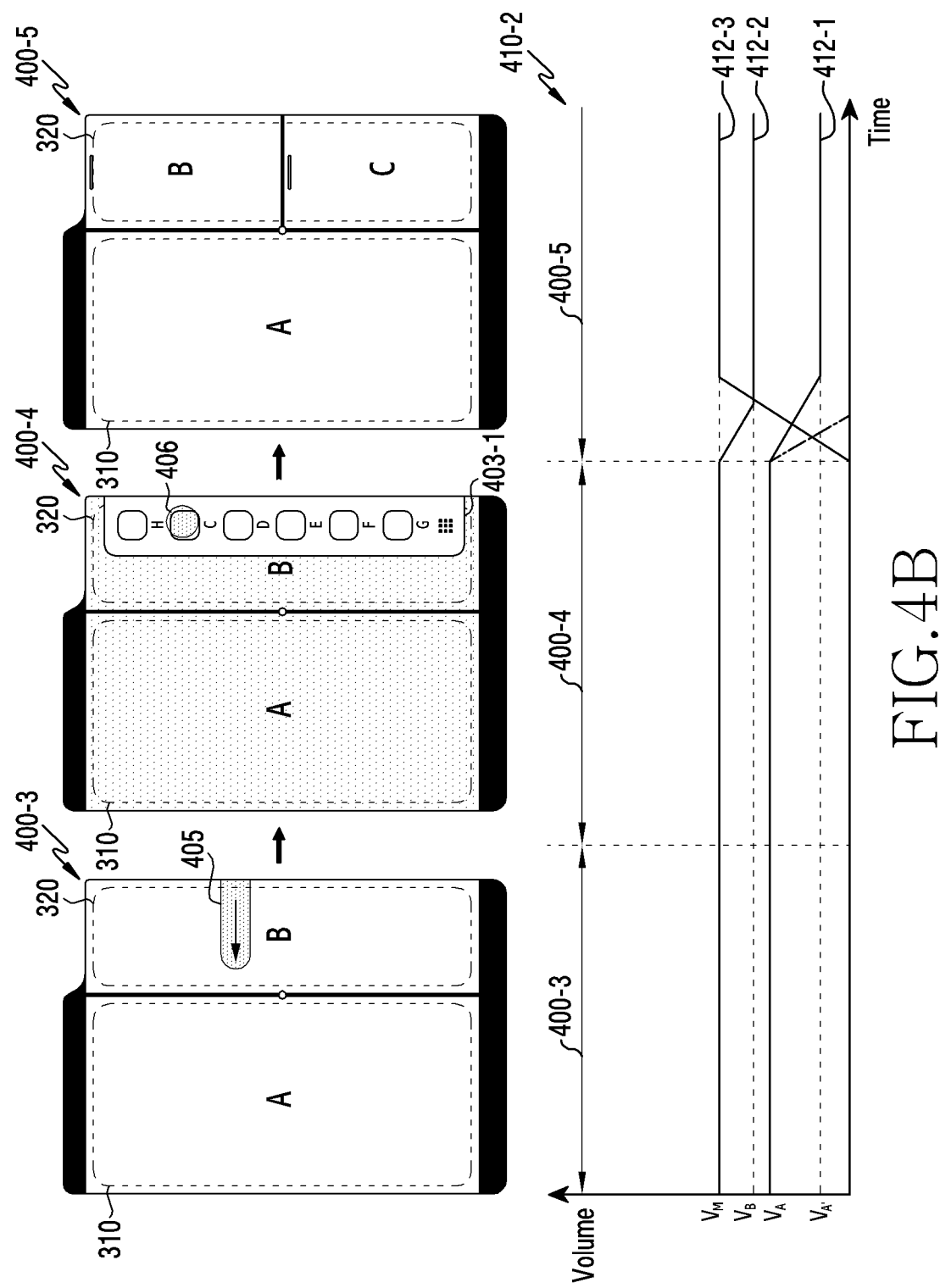
FIG. 4B is a view illustrating an example of a split screen displayed on an electronic device according to an embodiment of the disclosure.
Figure 4C:
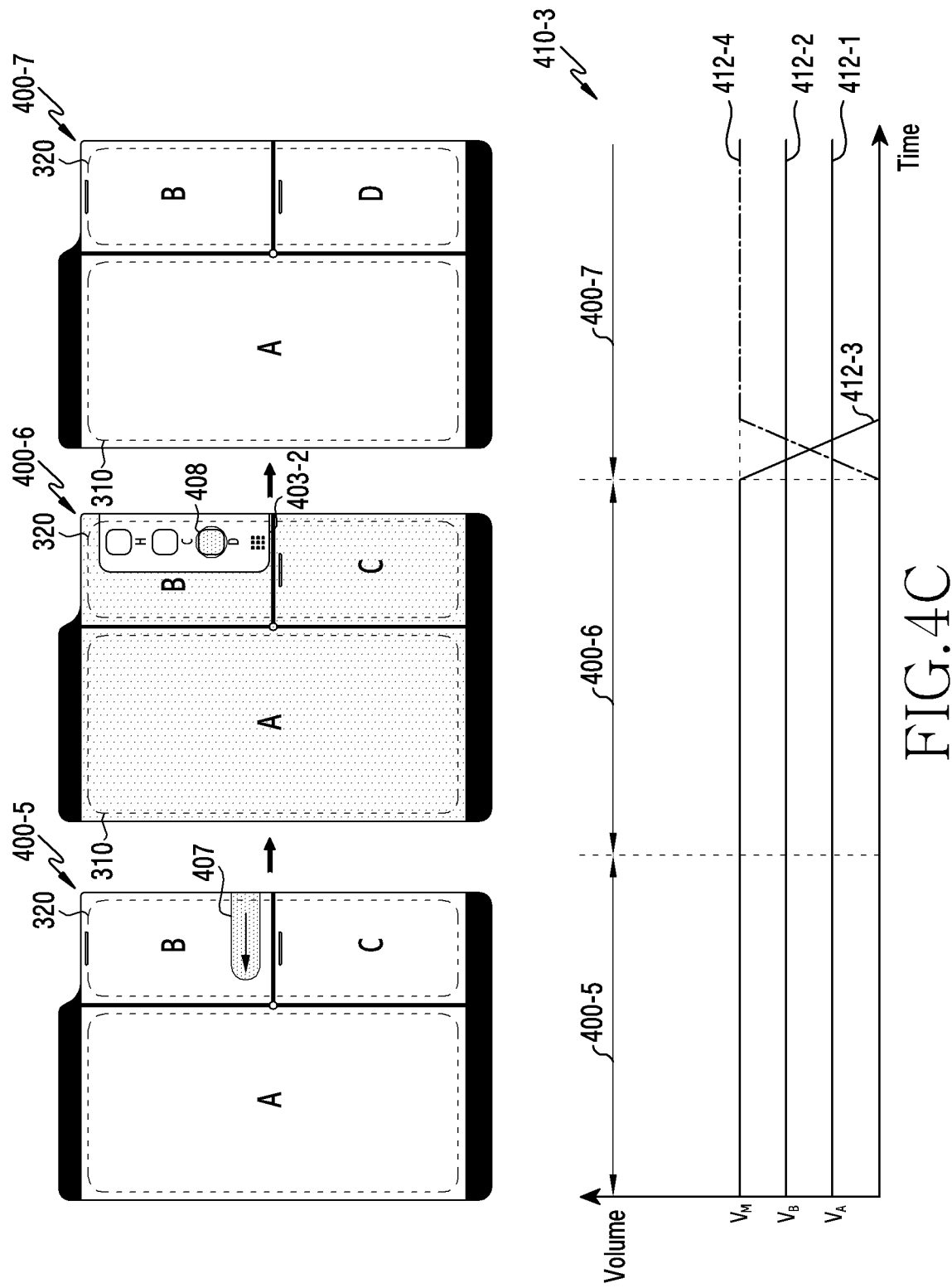
FIG. 4C is a view illustrating an example of a split screen displayed on an electronic device according to an embodiment of the disclosure.

FIGS. 4A, 4B, and 4C are views illustrating an example of a split screen displayed in the electronic device according to various embodiments of the disclosure.

The electronic device of FIGS. 4A, 4B, and 4C may correspond to the electronic device 101 of FIGS. 1A and 1B and/or FIGS. 2A, 2B, and 2C. The electronic device of FIGS. 4A, 4B, and 4C may display a plurality of execution screens identified from a plurality of applications within the display, concurrently, on the basis of the split screen of FIGS. 3A and 3B. In response to a plurality of audio signals being identified from the plurality of applications, the electronic device according to an embodiment may combine the plurality of audio signals on the basis of information such as a volume ratio. The electronic device may output the combined plurality of audio signals through a speaker (for example, the speaker 150 of FIGS. 1A and 1B).

Referring to FIG. 4A, in a state 400-1, the electronic device according to an embodiment may display a first screen A on the entire first region which includes the first sub region 310 and the second sub region 320 or is configured with the first sub region 310 and the second sub region 320, while the display (for example, the display 140 of FIG. 2A) is in an unfolded state. In the state 400-1, the electronic device according to an embodiment may identify a first audio signal (for example, a first audio signal provided in synchronization with a video frame displayed on the first screen A) from a first application (for example, a video streaming application) corresponding to the first screen A. In response to the first audio signal being identified, the electronic device may output the first audio signal on the basis of a designated volume.

The electronic device according to an embodiment may receive a designated input while displaying the first screen on the entire first region (and/or outputting the first audio signal). In various embodiments, the designated input may include an input for entering into a split screen state to provide a plurality of screens on the display concurrently. In various embodiments, the designated input may include an input for calling a list for selecting another screen to be provided with the first screen in the split screen state. For example, the designated input may include a drag input 401 going from an edge region in the first region toward another region in the first region that is different from the edge region.

In response to the designated input being received, the electronic device according to an embodiment may display the list as partially superimposed on or overlaid on the first screen. For example, the list may include at least one visual object for indicating some of applications which have been executed within the second sub region.

Referring to FIG. 4A, in the state 400-1, the electronic device according to an embodiment may receive the drag input 401 going from the edge region in the first region toward another region in the first region different from the edge region while displaying the first screen on the entire first region. The electronic device according to an embodiment may switch from the state 400-1 to a state 400-2 in response to the drag input 401 being received.

In the state 400-2, the electronic device according to an embodiment may display a shaded region 402 over the first screen A in order to indicate that the electronic device 101 is in a state where the electronic device 101 can select another screen to be provided with the first screen A in the split screen state. Alternatively, unlike in the state 400-2, the electronic device according to an embodiment may blur the first screen A in order to indicate that the electronic device 101 is in the state where the electronic device 101 can select another screen to be provided with the first screen A in the split screen state. In the state 400-2, the electronic device according to an embodiment may pause at least temporarily reproducing a content (for example, a video frame displayed through the first screen A and the first audio signal synchronized with the video frame) provided by the first application.

In the state 400-2, the electronic device according to an embodiment may display the list 403 as partially superimposed on the second sub region 320. In various embodiments, the list 403 may include at least one executable object. In various embodiments, the at least one executable object may indicate some of the applications which have been executed within the second sub region 320. In various embodiments, at least some of the at least one executable object may be substituted with at least one other executable object on the basis of an input for scrolling the list 403. For example, the electronic device according to an embodiment may display the at least one other executable object indicating some other of the applications which have been executed within the second sub region 320 within the list 403, on the basis of the input for scrolling the list 403.

In various embodiments, identification of the at least one executable object or a display order of the at least one executable object may be determined on the basis of execution heuristics including an operation history of the second sub region 320. In various embodiments, the display order of the at least one executable object may be determined on the basis of a latest execution history (or execution order). For example, an executable object H disposed on the uppermost end from among the at least one executable object in the list 403 may be an executable object indicating an application that has been executed within the second sub region 320 most recently from among at least one application indicated by the at least one executable object. In various embodiments, the display order of the at least one executable object may be determined on the basis of a correlation with the first screen A. For example, the executable object H disposed on the uppermost end from among the at least one executable object in the list 403 may be an executable object for indicating an application (for example, an application having a history of having been executed in relation to the first application) which has the highest correlation with the first screen A from among the at least one application indicated by the at least one executable object.

In various embodiments, the display order of the at least one executable object may be determined on the basis of a current time. For example, the electronic device according to an embodiment may identify the executable object H indicating an application which has been most frequently executed up to the current time, and may display the executable object H on the uppermost end of the list 403. In various embodiments, the display order of the at least one executable object may be determined on the basis of a place where the electronic device is positioned.

For example, the electronic device according to an embodiment may identify the executable object H indicating a music replay application which has been most frequently executed in a home, on the basis of it being identified that the electronic device is positioned in the home by using at least one of a communication circuit of the electronic device or a GPS module of the electronic device, and may display the executable object H on the uppermost end of the list 403.

In another example, the electronic device according to an embodiment may identify the executable object H indicating a navigation application which has been most frequently executed in a car, on the basis of it being identified that the electronic device is positioned in the car by using at least one of the communication circuit of the electronic device or the GPS module of the electronic device, and may display the executable object H on the uppermost end of the list 403. However, this should not be considered as limiting.

In response to an input for selecting a first executable object from among the at least one executable object included in the list being received, the electronic device according to various embodiments may display the first screen within the first sub region, and may display an execution screen of the application indicated by the first executable object within the second sub region. For example, the input may include a single tap input. For example, the input may be touching the first executable object with a depression strength smaller than a reference strength. In another example, the input may be touching the first executable object for a time shorter than a reference time. However, this should not be considered as limiting.

For example, referring to FIG. 4A, the electronic device according to an embodiment may receive an input 404 for selecting the first executable object B in the list 403 in the state 400-2. In response to the input 404 being received, the electronic device according to an embodiment may switch from the state 400-2 to a state 400-3. In the state 400-3, the electronic device according to an embodiment may display the first screen A within the first sub region 310, and may display an execution screen B of an application indicated by the first executable object B (for example, a second application indicated by the object B) within the second sub region 320. For example, the electronic device according to an embodiment may provide the split screen state by displaying the execution screen B concurrently with the first screen A.

In the state 400-3, the electronic device according to an embodiment may execute the first application corresponding to the first screen A and the second application corresponding to the execution screen B, concurrently. In the state 400-3, the electronic device according to an embodiment may identify a second audio signal (for example, a voice message) from the second application (for example, a messenger application). In response to the second audio signal being identified, the electronic device may output the second audio signal. When the electronic device identifies the first audio signal from the first application corresponding to the first screen A in the state 400-3, the first audio signal and the second audio signal may be outputted concurrently.

Referring to FIG. 4A, a graph 410-1 visualizing changes in volumes corresponding to one or more audio signals identified by the electronic device 101 when the electronic device 101 switches between the states 400-1, 400-2, 400-3 is illustrated. Referring to the graph 410-1, a line 412-1 indicating a change in the volume of the first audio signal in each of the states 400-1, 400-2, 400-3, and a line 412-2 indicating a change in the volume of the second audio signal are illustrated.

When the electronic device according to an embodiment identifies the first audio signal from the first application corresponding to the first screen A in the state 400-1, the electronic device may output the identified first audio signal. Referring to a time period corresponding to the state 400-1 in the graph 410-1, the electronic device according to an embodiment may control at least one speaker (for example, the speaker 150 of FIGS. 1A and 1B) on the basis of a designated volume such as a master volume $V_M$ to output the first audio signal. In an embodiment, the master volume $V_M$ may be adjusted in response to a user input (for example, a user input of pressing the button 240 of FIGS. 2A, 2B, and 2C) for adjusting the volume.

Referring to FIG. 4A, in response to the drag input 401 being received, the electronic device may enter into the state 400-2 from the state 400-1. Referring to a time period corresponding to the state 400-2 in the graph 410-1, the electronic device according to an embodiment may maintain outputting the first audio signal on the basis of the master volume $V_M$. In another embodiment, the electronic device may temporarily pause reproducing the first audio signal.

Referring to FIG. 4A, in response to the input 404 being received, the electronic device may enter into the state 400-3 from the state 400-2. In the state 400-3, the electronic device may maintain reproducing the first audio signal which has been reproduced in the previous states 400-1, 400-2. For example, when any audio signal is not identified from the second application corresponding to the execution screen B, the electronic device may maintain outputting the first audio signal on the basis of the master volume $V_M$.

In another example, when the second audio signal is identified from the second application corresponding to the execution screen B, the electronic device may reproduce the first audio signal and the second audio signal concurrently. When reproducing the first audio signal and the second audio signal concurrently, the electronic device according to an embodiment may reproduce by synthesizing and/or mixing the first audio signal and the second audio signal. In various embodiments, synthesizing and/or mixing a plurality of audio signals may include increasing and/or reducing a size (for example, a volume) of at least one audio signal from among the plurality of audio signals in comparison to a size of another audio signal.

Referring to a time period corresponding to the state 400-3 in the graph 410-1, the electronic device according to an embodiment may reduce the volume of the first audio signal from the master volume $V_M$ to a first volume $V_A$ in response to the second audio signal being identified. The electronic device reducing the volume of the first audio signal may include gradually reducing a volume within a designated time period (for example, a time period shorter than 1 second) like fade-down.

In response to the second audio signal being identified, the electronic device according to various embodiment may output the second audio signal at the master volume $V_M$. The electronic device according to an embodiment may include gradually increasing a volume (for example, increasing from 0 (zero) volume to the master volume $V_M$) within a designated time period (for example, a time period shorter than 1 second) like fade-up.

Referring to the time period corresponding to the state 400-3 in the graph 410-1, the electronic device according to an embodiment may output the second audio signal at the master volume $V_M$ in the state where the first audio signal is outputted at the first volume $V_A$. As described above, the first volume $V_A$ may be smaller than the master volume $V_M$. For example, the first volume $V_A$ may be a volume that is obtained by applying a designate ratio, for example, 20%, to the master volume $V_M$ (that is, $V_A=0.2\times V_M$). In an embodiment, the audio signals which are synthesized on the basis of the first volume $V_A$ and the master volume $V_M$ may be outputted through at least one speaker included in the electronic device and/or another electronic device (for example, a Bluetooth speaker) connected with the electronic device wiredly and/or wirelessly.

For example, referring to FIG. 4B, the electronic device according to an embodiment may display the first screen A within the first sub region 310 and may display the execution screen B within the second sub region 320 in the state 400-3. In the state 400-3, the electronic device according to an embodiment may receive a second drag input 405 going from an edge region of the second sub region 320 toward another region within the second sub region 320. The electronic device according to an embodiment may switch from the state 400-3 to a state 400-4 in response to the second drag input 405 being received.

In the state 400-4, the electronic device according to an embodiment may display a shaded region over the first screen A and the execution screen B in order to indicate that the electronic device is in a state where the electronic device can select another screen to be provided with the first screen A and the execution screen B in the split screen state. Alternatively, unlike in the state 400-4, the electronic device according to an embodiment may blur the first screen A and the execution screen B in order to indicate that the electronic device is in the state where the electronic device can select another screen to be provided with the first screen A and the execution screen B in the split screen state. In the state 400-4, the electronic device according to an embodiment may display a list 403-1 as partially superimposed on the second sub region 320. When the application providing the execution screen B is an application that does not support multi-tasking, the list 403-1 may not include the first executable object B unlike the list 403. In the state 400-4, the electronic device according to an embodiment may pause reproducing at least one of the first audio signal and the second audio signal of the state 400-3.

The electronic device according to an embodiment may receive an input for selecting a second executable object from among at least one executable object included in the list, while displaying the list as superimposed on the first screen displayed within the first sub region and the execution screen displayed within the second sub region. In response to the input for selecting the second executable object being received, the electronic device according to an embodiment may maintain the display of the first screen within the first sub region, may reduce the execution screen displayed within the second sub region, and may display another execution screen of another application indicated by the second executable object below the reduced execution screen.

For example, referring to FIG. 4B, the electronic device according to an embodiment may receive an input 406 for selecting the second executable object C included in the list 403-1 in the state 400-4. The electronic device according to an embodiment may switch from the state 400-4 to a state 400-5 in response to the input 406 being received. In the state 400-5, the electronic device according to an embodiment may maintain the display of the first screen A within the first sub region 310, may reduce the execution screen B displayed within the second sub region 320, and may display another execution screen C of another application (for example, a third application indicated by the object C) indicated by the second executable object C below the reduced execution screen B.

In the state 400-5, the electronic device according to an embodiment may execute the first application corresponding to the first screen A, the second application corresponding to the execution screen B, and the third application corresponding to the execution screen C, concurrently. In the state 400-5, in response to the third application (for example, a game application) being executed, the electronic device according to an embodiment may identify a third audio signal (for example, game background music) from the third application. In response to the third audio signal being identified, the electronic device may output the third audio signal. In the previous state 400-3 of the state 400-5, when the electronic device outputs the first audio signal and the second audio signal concurrently, the electronic device entering into the state 400-5 may output the first audio signal, the second audio signal, and the third audio signal, concurrently.

Referring to FIG. 4B, a graph 410-2 visualizing changes in volumes corresponding to one or more audio signals identified by the electronic device 101 when the electronic device 101 switches between the states 400-3, 400-4, 400-5 is illustrated. Referring to the graph 410-2, a line 412-1 indicating a change in the volume of the first audio signal in each of the states 400-3, 400-4, 400-5, a line 412-2 indicating a change in the volume of the second audio signal, and a line 412-3 indicating a change in the volume of the third audio signal are illustrated.

Referring to a time period corresponding to the state 400-3 in the graph 410-2, similarly to FIG. 4A, the electronic device according to an embodiment may output synthesized audio signals in which the first audio signal and the second audio signal are combined according to the first volume $V_A$ and the master volume $V_M$.

Referring to FIG. 4B, in response to the second drag input 405 being received, the electronic device according to an embodiment may switch from the state 400-3 to the state 400-4. Referring to a time period corresponding to the state 400-4 in the graph 410-2, the electronic device according to an embodiment may maintain outputting the synthesized audio signals. In another embodiment, the electronic device may temporarily pause reproducing the synthesized audio signals.

Referring to FIG. 4B, in response to the input 406 being received, the electronic device may enter into the state 400-5 from the state 400-4. In the state 400-5, the electronic device may maintain reproducing the synthesized audio signals which have been reproduced in the previous states 400-3, 400-4. For example, when any audio signal is not identified from the third application corresponding to the execution screen C, the electronic device may maintain outputting the synthesized audio signals.

In another example, when the third audio signal is identified from the third application corresponding to the execution screen C, the electronic device may reproduce the first audio signal, the second audio signal, and the third audio signal, concurrently. For example, the electronic device may reproduce a second synthesized audio signal in which the first audio signal, the second audio signal, and the third audio signal are synthesized. The first audio signal, the second audio signal, and the third audio signal may be synthesized with a volume of the speaker of the electronic device being maintained at the master volume $V_M$.

Referring to a time period corresponding to the state 400-5 in the graph 410-2, the electronic device according to an embodiment may maintain outputting the first audio signal in response to the third audio signal being identified. For example, the electronic device may output the first audio signal at the first volume $V_A$. Alternatively, the electronic device may reduce the first volume $V_A$ corresponding to the first audio signal (for example, to a first volume $V_A'$). Alternatively, the electronic device may pause outputting the first audio signal like making the first volume $V_A$ to 0 (zero). As outputting the first audio signal is paused, the electronic device according to an embodiment may maintain the number of audio signals reproduced concurrently less than or equal to a designated maximum value (for example, 2).

In response to the third audio signal being identified, the electronic device according to an embodiment may reduce the master volume $V_M$ corresponding to the second audio signal to a second volume $V_B$. The second volume $V_B$ is a volume that is smaller than the master volume $V_M$, and may be, for example, a volume which is obtained by applying a designated ratio, for example, 20%, to the master volume $V_M$. According to various embodiments, the second volume $V_B$ may be identical to or different from the first volume $V_A$. In an embodiment, the volume of the first audio signal may be reduced (reduced from $V_A$ to $V_A'$) and the volume of the second audio signal may be reduced (reduced from $V_M$ to $V_B$) on the basis of fade-down.

In response to the third audio signal being identified, electronic device according to various embodiments may output the third audio signal at the master volume $V_M$. In an embodiment, before outputting the third audio signal at the master volume $V_M$, the electronic device may gradually increase the volume of the third audio signal on the basis of fade-up.

Referring to the time period corresponding to the state 400-5 in the graph 410-2, the electronic device according to an embodiment may output the third audio signal at the master volume $V_M$ in the state where the first audio signal is outputted at the reduced first volume $V_A'$, and the second audio signal is outputted at the second volume $V_B$. In an embodiment, the second audio signal which is based on the reduced first volume $V_A'$, the second volume $V_B$, and the master volume $V_M$ may be outputted through at least one speaker included in the electronic device and/or another electronic device (for example, a Bluetooth speaker) connected with the electronic device wiredly and/or wirelessly.

While displaying the first screen within the first sub region and the execution screen and another execution screen within the second sub region, the electronic device according to an embodiment may receive a third drag input of going from the edge region within the first region toward another region within the first region that is different from the edge region. In response to the third drag input being received, the electronic device according to an embodiment may display a list excluding the first executable object for indicating the application providing the execution screen, and the second executable object for indicating another application providing another execution scree, as partially superimposed on the execution screen and another execution screen displayed within the second sub region.

In various embodiments, when at least one of the application providing the execution screen or another application providing another execution screen is an application that provides multi-tasking, at least one of the first executable object or the second executable object may be maintained without being removed from the list displayed in response to the third drag input being received.

For example, referring to FIG. 4C, the electronic device according to an embodiment may display the first screen A within the first sub region 310 and may display the execution screen B and another execution screen C within the second sub region 320 in the state 400-5. In the state 400-5, the electronic device according to an embodiment may receive the third drag input 407 going from an edge region of the second sub region 320 toward another region within the second sub region 320. The electronic device according to an embodiment may switch from the state 400-5 to a state 400-6 in response to the third drag input 407 being received.

In the state 400-6, the electronic device according to an embodiment may display a shaded region over the first screen A, the execution screen B, and another execution screen C in order to indicate that the electronic device is in a state where the electronic device can select another screen to be provided with the first screen A and the execution screen B in the split screen state. Alternatively, unlike in the state 400-6, the electronic device according to an embodiment may blur the first screen A, the execution screen B, and another execution screen C in order to indicate that the electronic device is in the state where the electronic device can select another screen to be provided with the first screen A and the execution screen B in the split screen state.

In the state 400-6, the electronic device according to an embodiment may display a list 403-2 as partially superimposed on the second sub region 320. When at least one of the application providing the execution screen B and another application providing another execution screen C is an application that does not support multi-tasking, the list 403-2 may not include the first executable object B and the second executable object C unlike the list 403 and the list 403-1. In the state 400-6, the electronic device according to an embodiment may pause reproducing at least one of the first audio signal, the second audio signal, or the third audio signal which is reproduced in the state 400-5.

While displaying the list as superimposed on the execution screen and another execution screen displayed within the second sub region, the electronic device according to an embodiment may receive an input for selecting a third executable object from among at least one executable object included in the list. In response to the input for selecting the third executable object being received, the electronic device according to an embodiment may maintain the display of the first screen within the first sub region and the display of the execution screen within a portion of the second sub region, and may change another execution screen displayed within the other portion of the second sub region to an execution screen of an application indicated by the third executable object.

For example, referring to FIG. 4C, the electronic device according to an embodiment may receive an input 408 for selecting the third executable object D included in the list 403-2 in the state 400-6. In response to the input 408 being received, the electronic device according to an embodiment may switch from the state 400-6 to a state 400-7. In the state 400-7, the electronic device according to an embodiment may maintain displaying the first screen A within the first sub region 310 and displaying the execution screen B within a portion of the second sub region 320, and may change another execution screen C displayed within the other portion of the second sub region 320 to an execution screen D of an application indicated by the third executable object D (for example, a fourth application indicated by the object D). In various embodiments, when the execution screen C is changed to the execution screen D of the application indicated by the third executable object D, the executable object C may be disposed on the uppermost end of the at least one executable object within the list 403-2.

In the state 400-7, the electronic device according to an embodiment may execute the first application corresponding to the first screen A, the second application corresponding to the execution screen B, and the fourth application corresponding to the execution screen D, concurrently. As the execution screen D is displayed in the state 400-7, the electronic device may cease to execute the third application which has been executed in the state 400-5. In response to the fourth application (for example, a photo/video application) being executed in the state 400-7, the electronic device according to an embodiment may identify a fourth audio signal (for example, an audio signal included in a video file selected by the user) from the fourth application. In response to the fourth audio signal being identified, the electronic device may output the fourth audio signal. When the electronic device outputs the first audio signal, the second audio signal, and the third audio signal, concurrently, in the previous state 400-5 of the state 400-7, the electronic device entering into the state 400-7 may cease to reproduce the third audio signal according to cessation to execute the third application, and may output the first audio signal, the second audio signal, and the fourth audio signal, concurrently.

Referring to FIG. 4C, a graph 410-3 visualizing changes in volumes corresponding to one or more audio signals identified by the electronic device 101 when the electronic device 101 switches between the states 400-5, 400-6, and 400-7 is illustrated. Referring to the graph 410-3, a line 412-1 indicating a change in the volume of the first audio signal in each of the states 400-5, 400-6, 400-7, a line 412-2 indicating a change in the volume of the second audio signal, a line 412-3 indicating a change in the volume of the third audio signal, and a line 412-4 indicating a change in the volume of the fourth audio signal are illustrated.

Referring to a time period corresponding to the state 400-5 in the graph 410-3, the electronic device according to an embodiment may output the second synthesized audio signal in which the first audio signal, the second audio signal, and the third audio signal are combined according to the first volume $V_A$ (or the reduced first volume $V_A'$), the second volume $V_B$ and the master volume $V_M$.

Referring to FIG. 4C, in response to the third drag input 407 being received, the electronic device according to an embodiment may switch from the state 400-5 to the state 400-6. Referring to a time period corresponding to the state 400-6 in the graph 410-3, the electronic device according to an embodiment may maintain outputting the second synthesized audio signal. In another embodiment, the electronic device may temporarily pause reproducing the second synthesized audio signal.

Referring to FIG. 4C, in response to the input 408 being received, the electronic device may enter into the state 400-7 from the state 400-6. In the state 400-7, the electronic device may maintain reproducing at least one of the plurality of audio signals which have been reproduced in the previous states 400-5, 400-6. For example, when an audio signal is not identified from the fourth application corresponding to the execution screen D, the electronic device may maintain outputting the first audio signal and the second audio signal. In this case, the electronic device may reproduce by synthesizing the first audio signal and the second audio signal similarly to the time period corresponding to the state 400-3 of the graph 410-1 of FIG. 4A.

In another example, when the fourth audio signal is identified from the fourth application corresponding to the execution screen D, the electronic device may reproduce the first audio signal, the second audio signal, and the fourth audio signal, concurrently. For example, the electronic device may reproduce a third synthesized audio signal in which the first audio signal, the second audio signal, and the fourth audio signal are synthesized. The first audio signal, the second audio signal, and the fourth audio signal may be synthesized with the volume of the speaker of the electronic device being maintained at the master volume $V_M$.

Referring a time period corresponding to the state 400-7 in the graph 410-3, the electronic device according to an embodiment may synthesize the first audio signal, the second audio signal, and the fourth audio signal, on the basis of the first volume $V_A$ (or the reduced first volume $V_A'$) corresponding to the first audio signal, the second volume $V_B$ corresponding to the second audio signal, and the master volume $V_M$. The third audio signal which is synthesized on the basis of the first volume $V_A$ (or the reduced first volume $V_A'$), the second volume $V_B$ corresponding to the second audio signal, and the master volume $V_M$ may be outputted through at least one speaker included in the electronic device, and/or another electronic device (for example, a Bluetooth speaker) connected with the electronic device wiredly and/or wirelessly.

In response to the fourth audio signal being identified and/or the cessation to display the execution screen C caused by the display of the execution screen D being identified, the electronic device according to an embodiment may cease to output the third audio signal corresponding to the execution screen C. Ceasing to output the third audio signal may include gradually reducing a volume corresponding to the third audio signal (for example, reducing from the master volume $V_M$ to 0) like fade-down. Since the display of the execution screens A, B is maintained although the display of the execution screen C is ceased, the electronic device according to an embodiment may maintain outputting the first audio signal and the second audio signal corresponding to the execution screens A, B.

The master volume $V_M$, the first volume $V_A$ (and $V_A'$), and the second volume $V_B$ described above may be absolute values or relative values indicating volumes. The master volume $V_M$, the first volume $V_A$ (and $V_A'$), and the second volume $V_B$ described above may correspond to designated values which are distinct from one another and/or are identical to one another. The master volume $V_M$, the first volume $V_A$ (and $V_A'$), and the second volume $V_B$ described above may be adjusted by the user of the electronic device and/or the processor of the electronic device (for example, the processor 120 of FIGS. 1A and 1B). An operation of the electronic device according to an embodiment adjusting at least one of the first volume $V_A$ (and $V_A'$) and the second volume $V_B$ by a user input will be described with reference to FIGS. 9A, 9B, 10A, 10B, 10C, and 10D.

Figure 5:
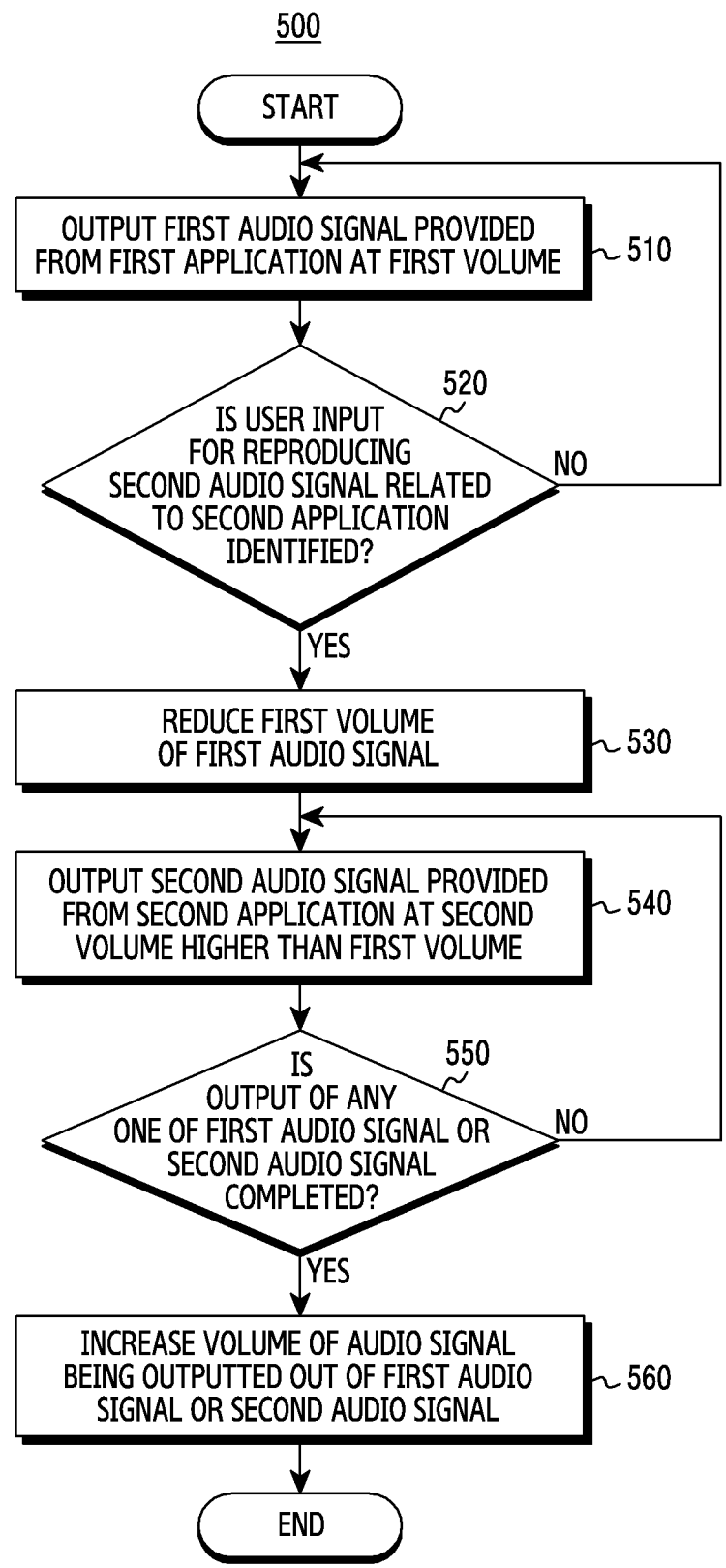
FIG. 5 is a flowchart to illustrate an operation of an electronic device according to an embodiment of the disclosure.

FIG. 5 is a flowchart 500 to illustrate an operation of an electronic device according to an embodiment of the disclosure. The electronic device of FIG. 5 may correspond to the electronic device 101 of FIGS. 1A, 1B, 2A, 2B, and 2C. At least one of the operations of FIG. 5 may be performed by the electronic device 101 of FIGS. 1A and 1B and/or the processor 120.

Referring to FIG. 5, in operation 510, the electronic device according to various embodiments may output a first audio signal provided from a first application at a first volume. The first volume may correspond to a designated volume like the master volume $V_M$ of FIGS. 4A, 4B, and 4C. When the electronic device includes at least one speaker (for example, the speaker 150 of FIGS. 1A and 1B), the electronic device may output the first audio signal through the at least one speaker. In an embodiment, the electronic device may display a first screen (for example, the first screen A of FIG. 4A) provided from the first application in a state where the first audio signal is outputted on the basis of the first application.

In an embodiment, the first application may be an application for reproducing a content (for example, a multimedia content) including a video and/or an audio. For example, the first application may be related to a media streaming service, video-on-demand (VOD) and/or audio-on-demand (AOD) service. When the electronic device identifies image data and/or video data corresponding to the first audio signal from the first application, the electronic device may display the image data and/or the video data provided form the first application within the first screen.

The electronic device according to an embodiment may display a plurality of screens which are based on applications distinct from one another within sub regions distinct from one another within a display region of a display. For example, the electronic device may operate in a split screen state for providing a plurality of screens including the first screen concurrently. In an embodiment, the electronic device may display the plurality of screens, concurrently, on the basis of structures of the split screen of FIGS. 3A and 3B. The state in which the electronic device displays the split screen may include, for example, the states 400-3, 400-4, 400-5 of FIG. 4B, and/or the states 400-5, 400-6, 400-7 of FIG. 4C. When the plurality of screens are displayed concurrently, the electronic device according to an embodiment may output the first audio signal provided from the first application at the first volume through at least one speaker in operation 510.

Referring to FIG. 5, in operation 520, the electronic device according to various embodiments may identify a user input for reproducing a second audio signal related to a second application. For example, while outputting the first audio signal, the electronic device may identify the user input for reproducing the second audio signal related to the second application within a screen provided from the second application from among the plurality screens. The second application may be another application that is executed independently from the first application, and may be another application for reproducing a content including a video and/or an audio. An example of the user input identified by the electronic device will be described with reference to FIGS. 7 and 8. When the user input for reproducing the second audio signal is not identified (520—No), the electronic device may maintain outputting the first audio signal at the first volume according to operation 510.

When the user input for reproducing the second audio signal is identified (520—Yes), the electronic device according to various embodiments may reduce the first volume of the first audio signal in operation 530. In an embodiment, in response to the user input being identified, the electronic device may reduce the first volume of the first audio signal being outputted through at least one speaker based on operation 510. Reducing the first volume may refer to reducing the first volume from the designated volume such as the master volume by a designated ratio. The first volume may be reduced similarly to changing of the volume of the first audio signal (reducing from the master volume $V_M$ to the first volume $V_A$) when the electronic device switches from the state 400-2 to the state 400-3 of FIG. 4A.

Referring to FIG. 5, in operation 540, the electronic device according to various embodiments may output the second audio signal provided from the second application at a second volume higher than the first volume. The first volume may refer to the first volume reduced based on operation 503. The electronic device according to an embodiment may output, through at least one speaker, the second audio signal provided from the second application at the second volume, which is higher than the first volume reduced according to operation 530. The second volume may correspond to the designated volume like the master volume $V_M$ of FIGS. 4A, 4B, and 4C.

The electronic device may output the second audio signal based on operation 540 concurrently with outputting the first audio signal at the first volume reduced based on operation 530. In operation 540, the user of the electronic device may hear the second audio signal outputted at the second volume and the first audio signal outputted at the reduced first volume, concurrently. The electronic device according to an embodiment may combine, synthesize, and/or mix the first audio signal of the first volume reduced based on operation 530, and the second audio signal of the second volume higher than the first volume. The electronic device may output a synthesized audio signal in which the first audio signal and the second audio signal are combined. The electronic device may output the synthesized audio signal similarly to outputting the first audio signal and the second audio signal in the state 400-3 of FIG. 4A, for example.

Referring to FIG. 5, in operation 550, the electronic device according to various embodiments may determine whether output of any one of the first audio signal or the second audio signal is completed. For example, in the state where the second audio signal is outputted at the second volume while the first audio signal is outputted at the first volume, the electronic device according to an embodiment may identify an audio signal that is completed first out of the first audio signal or the second audio signal.

The output of the audio signal being completed may mean ceasing to provide the audio signal from the corresponding application. For example, when the user presses a pause button and/or a stop button displayed within a screen provided from a specific application, or the output of all audio signals provided from the specific application is completed, the specific application may not provide audio signals any more. When the output of the first audio signal and the second audio signal is not completed (550—No), the electronic device according to an embodiment may maintain outputting the second audio signal at the second volume while outputting the first audio signal at the first volume based on operation 540.

When the output of any one of the first audio signal or the second audio signal is completed (550—Yes), the electronic device according to various embodiments may increase the volume of the audio signal being outputted from among the first audio signal or the second audio signal in operation 560. For example, when the output of the second audio signal at the second volume is completed, the electronic device according to an embodiment may increase the volume of the first audio signal being outputted. In this case, the electronic device may restore the volume of the first audio signal from the first volume reduced based on operation 530 to the previous first volume before operation 530.

In an embodiment, the volume of the audio signal may increase based on operation 560 in a range of the first volume and/or the master volume of operation 510. For example, when the output of the first audio signal at the reduced first volume is completed, the electronic device according to an embodiment may increase the second volume of the second audio signal being outputted up to the first volume of operation 510 and/or the master volume. When the second volume is determined to correspond to the first volume and/or the master volume of operation 510 in operation 540, the electronic device according to an embodiment may not increase the second volume of the second audio signal.

The electronic device according to an embodiment may output three or more audio signals, concurrently, as well as two audio signals (the first audio signal and the second audio signal) of FIG. 5. Hereinafter, an operation of an electronic device outputting a plurality of audio signals will be described with reference to FIG. 6.

Figure 6:
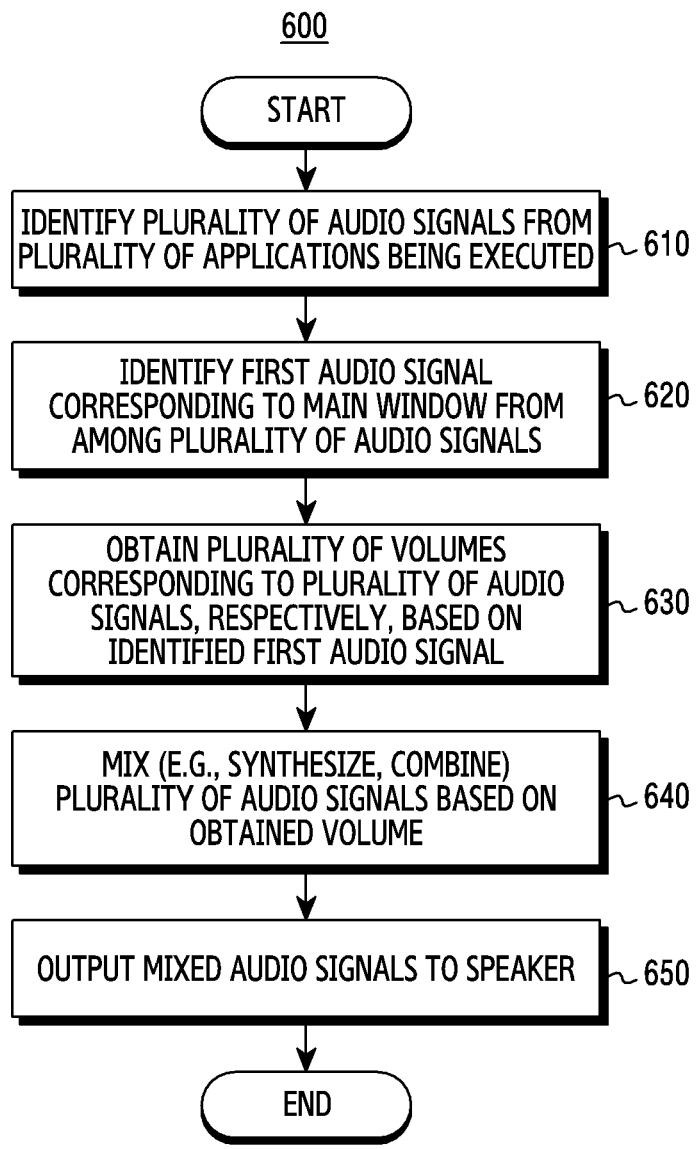
FIG. 6 is a flowchart to illustrate an operation of an electronic device mixing a plurality of audio signals according to an embodiment of the disclosure.

FIG. 6 is a flowchart 600 to explain an operation of an electronic device mixing a plurality of audio signals according to an embodiment of the disclosure.

The electronic device of FIG. 6 may correspond to the electronic device 101 of FIGS. 1A, 1B, 2A, 2B and 2C. At least one of the operations of FIG. 6 may be performed by the electronic device 101 and/or the processor 120 of FIGS. 1A and 1B. At least one of the operations of FIG. 6 may be related to at least one of the operations of FIG. 5, and/or may be performed similarly.

Referring to FIG. 6, in operation 610, the electronic device according to various embodiments may identify a plurality of audio signals from a plurality of applications which are being executed. For example, in response to a user input for reproducing a second audio signal being identified and received while a first audio signal is being reproduced as in operation 520 of FIG. 5, the electronic device may identify the plurality of audio signals. For example, in response to a request for output of another audio signal being identified in the state where one audio signal is being outputted, the electronic device may identify the plurality of audio signals.

The plurality of audio signals identified by the electronic device according to an embodiment may be provided from the plurality of applications provided in a plurality of sub regions within the display. The electronic device according to an embodiment may identify the plurality of audio signals based on operation 610 in a state where the electronic device displays a split screen, for example.

Referring to FIG. 6, in operation 620, the electronic device according to various embodiments may identify a first audio signal corresponding to a main window from among the plurality of audio signals. The main window may refer to a screen in which the user of the electronic device has an interest from among a plurality of screens displayed within the display. The first audio signal corresponding to the main window may be provided from an application corresponding to the screen in which the user has the interest.

For example, when the user of the electronic device executes a plurality of applications sequentially as shown in FIGS. 4A, 4B, and 4C, the main window may refer to a screen corresponding to an application that is lastly executed by the user. In another example, when the user of the electronic device interacts based on the split screen, the main window may refer to a screen corresponding to an application with which the user interacts lastly, and/or interacts currently. In another example, when widths of the plurality of screens displayed within the display are different from one another, the main window may refer to the widest screen from among the plurality of screens.

In another example, the main window may be determined on the basis of priorities of the plurality of applications which are being executed concurrently on the basis of the split screen. The priorities may be related to respective types of the plurality of applications. For example, when a first screen provided from a first application performing voice communication and/or video communication, and a second screen provided from a second application for media streaming are displayed concurrently, the main window may be selected according to respective priories of the first application and the second application. For example, the first screen may be selected as the main window to provide a communication service to the user first.

Referring to FIG. 6, in operation 630, the electronic device according to various embodiments may obtain a plurality of volumes corresponding to the plurality of audio signals, respectively, on the basis of the identified first audio signal. The plurality of volumes may be indicated by ratios related to a designated volume (for example, the master volume of FIGS. 4A, 4B, and 4C) of the electronic device. At least some of the plurality of volumes may be determined to be identical to or different from one another. For example, the electronic device may determine a first volume corresponding to the first audio signal from among the plurality of volumes to be higher than the other volumes (for example, the designated volume). In this case, volumes of the other audio signals distinct from the first audio signal from among the plurality of audio signals may be determined to be lower than the first volume of the first audio signal.

Referring to FIG. 6, in operation 640, the electronic device according to various embodiments may mix the plurality of audio signals on the basis of the obtained volumes. Mixing the plurality of audio signals may refer to making the plurality of audio signals be outputted concurrently by synthesizing and/or combining the plurality of audio signals. Since the volume corresponding to the first audio signal from among the plurality of audio signals is determined to be higher than the volumes of the other audio signals based on operation 630, the plurality of audio signals may be mixed to enhance and/or highlight the first audio signal.

In an embodiment, when the electronic device identifies n audio signals in operation 610, the electronic device may synthesize the audio signals based on Equation 1 presented below:

$$\begin{cases} f_L(t) = \sum_{i=1}^{n} v_{Li} \times a_{Li}(t) \\ f_R(t) = \sum_{i=1}^{n} v_{Ri} \times a_{Ri}(t) \end{cases} \quad \text{Equation 1}$$

In an embodiment, the electronic device may perform mixing in operation 640 in each of one or more channels (for example, a stereo channel) included in the audio signal. Referring to Equation 1, the electronic device may obtain a synthesized audio signal $f_L$ (t) corresponding to the left channel of the stereo channel, and a synthesized audio signal $f_R$ (t) corresponding to the right channel. Embodiments are not limited to Equation 1 which is based on the stereo channel. When the number of channels increases, the number of channels included in the synthesized audio signal may also increase. In Equation 1, $a_{Li}(t)$, $a_{Ri}(t)$ may refer to an audio signal of a stereo channel identified from an i-th application. When an application providing an audio signal provides an audio signal which is based on a mono channel like voice communication, $a_{Li}(t)$, $a_{Ri}(t)$ may be identical to each other.

$v_{Li}$, $v_{Ri}$ in Equation 1 may refer to an i-th volume corresponding to the i-th application which is obtained by the electronic device based on operation 630. The first volume like $v_{Li}$ and $v_{Ri}$ may be determined on the basis of the number of channels of the audio signal. For example, when the electronic device supports other channels (for example, a mono channel, three or more channels based on a stereophonic sound) distinct from the stereo channel, the i-th volume may be determined to correspond to the number of channels. $v_{Li}$ and $v_{Ri}$ may be identical to each other, or may be determined to be different values according to setting of the electronic device and/or the user (for example, audio volume balance setting). As in Equation 1, the synthesized audio signal may be a sum of results of multiplying n audio signals by corresponding volumes.

Referring to FIG. 6, in operation 650, the electronic device according to various embodiments may output the mixed audio signals to at least one speaker. When the electronic device is connected with another electronic device like a Bluetooth speaker, the mixed audio signal may be outputted through at least one speaker (for example, the speaker 150 of FIGS. 1A and 1B) included in the electronic device, and/or another electronic device. When there are a plurality of speakers to receive the audio signals, the electronic device may output different audio signals through the plurality of speakers on the basis of one or more channels included in the audio signals. For example, when the electronic device includes a left channel speaker and a right channel speaker which are based on a stereo channel, the electronic device may transmit $f_L(t)$ in Equation 1 to the left channel speaker, and may transmit $f_R$ (t) to the right channel speaker.

Figure 7:
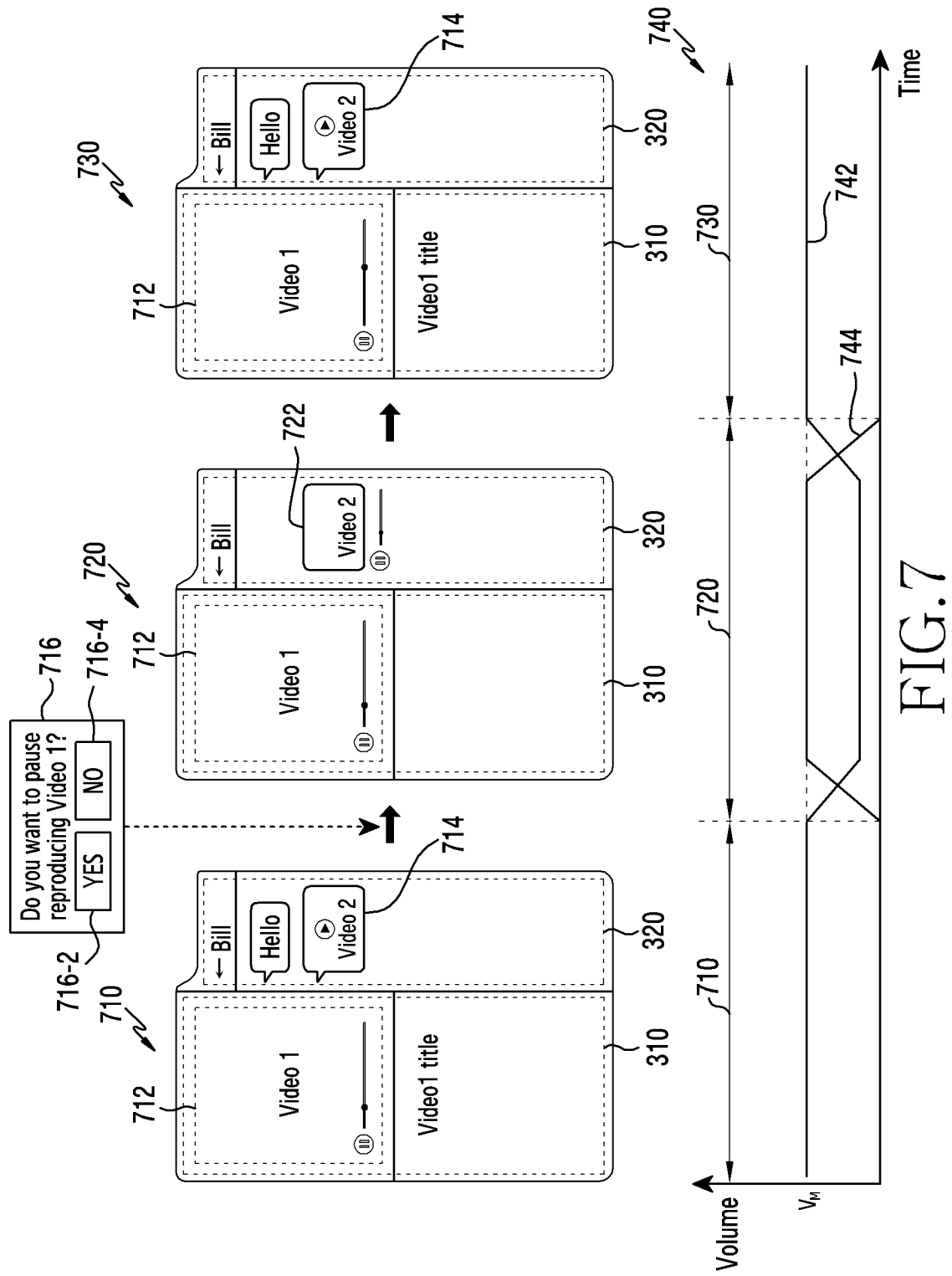
FIG. 7 is a view to illustrate an example of outputting a plurality of audio signals in an electronic device according to an embodiment of the disclosure.

FIG. 7 is a view illustrating an example of outputting a plurality of audio signals by an electronic device according to an embodiment of the disclosure.

The electronic device of FIG. 7 may correspond to the electronic device 101 of FIGS. 1A and 1B and/or FIGS. 2A, 2B, and 2C. The electronic device of FIG. 7 may display a plurality of execution screens identified from a plurality of applications within a display, on the basis of the split screen of FIGS. 3A and 3B.

Referring to FIG. 7, in a state 710, the electronic device according to an embodiment may display a plurality of execution screens corresponding to a plurality of applications, respectively, within a display (for example, the display 140 of FIGS. 2A and 2B, the first display 140-1 and/or the second display 140-2 of FIG. 2C). For example, the electronic device may display a first screen A provided from a first application and a second screen B provided from a second application on a first sub region 310 and a second sub region 320, respectively, which are distinct from each other in the display. For example, the first application may be an application for reproducing a multimedia content related to a VOD service. For example, the second application may be an application related to a messenger service.

While outputting a single audio signal, the electronic device may output the single audio signal at a designated volume like a master volume $V_M$ as in operation 510 of FIG. 5. For example, when only video Video 1 provided from the first application is outputted, the electronic device may output a first audio signal corresponding to the video at the master volume $V_M$ while outputting the video within a portion 712 of the first screen A.

While reproducing the video on the basis of the first application, the electronic device according to an embodiment may identify a user input for reproducing a second audio signal related to the second application distinct from the first application. The user input may be identified based on operation 520 of FIG. 5, for example. Referring to FIG. 7, in the state where the video based on the first application is outputted, the user of the electronic device may select a thumbnail 714 of video Video 2 received from another user, which is displayed within the second screen B. A visual element for reproducing a video, such as a replay button, may be superimposed on the thumbnail 714. The user input may include, for example, a user's operation of touching the thumbnail 714 and/or the replay button.

In response to the user input being identified, the electronic device according to an embodiment may switch from the state 710 to a state 720. Before switching to the state 720, the electronic device according to an embodiment may display a dialogue window 716 to confirm whether to pause outputting the audio signal (for example, the first audio signal) which is being outputted in the state 710. The electronic device according to an embodiment may learn user's selection related to the dialogue window 716, and may not display the dialogue window 716 and may operate based on the learned selection.

When the user selects (clicks and/or touches) an "Yes" button 716-2 within the dialogue window 716, the electronic device may not switch to the state 720. Alternatively, the electronic device may pause outputting the first audio signal, and may initiate outputting the video within the second screen B and outputting the second audio signal.

When the user selects (clocks and/or touches) a "No" button 716-4 within the dialogue window 176, the electronic device may switch from the state 710 to the state 720. In the state 720, the electronic device according to an embodiment may reproduce the video Video 2 provided from the second application within a portion 722 of the second screen B, while maintaining reproducing the video Video 1 provided from the first application within the portion 712 of the first screen A. The electronic device may output the first audio signal corresponding to the video Video 1 and the second audio signal corresponding to the video Video 2, concurrently, while reproducing the videos Video 1, Video 2 concurrently.

The electronic device may output the first audio signal and the second audio signal, concurrently, based on at least one of operations 530, 540 of FIG. 5 and/or the operations of FIG. 6. In this case, the electronic device may reduce a volume of the first audio signal and/or a volume of the second audio signal. For example, since the input performed lastly by the user is received within the second screen B, the electronic device may output the second audio signal provided from the second application corresponding to the second screen B at a volume higher than that of the other audio signal which is being reproduced (for example, the first audio signal).

In an embodiment, when mixing of the first audio signal and the second audio signal is ceased as the output of the first audio signal or the second audio signal is completed, the electronic device may restore the volume of the first audio signal and/or the volume of the second audio signal which is reduced. For example, when the reproduction of the video Video 2 is completed before the reproduction of the video Video 1, the electronic device may switch from the state 720 to a state 730. In the state 730, the electronic device may restore the volume of the first audio signal corresponding to the video Video 1 to the designated volume of the state 710, for example. The volume may be restored based on operations 550, 560 of FIG. 5, for example.

Referring to FIG. 7, a graph 740 visualizing changes in the volume of the first audio signal and the volume of the second audio signal when the electronic device switches between the states 710, 720, 730 is illustrated. Referring to the graph 740, a line 742 indicating a change in the volume of the first audio signal in each of the states 710, 729, 730, and a line 744 indicating a change in the volume of the second audio signal are illustrated.

Referring to a time period corresponding to the state 710 in the graph 740, when the first audio signal provided from the first application is identified, the electronic device according to an embodiment may output the first audio signal on the basis of the master volume $V_M$. As the electronic device enters into the state 720 thereafter, the volume of the first audio signal may be reduced to a volume lower than the master volume $V_M$.

Referring to a time period corresponding to the state 720 in the graph 740, the electronic device according to an embodiment may output the second audio signal on the basis of the master volume $V_M$. In the state 720, the first audio signal may be outputted at the volume lower than the master volume $V_M$, and the second audio signal may be outputted at the master volume $V_M$. As the output of the second audio signal is ceased thereafter, the electronic device may enter into the state 730 from the state 720.

Referring to a time period corresponding to the state 730 in the graph 740, the electronic device may restore the volume of the first audio signal to the master volume $V_M$. In another example, when the output of the first audio signal which has been outputted at the volume lower than the master volume $V_M$ is ceased, the electronic device may maintain the volume of the second audio signal at the master volume $V_M$.

Referring to the graph 740, when the electronic device switches between the states 710, 720, 730, the electronic device may gradually increase and/or reduce the volume on the basis of fade-up and/or fade-down.

Referring to FIG. 7, the electronic device according to an embodiment may determine the execution screen B with which the user lastly interacts (for example, a user input of selecting the thumbnail 714) as the main window. The electronic device may increase the volume of the second audio signal related to the main window to be higher than the volume of the other audio signal, based on operation 620 of FIG. 6. In another embodiment, the electronic device may determine the volume of the audio signal on the basis of priorities of applications.

Figure 8:
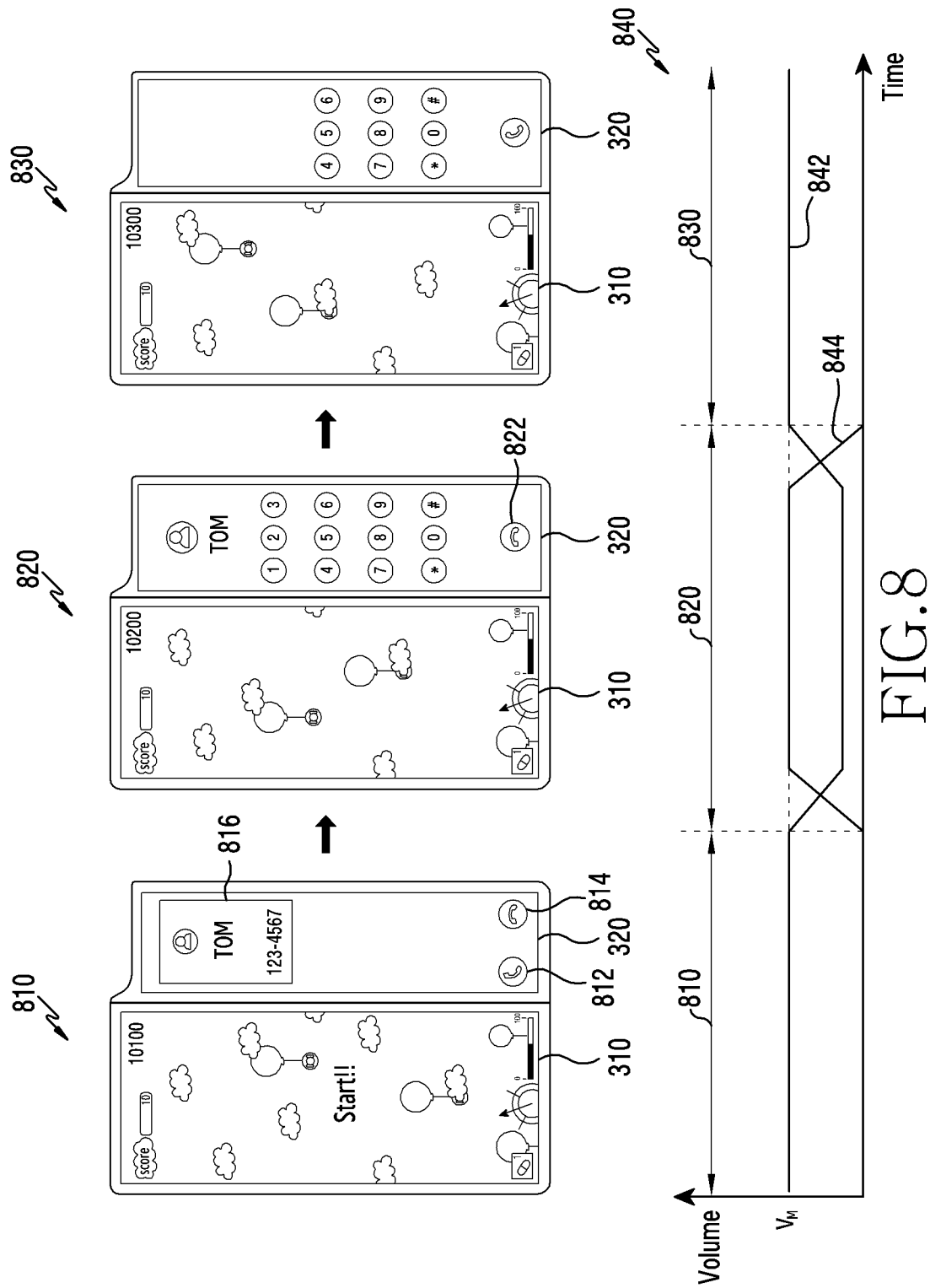
FIG. 8 is a view to illustrate another example of outputting a plurality of audio signals in an electronic device according to an embodiment of the disclosure.

FIG. 8 is a view to illustrate another example of outputting a plurality of audio signals by an electronic device according to an embodiment of the disclosure.

The electronic device of FIG. 8 may correspond to the electronic device 101 of FIGS. 1A and 1B and/or FIGS. 2A, 2B, and 2C. The electronic device of FIG. 8 may display a plurality of execution screens identified from a plurality of applications within a display, on the basis of the split screen of FIGS. 3A and 3B.

Referring to FIG. 8, in a state 810, the electronic device according to an embodiment may display a plurality of execution screens corresponding to a plurality of applications, respectively, within a display (for example, the display 140 of FIGS. 2A and 2B, the first display 140-1 and/or the second display 140-2 of FIG. 2C). For example, the electronic device may display a first screen A provided from a first application and a second screen B provided from a second application, on a first sub region 310 and a second sub region 320, respectively, which are distinct from each other on the display. For example, the first application may be a game application.

In the state 810, the electronic device may output a single audio signal provided from the first application which is the game application. The single audio signal may include background music and/or a sound effect of a game. For example, the electronic device may output the single audio signal at a designated volume like a master volume $V_M$. The single audio signal may be outputted based on operation 510 of FIG. 5, for example.

Referring to FIG. 8, the second application may be a call application. The electronic device may display the second screen B provided from the second application, which is the call application, in response to an incoming call, for example. Alternatively, the electronic device may display the second screen B in response to the call application being executed by a user in a split screen state (for example, the call application being selected on the basis of the input 404 in the state 400-2 of FIG. 4A).

Referring to the state 810 of FIG. 8, when the second screen B is displayed in response to the incoming call, the electronic device may display information related to the incoming call (for example, a name, a phone number and/or an image of another user corresponding to the incoming call) within a portion 816 of the second screen B. The electronic device may display a button 812 to accept the incoming call and a button 814 to reject the incoming call within the second screen B.

When the user presses the button 812, the electronic device according to an embodiment may switch from the state 810 to a state 820. In the state 820, the electronic device may display the first screen A provided from the first application and the second screen B provided from the second application on the first sub region 310 and the second sub region 320 of the display, respectively. According to the acceptance of the incoming call, the second screen B may include a UI related to the connected call. For example, the electronic device may display a button 812 to terminate the call connection within the second screen B.

As the electronic device switches to the state 820, the electronic device may mix a first audio signal (for example, including a game background sound) from the first application, and a second audio signal (for example, including a voice obtained from another electronic device of another user) from the second application. The first audio signal and the second audio signal may be mixed based on operations 530, 540 of FIG. 5 and/or the operations of FIG. 6. The electronic device may mix the first audio signal and the second audio signal on the basis of an operation of determining a volume of the first audio signal and a volume of the second audio signal differently, as in operation 530 of FIG. 5 and/or operation 630 of FIG. 6, for example.

The volume of the first audio signal and the volume of the second audio signal may be determined differently based on an audio signal corresponding to a main window being selected or identified as in operation 620 of FIG. 6. For example, a priority of the call application may be determined to be higher than a priority of the game application. The electronic device may identify the priorities of the call application and the game application by using information indicating the priorities which are based on types of the plurality of applications which are being executed. In this case, the electronic device may determine the volume of the second audio signal provided from the second application, which is the call application, to be higher than the volume of the first audio signal. For example, the electronic device may reduce the volume of the first audio signal provided from the first application, which is the game application of the low priority.

In an embodiment, when mixing of the first audio signal and the second audio signal is ceased as the output of the first audio signal or the second audio signal is completed, the electronic device may restore the reduced volume of the first audio signal and/or the reduced volume of the second audio signal. For example, when the call based on the second application is completed before the output of the first audio signal based on the game application is completed, the electronic device may switch from the state 820 to a state 830. In the state 830, the electronic device may restore the volume of the first audio signal to the designated volume of the state 810, for example. The volume may be restored based on operations 550, 560 of FIG. 5, for example.

Referring to FIG. 8, a graph 840 visualizing changes in the volume of the first audio signal and the volume of the second audio signal when the electronic device switches between the states 810, 820, 830 is illustrated. Referring to the graph 840, a line 842 indicating a change in the volume of the first audio signal in each of the states 810, 820, 830, and a line 844 indicating a change in the volume of the second audio signal are illustrated.

Referring to a time period corresponding to the state 810 in the graph 840, when the first audio signal provided from the first application is identified, the electronic device according to an embodiment may output the first audio signal based on the master volume $V_M$. As the electronic device enters into the state 820 thereafter, the volume of the first audio signal may be reduced to a volume which is lower than the master volume $V_M$.

Referring to a time period corresponding to the state 820 in the graph 840, the electronic device according to an embodiment may output the second audio signal on the basis of the master volume $V_M$. In the state 820, the first audio signal may be outputted at a volume lower than the master volume $V_M$, and the second audio signal may be outputted at the master volume $V_M$. As the output of the second audio signal is ceased (for example, the user of the electronic device touches the button 822) thereafter, the electronic device may enter into the state 830 from the state 820.

Referring to a time period corresponding to the state 830 in the graph 840, the electronic device may restore the volume of the first audio signal to the master volume $V_M$. In another example, when the output of the first audio signal which has been outputted at the volume lower than the master volume $V_M$ is ceased, the electronic device may maintain the volume of the second audio signal at the master volume $V_M$.

As described above, the electronic device according to various embodiments may determine the plurality of volumes corresponding to the plurality of audio signals, respectively, on the basis of a main window. The main window may be determined by a screen (for example, a screen activated by a latest user input) receiving a latest user input as shown in FIG. 7, and/or may be determined according to priorities of applications corresponding to screens displayed concurrently as shown in FIG. 8. However, embodiments are not limited thereto, and the main window may be determined based on other methods. The electronic device according to an embodiment may increase the volume of an audio signal corresponding to the main window from among the plurality of audio signals to be higher than volumes of the other audio signals, or may reduce the volumes of the other audio signals to be lower than the volume of the audio signal corresponding to the main window.

The electronic device according to an embodiment may adjust the respective volumes of the plurality of audio signals on the basis of a user input. Hereinafter, an operation of adjusting the volumes on the basis of the user input by the electronic device will be described with reference to FIGS. 9A, 9B, 10A, 10B, 10C, and 10D.

Figure 9A:
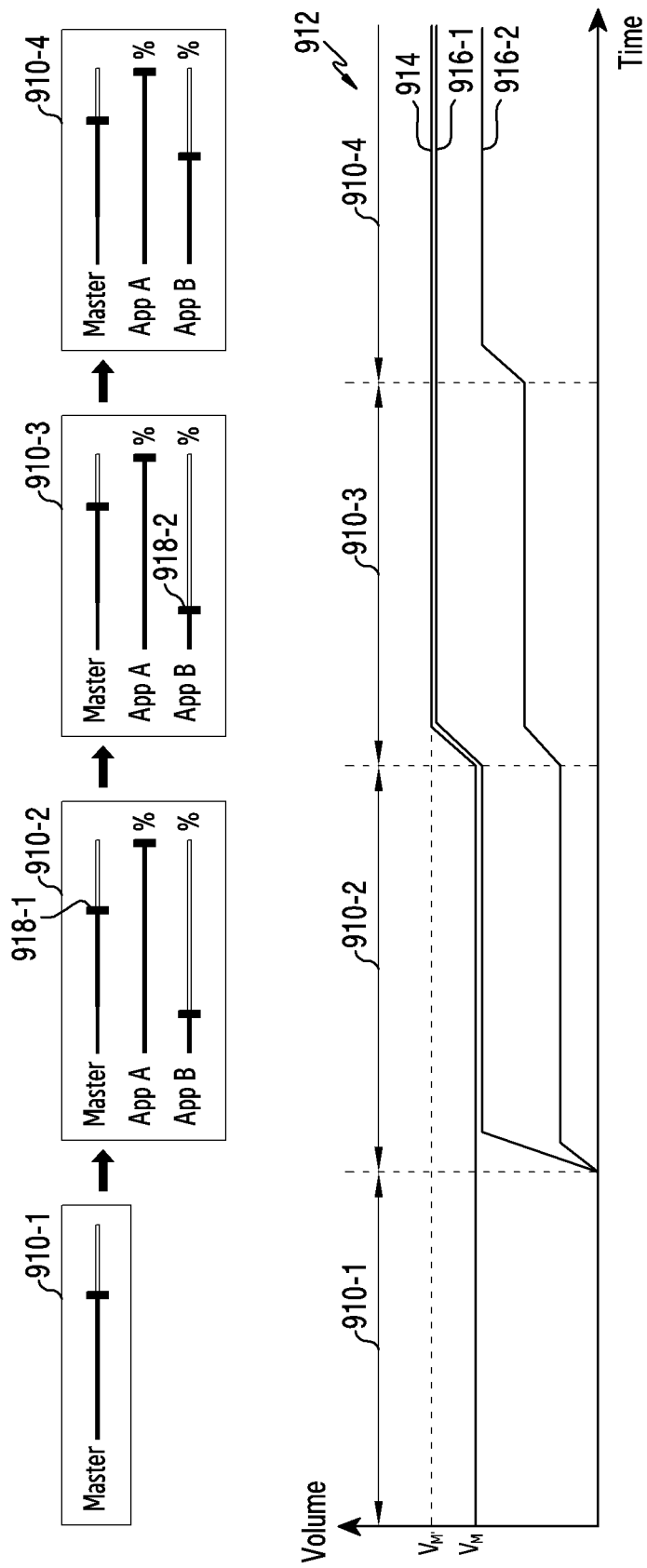
FIG. 9A is a view to illustrate a user interface (UI) displayed by an electronic device to adjust volumes of one or more audio signals according to an embodiment of the disclosure.
Figure 9B:
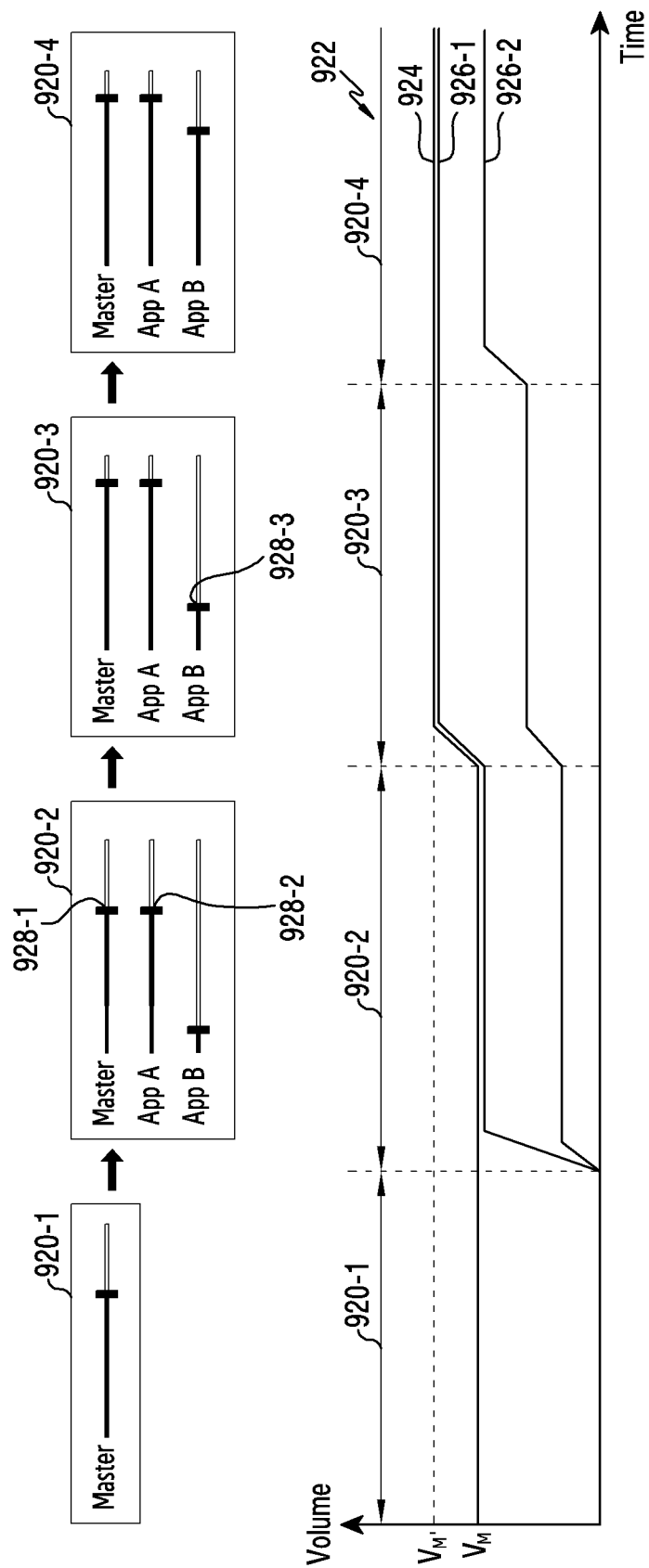
FIG. 9B is a view to illustrate a UI displayed by the electronic device to adjust volumes of one or more audio signals according to an embodiment of the disclosure.

FIGS. 9A and 9B are views to illustrate a UI displayed by an electronic device to adjust volumes of one or more audio signals according to various embodiments of the disclosure. The electronic device of FIGS. 9A and 9B may correspond to the electronic device 101 of FIGS. 1A and 1B and/or FIGS. 2A, 2B, and 2C. The electronic device of FIGS. 9A and 9B may perform at least one of the operations of FIGS. 5 and 6.

A user of the electronic device may perform a designated input for adjusting a volume. The designated input may include an input of pressing a designated button (for example, the button 240 of FIGS. 2A, 2B, and 2C) and/or an input of using a designated application like a setting application. Alternatively, the designated input may include an input of changing the number of audio signals (for example, a user input of touching the thumbnail 713 of FIG. 7 and/or the button 812 of FIG. 8). In response to the designated input being identified, the electronic device may display a screen and/or a UI for adjusting the volume. When the electronic device outputs a plurality of audio signals concurrently, the screen and/or UI for adjusting the volume may display visual elements for adjusting a plurality of volumes corresponding to the plurality of audio signals, respectively. The visual element for adjusting the volume may include, for example, a linear axis such as a seek bar and an indicator moving along the linear axis.

Referring to FIG. 9A, the electronic device may display a screen 910-1 on at least a portion of a display. For example, in response to the designated input being received in a single screen state, the electronic device may display the screen 910-1. The electronic device may display a visual element Master for adjusting a master volume $V_M$ within the screen 910-1. The user may adjust the master volume $V_M$ on the basis of the screen 910-1. When the electronic device outputs a single audio signal, a volume of the single audio signal may correspond to the master volume $V_M$.

While executing a plurality of applications concurrently, the electronic device may identify at least two audio signals provided from at least two applications from among the plurality of applications. In response to the at least two audio signals being identified, the electronic device according to an embodiment may combine the at least two audio signals based on the operations of FIGS. 5 and 6. The electronic device may combine the at least two audio signals on the basis of at least two volumes corresponding to the at least two audio signals, respectively.

While outputting the combined audio signals, the electronic device may display a screen 910-2 in response to the designated input being received. The electronic device may further display visual elements for adjusting the volumes of the at least two audio signals within the screen 910-2, along with the visual element for adjusting the master volume $V_M$. For example, when the electronic device identifies two audio signals provided from two applications App A, App B, the electronic device may further display visual elements App A, App B for adjusting the respective volumes of the two audio signals within the screen 910-2, along with the visual element Master for adjusting the master volume $V_M$.

In an embodiment, the electronic device may indicate a ratio between the volumes of the two audio signals and the master volume $V_M$ on the basis of the unit of percent (%) as shown on the screen 910-2. For example, the volume of the audio signal corresponding to the A application (App A) may be 100% of the master volume $V_M$. For example, the volume of the audio signal corresponding to the B application (App B) may be 20% of the master volume $V_M$. In this case, the A application (App A) may correspond to the main window of operation 620 of FIG. 6.

In response to a user input being performed within the screen 910-2, the electronic device may change at least one of the plurality of volumes displayed within the screen 910-2. For example, the user may drag an indicator 918-1 corresponding to the master volume $V_M$ within the screen 910-2. Referring to FIG. 9A, a screen 910-3 may correspond to a screen that is displayed after the drag of the indicator 918-1 within the screen 910-2 is detected. For example, when the user of the electronic device drags the indicator 918-1 in a direction of increasing the volume, the electronic device may increase the master volume $V_M$ on the basis of a position of the dragged indicator 918-1. Since the master volume $V_M$ increases, the volumes of the two audio signals corresponding to the two applications App A, App B may also increase.

Alternatively, the user may individually adjust the volumes of the two audio signals being outputted concurrently. For example, the user may drag an indicator 918-2 corresponding to the B application (App B) within the screen 910-3. Referring to FIG. 9A, a screen 910-4 may correspond to a screen that is displayed after the drag of the indicator 918-2 within the screen 910-3 is detected. For example, when the user of the electronic device drags the indicator 918-2 in a direction of increasing the volume, the electronic device may increase the volume of the audio signal provided from the B application (App B) on the basis of a position of the dragged indicator 918-2. In this case, the master volume $V_M$ and the volume of the audio signal corresponding to the A application (App A) may be maintained.

Referring to FIG. 9A, a graph 912 visualizing changes in volumes corresponding to the plurality of audio signals outputted by the electronic device when the electronic device displays the screens 910-1, 910-2, 910-3, 910-4 sequentially according to a user input is illustrated. Referring to the graph 912, a line 914 indicating a change in the master volume $V_M$, a line 916-1 indicating a change in the volume of the audio signal provided from the A application (App A), and a line 916-2 indicating a change in the volume of the audio signal provided from the B application (App B) are illustrated.

Referring to a time period between the state 910-2 and the state 910-3 in the graph 912, in response to the drag of the indicator 918-1 corresponding to the master volume $V_M$ being identified, the electronic device may increase the master volume $V_M$. The increase in the master volume $V_M$ may increase the volumes of the two audio signals corresponding to the two applications App A, App B. When the volumes of the two audio signals increase, a ratio between the volumes of the two audio signals may be maintained.

Referring to a time period between the state 910-3 and the state 910-4 in the graph 912, in response to the drag of the indicator 918-2 corresponding to the B application (App B) being identified, the electronic device may increase the volume of the audio signal provided from the B application (App B). In this case, since the master volume $V_M$ and the volume of the audio signal corresponding to the A application (App A) are maintained, the audio signal provided from the B application (App B) may be relatively highlighted.

Referring to FIG. 9B, screens 920-1, 920-2, 920-3, 920-4 displayed on at least a portion of the display of the electronic device, and a graph 922 indicating changes in volumes of one or more audio signals outputted by the electronic device in the screens 920-1, 920-2, 920-3, 920-4 are illustrated. In response to a designated input for adjusting a volume being received in a state where an audio signal is not provided from one or more applications being executed, or a single audio signal is provided, the electronic device may display the screen 920-1. Similarly to the screen 910-1 of FIG. 9A, a visual element Master displayed on the screen 920-1 may be a visual element for adjusting the master volume $V_M$.

When two or more audio signals are provided from two or more applications, the electronic device may increase the number of visual elements displayed within the screen 920-1. For example, when two audio signals are provided from two applications as shown on the screen 920-2, the electronic device may further display the visual element Master for adjusting the master volume $V_M$ and visual elements App A, App B for adjusting respective volumes of the two audio signals within the screen 920-2.

In an embodiment, the electronic device may indicate absolute values of a plurality of adjustable volumes as shown on the screen 920-2. For example, when the volume of the audio signal provided from the A application (App A) corresponding to the main window, and the master volume $V_M$ are identical to each other, the electronic device may make a position of an indicator 928-2 indicating the volume of the audio signal corresponding to the A application (App A) and a position of an indicator 928-1 indicating the master volume $V_M$ be matched to each other within the screen 920-2.

When the user drags the indicator 928-1 within the screen 920-2, the electronic device may change the master volume $V_M$. As the master volume $V_M$ is changed, the volumes of the two audio signals which are being outputted from the electronic device may also be changed. For example, the volume of the audio signal provided from the A application (App A) corresponding to the main window may be changed to correspond to the change of the master volume $V_M$. The volume of the audio signal provided form the B application (App B) corresponding to a window, which is distinct from the main window, may be changed on the basis of the change of the master volume $V_M$, such that a ratio between the volumes of the two audio signals mixed by the electronic device can be maintained.

The screen 920-3 may correspond to a screen that is displayed after the drag of the indicator 928-1 within the screen 920-2 is detected. For example, when the user drags the indicator 928-1 in a direction of increasing the volume, the electronic device may increase the master volume $V_M$ on the basis of a position of the dragged indicator 928-1. When increasing the master volume $V_M$, the electronic device may increase the volumes of the two audio signals corresponding to the two applications App A, App B.

Alternatively, the user may individually adjust the volumes of the two audio signals being outputted concurrently. For example, the user may drag an indicator 928-3 corresponding to the B application (App B) within the screen 920-3. Referring to FIG. 9B, the screen 920-4 may correspond to a screen that is displayed after the drag of the indicator 928-3 is detected. For example, when the user of the electronic device drags the indicator 928-3 in a direction of increasing the volume, the electronic device may increase the volume of the audio signal provided from the B application (App B) on the basis of a position of the dragged indicator 928-3. Similarly to FIG. 9A, the master volume $V_M$ and the volume of the audio signal corresponding to the A application (App A) may be maintained.

Changes in volumes corresponding to the plurality of audio signals outputted by the electronic device when the electronic device displays the screens 910-1, 920-2, 920-3, 920-4 sequentially according to a user input are illustrated within the graph 922. Referring to the graph 922, a line 924 indicating a change in the master volume $V_M$, a line 926-1 indicating a change in the volume of the audio signal provided from the A application (App A), and a line 926-2 indicating a change in the volume of the audio signal provided from the B application (App B) are illustrated.

Referring to a time period between the state 920-2 and the state 920-3 in the graph 922, in response to the drag of the indictor 928-1 corresponding to the master volume $V_M$ being identified, the electronic device may increase the master volume $V_M$. The increase in the master volume $V_M$ may increase the volumes of the two audio signals corresponding to the two applications App A, App B. The volumes of the two applications may increase to maintain the ratio between the volumes of the two audio signals.

Referring to a time period between the state 920-3 and the state 920-4 in the graph 922, in response to the drag of the indicator 928-3 corresponding to the B application (App B) being identified, the electronic device may increase the volume of the audio signal provided from the B application (App B). In this case, since the master volume $V_M$ and the volume of the audio signal corresponding to the A application (App A) are maintained, the audio signal provided from the B application (App B) may be relatively highlighted.

The screen that is displayed in response to the designated input for adjusting the volumes of the plurality of audio signals mixed by the electronic device is not limited to the examples of FIGS. 9A and 9B. Hereinafter, various examples of a screen displayed by the electronic device in response to the designated input will be described with reference to FIGS. 10A, 10B, 10C, and 10D.

FIGS. 10A, 10B, 10C, and 10D are views to illustrate a UI displayed by an electronic device to adjust respective volumes of one or more audio signals according to various embodiments of the disclosure.

The electronic device 101 of FIGS. 10A, 10B, 10C, and 10D may correspond to the electronic device 101 of FIGS. 1A and 1B and/or FIGS. 2A, 2B, and 2C. The electronic device of FIGS. 10A, 10B, 10C, and 10D may perform at least one of the operations of FIGS. 5 and 6.

Referring to FIGS. 10A, 10B, 10C, and 10D, the electronic device 101 according to an embodiment may display a split screen. The split screen displayed by the electronic device 101 within a display (for example, the first display 140-1 of FIG. 2C) may correspond to at least a portion of a display region of the display (for example, the first region and/or the entire display region). The electronic device 101 according to various embodiments may display a plurality of screens (for example, at least two of the screen A, the screen B, and the screen C) corresponding to a plurality of applications, respectively, which are independently executed, with the split screen. The state where the electronic device 101 displays the split screen as shown in FIGS. 10A, 10B, 10C, and 10D may correspond to at least one of the states 400-3, 400-5 of FIG. 4B, the state 400-7 of FIG. 4C, the state 520 of FIG. 5, or the states 710, 730 of FIG. 7.

A user of the electronic device 101 may perform a designated input for adjusting a volume of at least one speaker (for example, the speaker 150 of FIGS. 1A and 1B and/or a speaker included in another electronic device connected with the electronic device 101, such as a Bluetooth speaker). The designated input may include an input of pressing the button 240 which is viewable through any one surface of the housing of the electronic device 101 (for example, a left surface and/or a right surface of the housing).

Figure 10A:
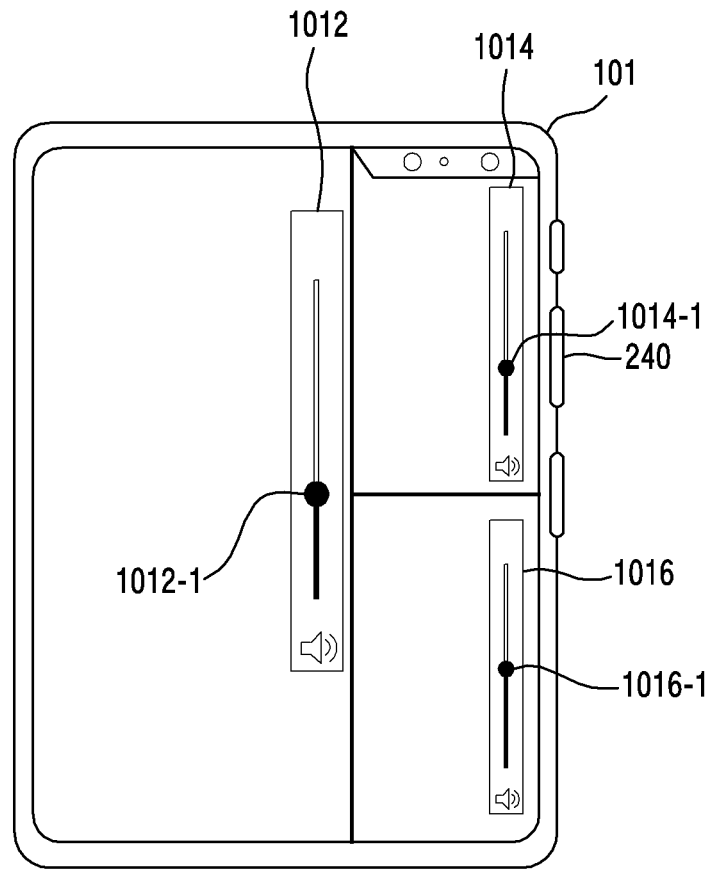
FIG. 10A is a view to illustrate a UI displayed by an electronic device to adjust volumes of one or more audio signals according to an embodiment of the disclosure.

Various examples of the UI displayed by the electronic device according to various embodiments in response to the designated input being received with the split screen being displayed within the display are illustrated in FIGS. 10A, 10B, 10C, and 10D. Referring to FIG. 10A, the electronic device 101 according to an embodiment may display a window (for example, windows 1012, 1014, 1016) for controlling a volume of an audio signal identified from an application corresponding to a screen in each of the plurality of screens (the screen A, the screen B, and the screen C) included in the split screen. The electronic device 101 may display an indicator (for example, indicators 1012-1, 1014-1, 1016-1) for adjusting the volume within the window. A position of the indicator within the window may indicate the volume of the audio signal corresponding to the window.

The user may adjust the volume by dragging the indicator and/or pressing the button 240. For example, when the user drags the indicator 1012-1 of the window 1012 displayed within the screen A, the electronic device 101 may adjust a volume of an audio signal provided from an application corresponding to the screen A, according to a position of the indicator 1012-1 which is moved by the drag. Even when the user drags any one of the indicators 1014-1, 1016-1, the electronic device may selectively adjust volumes of audio signals provided from corresponding applications.

In another example, when the user presses at least a portion of the button 240 of the electronic device 101 (for example, the portion 240-1 of FIG. 2C), the electronic device 101 may adjust the volumes of all audio signals (and/or a master volume) identified from all applications corresponding to all screens A, B, C included in the split screen. In response to the volumes of all audio signals being adjusted, the electronic device 101 may adjust positions of all indicators 1012-1 1014-1, 1016-1 displayed within the display.

Figure 10B:
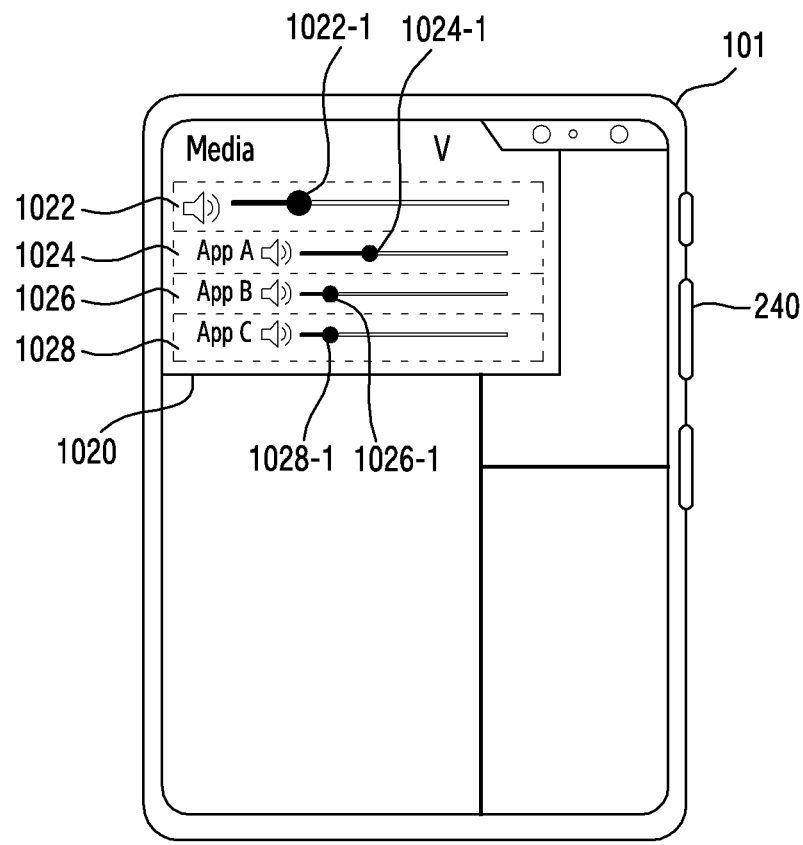
FIG. 10B is a view to illustrate a UI displayed by the electronic device to adjust volumes of one or more audio signals according to an embodiment of the disclosure.

Referring to FIG. 10B, the electronic device 101 according to an embodiment may display a window 1020 superimposed on the split screen. The electronic device 101 may display a visual element for adjusting the master volume $V_M$ within a portion 1022 of the window 1020. When a plurality of audio signals are provided from a plurality of audio applications, the electronic device 101 may display a visual element for adjusting a volume corresponding to each of the plurality of audio signals within the window 1020. For example, visual elements for individually adjusting the volumes of audio signals provided from different applications (an A application, a B application, and a C application) may further be displayed on portions 1024, 1026, 1028 of the window 1020.

Similarly to FIG. 10A, the user may adjust any one of the master volume $V_M$ and the plurality of volumes corresponding to the plurality of audio signals by dragging any one of indicators 1022-1, 1024-1, 1026-1, 1028-1 displayed on the different portions 1022, 1024, 1026, 1028 of the window 1020. For example, when the user drags the indicator 1022-1 corresponding to the master volume $V_M$, the electronic device 101 may adjust the master volume $V_M$ and the volumes of all audio signals on the basis of a position of the dragged indicator 1022-1. In another example, when the user drags any one of the indicators 1024-1, 1026-1, 1028-1, the electronic device 101 may adjust only the volume of the audio signal corresponding to the dragged indicator.

Figure 10C:
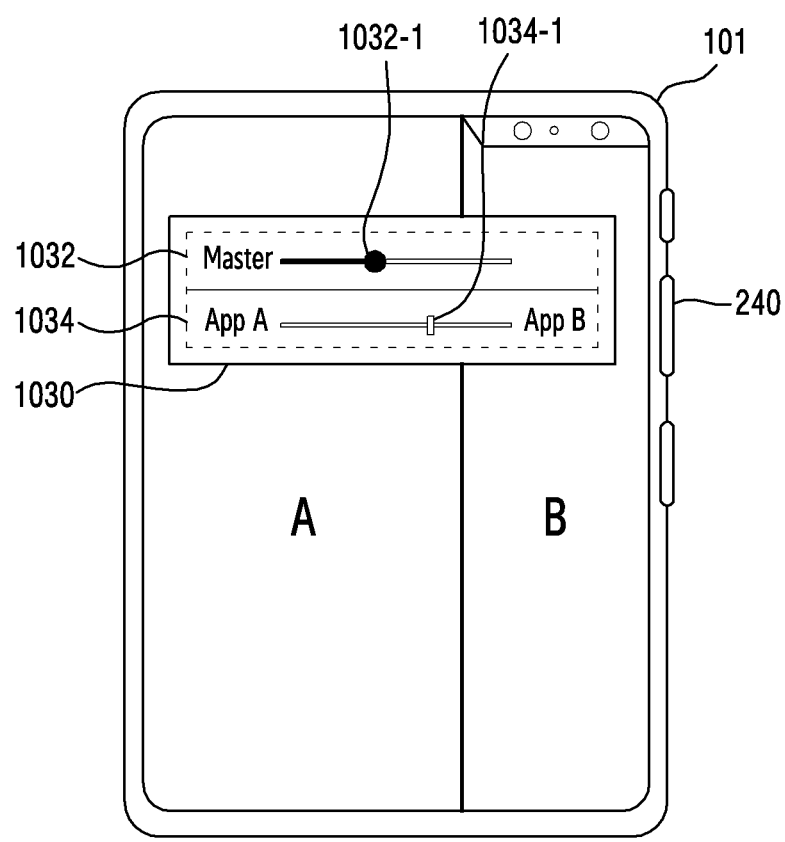
FIG. 10C is a view to illustrate a UI displayed by the electronic device to adjust volumes of one or more audio signals according to an embodiment of the disclosure.

Referring to FIG. 10C, the electronic device 101 according to an embodiment may display a window 1030 superimposed on the split screen. A portion 1032 of the window 1030 may include a visual element for adjusting the master volume $V_M$. When a plurality of audio signals are provided from a plurality of audio applications, the electronic device 101 may display a visual element for adjusting a ratio of the volumes of the plurality of audio signals within a portion 1034 of the window 1030. For example, the electronic device 101 may display a visual element for adjusting a ratio of the volumes on the basis of a designated linear axis.

The user may adjust any one of the master volume $V_M$ and the ratio of the volumes of the plurality of audio signals by dragging any one of the indicators 1032-1, 1034-2 displayed on the different portions 1032, 1034. For example, when the user drags the indicator 1032-1 corresponding to the master volume $V_M$, the electronic device 101 may adjust the master volume $V_M$ and the volumes of all of the audio signals on the basis of a position of the dragged indicator 1032-1.

In another example, when the user drags the indicator 1034-1, the electronic device 101 may adjust a ratio of an audio signal provided from the A application and an audio signal provided from the B application, on the basis of the dragged indicator 1034-1. The electronic device 101 according to an embodiment may determine the ratio of the audio signal provided from the A application and the audio signal provided from the B application, on the basis of a position of the indicator 1034-1 within the designated axis.

Figure 10D:
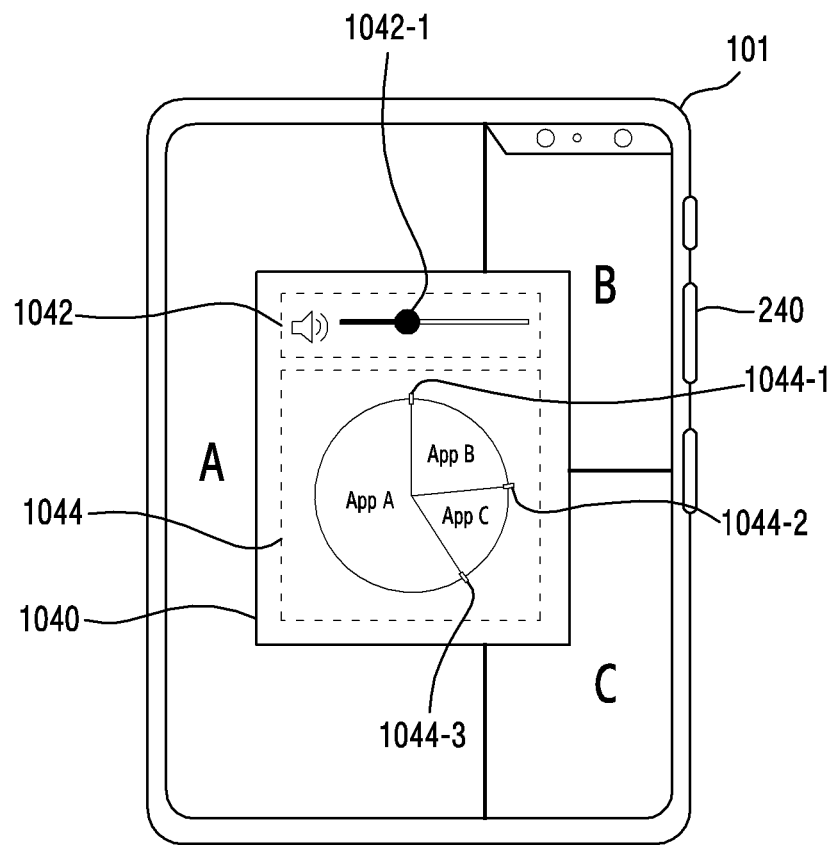
FIG. 10D is a view to illustrate a UI displayed by the electronic device to adjust volumes of one or more audio signals according to an embodiment of the disclosure.

Referring to FIG. 10D, the electronic device 101 according to an embodiment may display a window 1040 superimposed on the split screen. The electronic device 101 may display a visual element for adjusting the master volume $V_M$ within a portion 1042 of the window 1040. The electronic device 101 may display a visual element for adjusting a ratio of a plurality of audio signals within a portion 1044 of the window 1040. Unlike in FIG. 10C, the electronic device 101 may display a visual element for adjusting the ratio of the volumes on the basis a pie graph, one or more fan shapes, and/or arcs. Referring to FIG. 10D, when the electronic device 101 receives three audio signals from three applications, the electronic device 101 may display a visual element which is based on three arcs to adjust a ratio between the three audio signals within the portion 1034.

The user may adjust any one of the master volume $V_M$ and the ratio of the volumes of the plurality of audio signals by dragging any one of indicators 1042-1, 1044-1, 1044-2, 1044-3 displayed within the window 1040. For example, when the user drags the indicator 1042-1 corresponding to the master volume $V_M$, the electronic device 101 may adjust the master volume $V_M$ and the volumes of all of the audio signals, on the basis of a position of the dragged indicator 1042-1.

In another example, when the user drags any one of the indicators 1044-1, 1044-2, 1044-3, the electronic device 101 may change the ratio of the volumes of the plurality of audio signals on the basis of positions of the indicators changed by the drag. For example, the electronic device may change the ratio of the volumes of the plurality of audio signals, on the basis of a ratio of areas of the plurality of fan shapes distinct from one another by the indicators 1044-1, 1044-2, 1044-3, and/or a ratio of the plurality of arcs.

On the basis of a designated input being received while providing a single screen within the first region (or the entire display region of the display), the electronic device 101 according to various embodiments may switch from the single screen to the split screen. In other words, the electronic device 101 may display the split screen switched from the single screen in response to the designated input being received. In the state where the split screen is displayed, the electronic device according to an embodiment may identify one or more audio signals from a plurality of applications related to the display of the split screen. In response to the plurality of audio signals being identified from the plurality of applications, the electronic device 101 according to an embodiment may output the plurality of audio signals concurrently. When outputting the plurality of audio signals concurrently, the electronic device 101 according to an embodiment may mix the plurality of audio signals on the basis of volumes corresponding to the plurality of audio signals. Hereinafter, an operation of the electronic device 101 switching between a single screen and a split screen on the basis of the designated input will be described with reference to FIG. 11.

Figure 11:
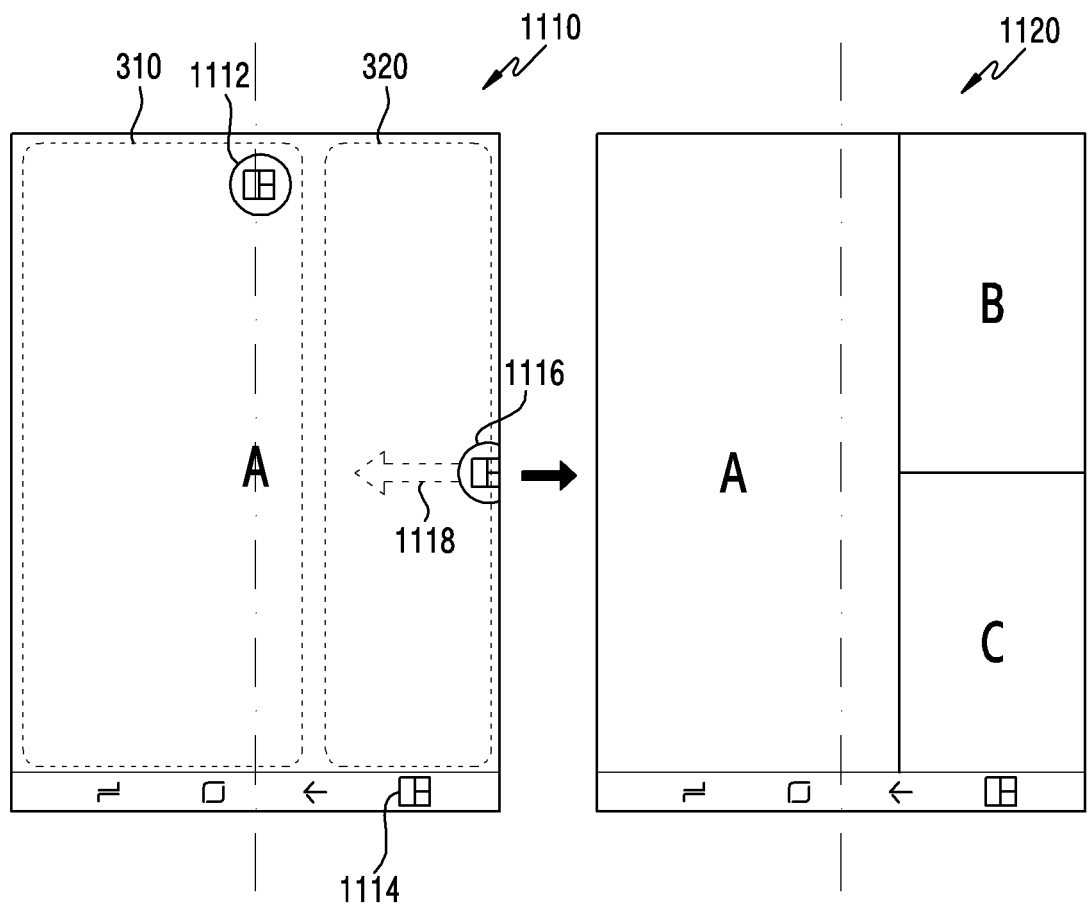
FIG. 11 is a view illustrating an example of switching from a state where a single screen is displayed to a state where a split screen is displayed in an electronic device according to an embodiment of the disclosure.
Figure 11:
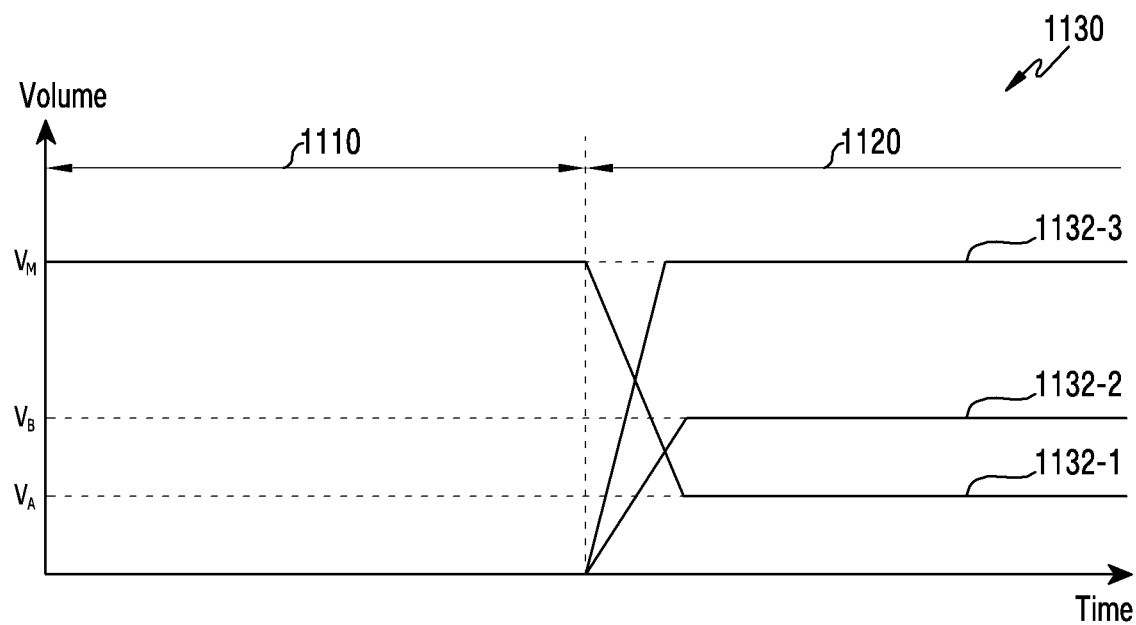

FIG. 11 is a view illustrating an example of switching a state where a single screen is displayed in an electronic device to a state where a split screen is displayed according to an embodiment of the disclosure.

The electronic device of FIG. 11 may correspond to the electronic device of FIGS. 1A and 1B and/or FIGS. 2A, 2B, and 2C. The electronic device of FIG. 11 may display a plurality of execution screens identified from a plurality of applications within a display, on the basis of the split screen of FIGS. 3A and 3B. When the electronic device switches between the state where the single screen is displayed and the state where the split screen is displayed, the electronic device according to various embodiments may switch between a state where a single audio signal of a single application corresponding to the single screen is reproduced, and a state where one or more audio signals of a plurality of applications corresponding to the split screen are reproduced.

Referring to FIG. 11, in a state 1110, the electronic device according to an embodiment may display a first screen A within the first region including the first sub region 310 and the second sub region 320. According to embodiments, the first region may correspond to the other portion of the display region of the display except for the second region and/or the third region, or may correspond to the entire display region. In the state 1110, the electronic device according to an embodiment may switch from the state 1110 to a state 1120 and/or enter into the state 1120 in response to a designated input for entering into the split screen from the single screen being received.

In an embodiment, the state 1120 may refer to the state where the split screen is provided (for example, the states 410, 420, 430, 440, 450 of FIGS. 3A and 3B, and FIGS. 4A, 4B, and 4C). In an embodiment, the state 1120 may refer to a state where the first screen A is displayed within the first sub region 310, and a second screen B and a third screen C which are distinct from the first screen A are displayed within the second sub region 320. When the split screen has been displayed before the state 1110, switching from the state 1110 to the state 1120 may refer to restoring to the split screen which has been displayed before the state 1110.

The designated input may be implemented in various methods. The electronic device according to an embodiment may further display at least one of objects 1112, 1116 which are superimposed on the first screen A and are usable to switch to the split screen in the state 1110. In response to a touch input on at least one of the displayed objects 1112, 1116 being received, the electronic device may switch from the state 1110 to the state 1120. The touch input may include a drag input of dragging the object 1116 in a designated direction 1118.

The electronic device according to an embodiment may receive a drag input going from an edge portion of the first region toward another portion of the first region in the state 1110. In response to the drag input being received, the electronic device may switch from the state 1110 to the state 1120. In the state 1110, the electronic device according to an embodiment may further display an object 1114 within the second region (for example, a control region) under the first region. The object 1114 may be usable to switch to the split screen. In response to a touch input on the object 1114 being received, the electronic device may switch from the state 1110 to the state 1120.

In the state 1110, the electronic device according to an embodiment may operate on the basis of a first application corresponding to the first screen A. For example, the electronic device may display a UI and/or a content identified from the first application on the first screen A, and/or may output a first audio signal identified from the first application.

While maintaining outputting the first audio signal after switching from the state 1110 to the state 1120, the electronic device may display the second screen B and the third screen C within the second sub region 320. In the state 1120, the electronic device according to an embodiment may operate on the basis of a plurality of applications which are being concurrently executed, for example, the first application corresponding to the first screen A, a second application corresponding to the second screen B, and a third application corresponding to the third screen C.

The electronic device operating on the basis of the plurality of applications which are being concurrently executed may refer to displaying execution screens identified from the plurality of applications within different regions of the display, and/or outputting audio signals identified from the plurality of applications, concurrently. For example, when at least one other audio signal (for example, a second audio signal identified from the second application and/or a third audio signal identified from the third application) distinct from the first audio signal is identified from at least one of the second application corresponding to the second screen B or the third application corresponding to the third screen C, the electronic device according to an embodiment may output the identified at least one other audio signal, concurrently, with the first audio signal.

Referring to FIG. 11, a graph 1130 visualizing changes in volumes corresponding to one or more audio signals identified by the electronic device 101 when the electronic device switches between the states 1110, 1120 is illustrated. Referring to the graph 1130, a line 1132-1 indicating a change in the volume of the first audio signal in each of the states 1110, 1120, a line 1132-2 indicating a change in the volume of the second audio signal, and a line 1132-3 indicating a change in the volume of the first audio signal are illustrated.

When the first audio signal is identified from the first application corresponding to the first screen A in the state 1110, the electronic device according to an embodiment may output the identified first audio signal. Referring to a time period corresponding to the state 1110 in the graph 1130, the electronic device according to an embodiment may output the first audio signal by controlling at least one speaker (for example, the speaker 150 of FIGS. 1A and 1B) on the basis of a designated volume such as a master volume $V_M$.

Referring to FIG. 11, in response to a touch input on at least one of the displayed objects 1112, 1114, 1116 being received, the electronic device may enter into the state 1120 from the state 1110. In the state 1120, the electronic device may maintain reproducing the first audio signal which has been reproduced in the previous state 1110. For example, when any audio signal is not identified from the second application and the third application corresponding to the second screen B and the third screen C, respectively, which are additionally displayed in the state 1120, the electronic device may maintain outputting the first audio signal on the basis of the master volume $V_M$.

In another example, when the second audio signal and the third audio signal are identified from the second application and the third application, respectively, the electronic device may reproduce the first audio signal, the second audio signal, and the third audio signal concurrently. For example, the electronic device may reproduce the audio signals by synthesizing and/or mixing the first audio signal, the second audio signal, and the third audio signal.

Referring to a time period corresponding the state 110 in the graph 1130, the electronic device according to an embodiment may synthesize the first audio signal, the second audio signal, and the third audio signal, on the basis of a first volume $V_A$ corresponding to the first audio signal, a second volume $V_B$ corresponding to the second audio signal, and a third volume $V_M$ corresponding to the third audio signal. As the electronic device enters into the state 1120 from the state 1110, the volume of the first audio signal may be reduced to the first volume $V_A$ from the master volume $V_M$. The synthesized audio signals may be outputted through at least one speaker included in the electronic device and/or another electronic device (for example, a Bluetooth speaker) connected with the electronic device wiredly and/or wirelessly.

When the display is configured with a foldable display and/or a flexible display (for example, the first display 140-1 of FIG. 2C), the electronic device according to an embodiment may switch the state of the electronic device on the basis of a change of a posture and/or a shape of the electronic device 101. In various embodiments, the change of the posture of the electronic device may include a change of an angle between a plurality of housings (for example, the first housing 210 and the second housing 220 of FIG. 2C) included in the electronic device. Hereinafter, an operation of the electronic device according to an embodiment switching the state on the basis of the change of the angle will be described in detail with reference to FIG. 12. The operation of switching the state may include an operation of switching from the state 1120 to other state distinct from the state 1120.

Figure 12:
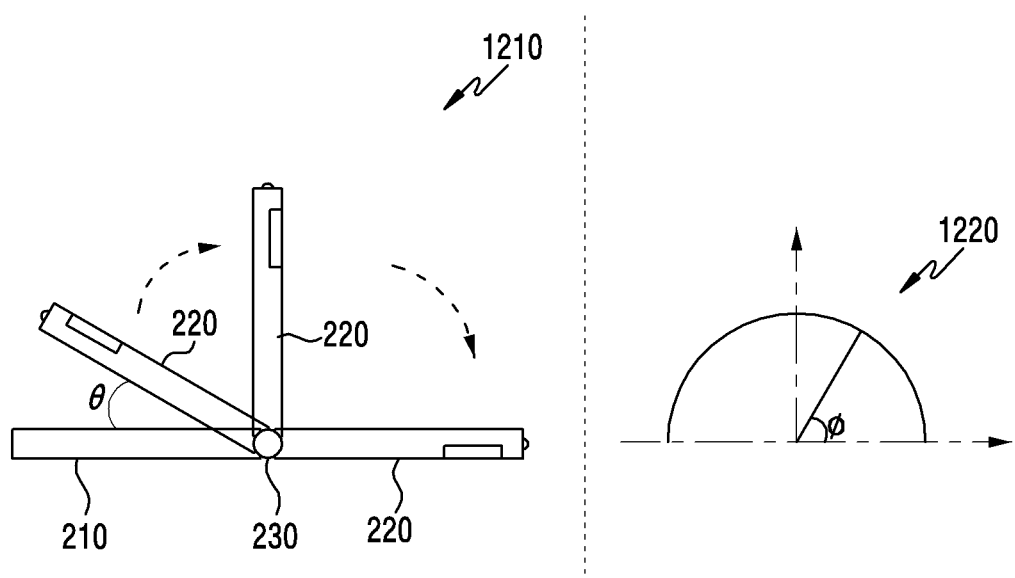
FIG. 12 is a view illustrating an example of changing of a posture of an electronic device according to an embodiment of the disclosure.

FIG. 12 is a view illustrating an example of a change of a posture of an electronic device according to an embodiment of the disclosure.

The electronic device of FIG. 12 may correspond to the electronic device 101 of FIGS. 1A and 1B and/or FIGS. 2A, 2B, and 2C. The electronic device of FIG. 12 may display a plurality of execution screens identified from a plurality of applications within a display, on the basis of the split screen of FIGS. 3A and 3B.

For example, the electronic device of FIG. 12 may include the plurality of housings (the first housing 210 and the second housing 220) of FIG. 2C. The electronic device of FIG. 12 may include the plurality of displays (the first display 140-1 and the second display 140-2) of FIG. 2C. Hereinafter, an operation of switching the state of the electronic device on the basis of an embodiment (for example, an electronic device including an in-folding flexible display) in which at least one display included in the electronic device is substantially occluded by rotation of the plurality of housings (the first housing 210 and the second housing 220) will be described.

Referring to FIG. 12, since the first housing 210 and the second housing 220 are rotatably connected with each other through the folding portion 230 as in a state 1210, the electronic device may have various postures and/or various shapes according to an angle between the first housing 210 and the second housing 220. The angle between the first housing 210 and the second housing 220 may be defined as shown in a graph 1220.

The electronic device according to an embodiment may control at least one display included in the electronic device, on the basis of an angle (θ) between the first housing 210 and the second housing 220. For example, in a state where the angle between the first housing 210 and the second housing 220 falls out of a designated range (for example, a range from Φ to 180 degrees (π) in the graph 1220), the electronic device according to an embodiment may activate the first display (for example, the first display 140-1 of FIG. 2C) disposed from the front surface (for example, the first surface) of the first housing 210 to the front surface (for example, the third surface) of the second housing 220.

For example, in a state where the angle between the first housing 210 and the second housing 220 falls within the designated range (for example, a range from 0 degrees (0) to Φ in the graph 1220), the electronic device according to an embodiment may inactivate the first display and may activate the second display (for example, the second display 140-2 of FIG. 2C) distinct from the first display. The electronic device according to various embodiments may identify a change of the angle between the first housing 210 and the second housing 220 of the electronic device by using a sensor circuit (for example, the sensor circuit 180 of FIGS. 1A and 1B).

The electronic device according to an embodiment may selectively activate and/or control at least one of the first display or the second display, on the basis of at least one of the angle or the designated range. An operation of the electronic device providing a split screen by selectively controlling at least one of the first display or the second display according to various embodiments will be described in detail with reference to FIGS. 13 and 14.

In an embodiment, a flexible display which is included in the electronic device may be bent by rotation of the plurality of housings (the first housing 210 and the second housing 220) without being occluded (for example, an electronic device including an out-folding flexible display). In this case, the electronic device may control the flexible display in a method distinct from that in the embodiment including the above-described in-folding flexible display. For example, in the state where the angle between the first housing 210 and the second housing 220 falls out the designated range (for example, the range from Φ to 180 degrees (π) in the graph 1220), the electronic device may activate the entire display region of the flexible display.

In the state where the angle between the first housing 210 and the second housing 220 falls within the designated range (for example, the range from 0 degree (0) to Φ in the graph 1220), the electronic device may activate a portion of the display region of the flexible display, and may inactivate the other portion of the display region distinct from the portion. The activated portion of the display region may correspond to a portion of the display region that is relatively far from the surface of the earth, and/or a portion of the display region that the user of the electronic device gazes at. An operation of the electronic device including the out-folding flexible display providing a split screen by controlling the flexible display will be described in detail with reference to FIG. 14.

Figure 13:
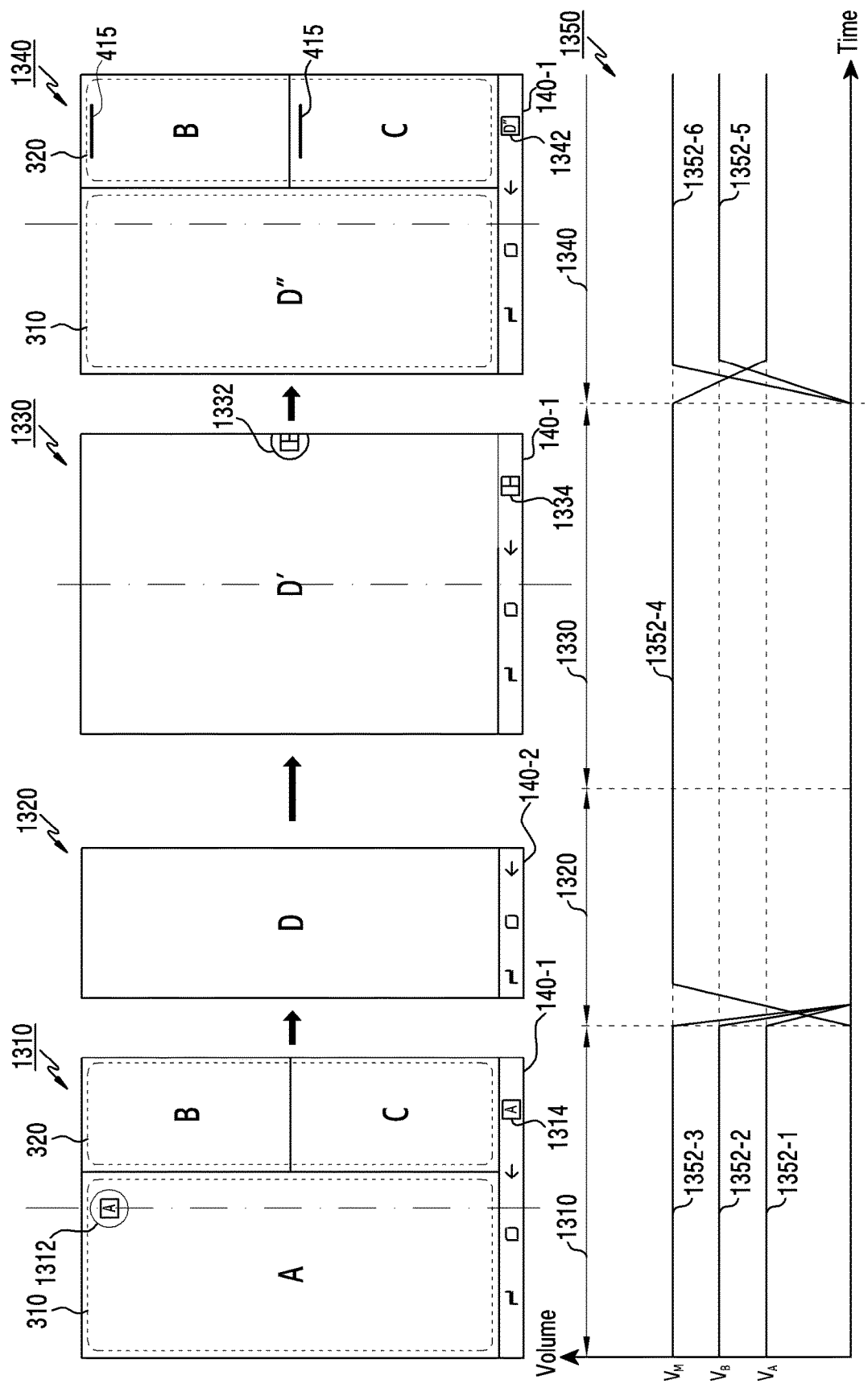
FIG. 13 is a view illustrating an example of switching a state according to a posture of an electronic device and/or a user input in the electronic device according to an embodiment of the disclosure.

FIG. 13 is a view illustrating an example of switching a state according to a posture of an electronic device and/or a user input in the electronic device according to an embodiment of the disclosure.

The electronic device of FIG. 13 may correspond to the electronic device 101 of FIGS. 1B and/or 2C. For example, the first display 140-1 and the second display 140-2 of FIG. 13 may correspond to the first display 140-1 and the second display 140-2 of FIG. 1B and/or FIG. 2C, respectively. Switching a state of the electronic device may include switching a screen displayed within the display (for example, switching between a single screen and a split screen), and switching an audio signal outputted from a speaker. Switching the audio signal may include entering into a state where audio signals are mixed on the basis of a screen and/or an application displayed within the display.

Referring to FIG. 13, in a state 1310, the electronic device according to an embodiment may display a first screen A within the first sub region 310, and may display a second screen B within at least a portion of the second sub region 320 and may display a third screen C within at least a portion of the second sub region 320. The first screen A, the second screen B, and the third screen C may correspond to different applications which are being executed in the electronic device of the state 1310 (for example, a first application, a second application, and a third application). The state 1310 may correspond to a state where a split screen is displayed. For example, the state 1310 may correspond to the states 410, 420, 430, 440, 450 of FIGS. 4A, 4B, and 4C, and the state 1120 of FIG. 11.

The electronic device according to an embodiment may further display at least one of objects 1312, 1314 for switching to a single screen in the state 1310. For example, the electronic device may display the object 1312 superimposed or floating over the first region, or may display the object 1314 superimposed or floating over the second region. In various embodiments, the object 1312 may be moved by a drag input. In various embodiments, the object 1312 may further include a thumbnail image to show the first screen to be displayed within the first region configured with the first sub region 310 and the second sub region 320.

In response to an input of selecting at least one of the objects 1312, 1314 being received in the state 1310, the electronic device according to an embodiment may switch to or may enter into other state (for example, the state 1110 of FIG. 11) where a single screen is displayed from the state 1310 where the split screen is displayed. In various embodiments, the other state may refer to a state where the first screen is displayed within the entire first region configured with the first sub region 310 and the second sub region 320.

For example, the user of the electronic device may perform a designated input of changing a posture and/or a shape of the electronic device in the state 1310 where the split screen is displayed within the first display 140-1. The designated input may include a user's operation of rotating the plurality of housings of the electronic device about the folding portion of the electronic device to contact portions of the first display 140-1. Due to the designated input, the angle between the plurality of housings may be reduced to be within the designated range of FIG. 12 (for example, the range from 0 degree (0) to Φ in the graph 1220).

In response to the designated input being received, the electronic device according to an embodiment may switch from the state 1310 to a state 1320. When switching from the state 1310 to the state 1320, the electronic device according to an embodiment may remove frame data stored in a GRAM, which is operatively connected with all of the first display 140-1 and the second display 140-2, in order to prevent distortion of the frame data caused by the frame data based on the first display 140-1 being immediately displayed on the second display 140-2.

In the state 1320, the electronic device according to an embodiment may inactivate the first display 140-1. Inactivating the first display 140-1 may include a state where power less than reference power is inputted to the first display 140-1, a state where the DDIC of the first display 140-1 does not scan frame data (for example, frame data stored in the GRAM), and/or a state where frame data corresponding to the first display 140-1 is removed from the GRAM, or the frame data is not stored within the GRAM any more. In the state 1320, the electronic device according to an embodiment may cease to display the first screen A to the third screen C within the first display 140-1 as in the state 1310. As display of the first screen A to the third screen C is ceased, states of the first application to the third application corresponding to the first screen A to the third screen C may switch to a background state.

In the state 1320, the electronic device according to an embodiment may activate the second display 140-2 distinct from the first display 140-1 in response to a designated input of waking-up the electronic device. The designated input of waking-up the electronic device may include an operation of pressing a designated button of the electronic device, an operation of tapping the second display 140-2, an operation of rotating the electronic device by a designated angle or more, and/or an operation of inputting a designated voice command.

Referring to FIG. 13, in response to the designated input of waking-up the electronic device being received in the state 1320, the electronic device according to an embodiment may display a fourth screen D within the second display 140-2. In an embodiment, the fourth screen D may correspond to any one (for example, the first screen A) of the plurality of execution screens displayed within the first display 140-1 in the state 1310. However, this should not be considered as limiting. For example, the fourth screen D displayed within the second display 140-2 in the state 1320 may be independent from the plurality of execution screens displayed within the first display 140-1 in the state 1310.

In an embodiment, the fourth screen D may be distinct from the first screen A to the third screen C displayed within the first display 140-1 in the state 1310. For example, the fourth screen D may correspond to a home screen and/or a lock screen provided by the operating system of the electronic device. The home screen may include a plurality of icons corresponding to the plurality of applications installed in the electronic device, respectively, or may include one or more widgets provided on the basis of at least one of the plurality of applications. The lock screen may include an execution screen for determining whether the user controlling the electronic device is a user pre-registered at the electronic device before entering into the home screen (for example, a UI including a message requesting biometric information of the user, or including a soft-keyboard for inputting a password and/or a PIN number).

In the state 1320 where the first display 140-1 is occluded by the plurality of housings being folded, the user of the electronic device may control the electronic device by using the second display 140-2. The fourth screen D may be based on an application that is displayed by controlling the electronic device by the user of the electronic device. In the state 1320, the user of the electronic device may perform a designated input of changing the posture and/or shape of the electronic device. The designated input may include a user's operation of rotating the plurality of housings about the folding portion of the electronic device to separate the contact portions of the first display 140-1 from each other. The angle between the plurality of housings may increase to be out of the designated range of FIG. 12 (for example, the range from 0 degree (0) to Φ in the graph 1220) by the designated input.

In response to the designated input being received, the electronic device according to an embodiment may switch from the state 1320 to a state 1330. When switching from the state 1320 to the state 1330, the electronic device according to an embodiment may remove frame data stored in the GRAM, which is operatively connected with all of the first display 140-1 and the second display 140-2, in order to prevent distortion of the frame data caused by the frame data based on the second display 140-2 being immediately displayed on the first display 140-1.

In the state 1330, the electronic device according to an embodiment may inactivate the second display 140-2. Inactivating the second display 140-2 may include a state where power less than reference power is inputted to the second display 140-2, a state where the DDIC of the second display 140-2 does not scan frame data (for example, the frame data stored in the GRAM), and/or a state where the frame data corresponding to the second display 140-2 is removed from the GRAM, or the frame data is not stored in the GRAM any more. In the state 1330, the electronic device according to an embodiment may cease to display the fourth screen D within the second display 140-2 as in the state 1320.

In the state 1330, the electronic device according to an embodiment may activate the first display 140-1. Activating the first display 140-1 may include a state where the reference power is inputted to the first display 140-1, a state where the DDIC of the first display 140-1 scans frame data (for example, the frame data stored in the GRAM), and/or a state where frame data corresponding to the first display 140-1 is stored in the GRAM. Activating the second display 140-2 is similar to activating the first display 140-1, and thus a detailed description thereof is omitted.

In the state 1330, the second screen B and/or the third screen C which have been displayed within the second sub region 320 in the state 1310 may disappear. To maintain continuity between the state 1320 and the state 1330, the electronic device according to an embodiment may display, within the first display 140-1, a fifth screen D' which is based at least on the fourth screen D displayed within the second display 140-2 in the state 1320. The fifth screen D' may be based on an application which is executed to display the fourth screen (for example, a fourth application). The fifth screen D' may be generated on the basis of a size and/or a resolution of the first display 140-1, on the basis of the fourth application corresponding to the fourth screen D. To display the fifth screen D', the electronic device according to an embodiment may remove, from the GRAM of the electronic device, frame data corresponding to the fourth screen D displayed within the second display 140-2.

In the state 1330 where the fifth screen D' related to the fourth screen D of the state 1320 is displayed, the electronic device according to an embodiment may further display an object 1332 for restoring to the state 1310 within the first region of the first display 140-1. Alternatively, the electronic device may further display an object 1334 for restoring to the state 1310 within the second region. The objects 1332, 1334 may be configured to display, within the first display 140-1, at least one screen (for example, the second screen B and/or the third screen C displayed within the second sub region 320) displayed on at least a portion (for example, the second sub region 320) of the first display 140-1 in the state 1310.

In response to an input of selecting at least one of the objects 1332, 1334 being received in the state 1330, the electronic device according to an embodiment may switch from the state 1330 to a state 1340. The state 1340 may correspond to a state where at least one screen displayed on at least a portion of the first display 140-1 in the state 1310 is restored. The input of selecting at least one of the objects 1332, 1334 may include, for example, a gesture of dragging the object 1332 by a designated distance or longer in a designated direction (for example, a horizontal direction of the first display 140-1).

Referring to FIG. 13, in the state 1340, the electronic device according to an embodiment may split the first display 140-1 into the first sub region 310 and the second sub region 320. The electronic device may display, within the first sub region 310, a screen D" which is based on the application executed in the state 1330 and/or the fifth screen D' displayed in the state 1330. The electronic device may display, within the second sub region 320, at least one of the second screen B or the third screen C displayed within the second sub region 320 in the state 1310.

In the state 1340, the electronic device according to an embodiment may further display an object 1342 for switching from the split screen to a single screen (for example, the screen D"), similarly to the state 1310. The electronic device according to an embodiment may further display an object 415 for controlling the second screen B or the third screen C displayed within the second sub region 320. As described above, as the posture and/or shape of the electronic device is restored (for example, the shape of the electronic device is restored to make the first display 140-1 be unfolded between the states 1310 to 1330), the electronic device according to various embodiments may display at least one of the objects 1332, 1334 for restoring at least one screen (for example, the second screen B or the third screen C displayed within the second sub region 320 in the state 1310) displayed on the first display 140-1.

When the electronic device enters into the state 1340 from the state 1330 according to the input of selecting at least one of the objects 1332, 1334, the electronic device according to an embodiment may restore the screen displayed within the first display 140-1, on the basis of at least one application which is being executed. For example, when the application corresponding to at least one screen (the second screen B or the third screen C) displayed within the second sub region 320 in the state 1310 is executed again in the state 1320 and/or in the state 1330, the electronic device may not display the screen corresponding to the application within the second sub region 320 although the electronic device enters into the state 1340. In this case, the screen corresponding to the application may be continuously displayed within the second sub region 310.

In an embodiment, the electronic device may output a first audio signal to a fourth audio signal corresponding to the first application to the fourth application, respectively, according to whether the first application to the fourth application are executed. When at least two of the first application to the fourth application are executed, the electronic device according to an embodiment may synthesize at least two audio signals corresponding to the at least two applications being executed. The synthesized audio signals may be outputted through at least one speaker included in the electronic device and/or another electronic device (for example, a Bluetooth speaker) connected with the electronic device wiredly and/or wirelessly.

Referring to FIG. 13, a graph 1350 visualizing changes in volumes of one or more audio signals identified by the electronic device when the electronic device switches between states 1310, 1320, 1330, 1340 is illustrated. Referring to the graph 1350, a line 1352-1 indicating a change in the volume of the first audio signal in each of the states 1310, 1320, 1330, 1340, lines 1352-2, 1352-5 indicating a change in the volume of the second audio signal, lines 1352-3, 1352-6 indicating a change in the volume of the third audio signal, and a line 1352-4 indicating a change in the volume of the fourth audio signal are illustrated. The first audio signals to the fourth audio signal may correspond to the first application to the fourth application, respectively.

Referring to a time period corresponding to the state 1310 in the graph 1350, the electronic device according to an embodiment may output synthesized audio signals in which the first audio signal, the second audio signal, and the third audio signal are combined according to a first volume $V_A$, a second volume $V_B$, and a master volume $V_M$. When the third application providing the third audio signal is executed lastly by the user, and/or a last user input is received, the electronic device may determine a volume of the third audio signal as the master volume $V_M$, and may reduce volumes of the other audio signals except for the third audio signal to be less than the master volume $V_M$. The first volume $V_A$ and the second volume $V_B$ may be identical to each other or different from each other according to an embodiment.

In response to a designated input of changing the posture and/or the shape of the electronic device being received in the state 1310, the electronic device according to an embodiment may switch from the state 1310 to the state 1320. When switching from the state 1310 to the state 1320, the electronic device may switch to an inactivation state. In response to a designated input of waking-up the electronic device thereafter, the electronic device may activate the second display 140-2.

In the state where the second display 140-2 is activated, the electronic device according to an embodiment may identify the fourth audio signal from the fourth application corresponding to the fourth screen D displayed within the second display 140-2. Since a single application such as the fourth application is being executed within the second display 140-2, referring to a time period corresponding to the state 1320 in the graph 1350, the electronic device may output the fourth audio signal on the basis of the master volume $V_M$.

In response to a designated input of changing the posture and/or the shape of the electronic device in the state 1320, the electronic device according to an embodiment may switch from the state 1320 to the state 1330. When switching from the state 1310 to the state 1320, the electronic device may inactivate the second display 140-2 and may activate the first display 140-1. The electronic device may display the fifth screen D' which is based on the fourth application corresponding to the fourth screen D within the activated first display 140-1. Referring to a time period corresponding to the state 1330 in the graph 1350, the electronic device according to an embodiment may maintain outputting the fourth audio signal which has been reproduced in the previous state 1320.

In response to an input of selecting at least one of the objects 1332, 1334 for restoring to the state 1310 being received in the state 1330, the electronic device according to an embodiment may switch from the state 1330 to the state 1340. As the electronic device switches to the state 1340, the electronic device may restore at least one screen displayed on at least a portion of the first display 140-1 in the state 1310. For example, as the second screen B and the third screen C are restored within the second sub region 320, the electronic device may activate the second application and the third application corresponding to the second screen B and the third screen C, respectively. As the second application and the third application are activated, the electronic device may identify the second audio signal and the third audio signal reproduced in the state 1310 again.

In response to the second audio signal and the third audio signal being identified, the electronic device according to an embodiment may reproduce the fourth audio signal of the fourth application continuously performed between the states 1330, 1340, concurrently, with the second audio signal, the third audio signal. For example, the electronic device may reproduce a second synthesized audio signal in which the second audio signal, the third audio signal, and the fourth audio signal are synthesized. The second audio signal, the third audio signal, and the fourth audio signal may be synthesized with the volume of the speaker of the electronic device being maintained at the master volume $V_M$.

Referring to a time period corresponding to the state 1340 in the graph 1350, the electronic device according to an embodiment may synthesize the second audio signal, the third audio signal, and the fourth audio signal, on the basis of the second volume $V_B$ corresponding to the second audio signal, the master volume $V_M$ corresponding to the third audio signal, and a fourth volume (for example, corresponding to the first volume $V_A$ of the first audio signal of the state 710) corresponding to the fourth signal. As described above, the fourth volume corresponding to the fourth audio signal may be identical to the first volume $V_A$ of the first audio signal, and other embodiments are not limited thereto.

Changing the shape of the electronic device may include not only in-folding which changes not to expose at least one display (for example, the first display 140-1 of FIG. 2C and/or FIG. 13) included in the electronic device to the outside, but also out-folding which changes not to expose a surface where the at least one surface is not disposed to the outside. In an embodiment related to the out-folding, the electronic device may display the split screen and may mix the plurality of audio signals similarly to the above-described operations. Hereinafter, an operation performed by the electronic device in an embodiment related to out-folding will be described with reference to FIG. 14.

Figure 14:
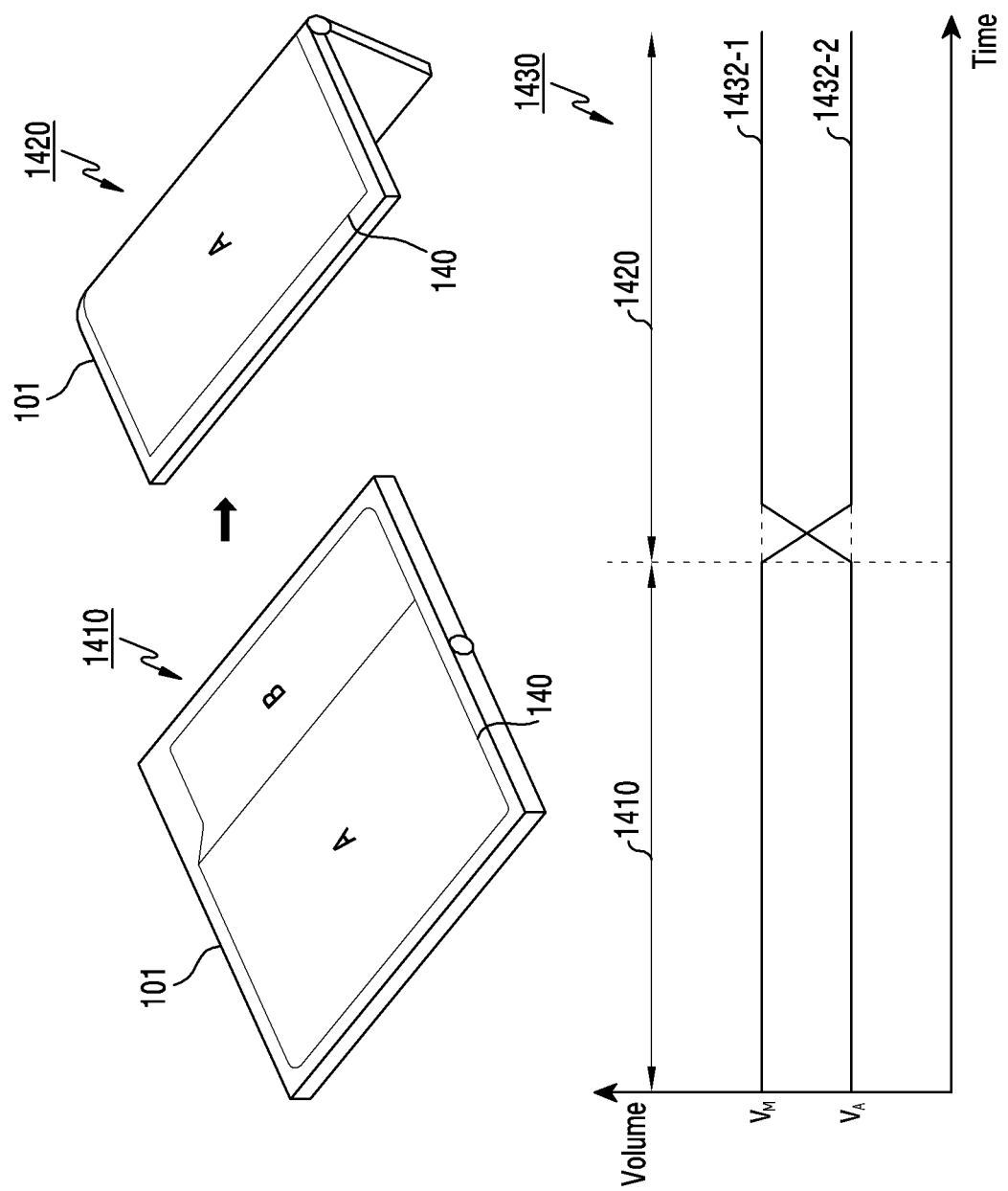
FIG. 14 is a view illustrating another example of switching a state according to a posture of an electronic device and/or a user input in the electronic device according to an embodiment of the disclosure.

FIG. 14 is a view illustrating another example of changing a state according to a posture and/or a user input of an electronic device by the electronic device according to an embodiment of the disclosure.

The electronic device 101 of FIG. 14 may correspond to the electronic device 101 of FIGS. 1A and 1B and/or FIG. 2C. For example, the display 140 of FIG. 14 may correspond to any one of the display 140 of FIG. 1A and/or the first display 140-1 and the second display 140-2 of FIGS. 1B and 2C.

In an embodiment, switching the state of the electronic device 101 may include not only switching a screen displayed within the display 140 (for example, switching between a single screen and a split screen), but also switching an audio signal outputted from a speaker. Switching the audio signal may include entering into a state where audio signals are mixed on the basis of a screen and/or an application displayed within the display 140.

Referring to FIG. 14, in a state 1410, the electronic device 101 according to an embodiment may display a plurality of screens within the display 140 on the basis of a split screen. For example, the electronic device may display a first screen A on the first sub region of the display 140, and may display a second screen B on the second sub region. When a plurality of audio signals are provided from a plurality of applications corresponding to the first screen A and the second screen B in the state 1410, the electronic device 101 may output the audio signals by mixing the plurality of audio signals. The electronic device 101 may mix and output the plurality of audio signals based on the operations of FIGS. 5 and 6, for example. The state 1410 may correspond to the states 400-3, 400-5, 400-7 of FIGS. 3A, 3B, 4A, 4B, and 4C, the states 720, 730 of FIG. 7, the states 820, 830 of FIG. 8 and the state 1120 of FIG. 11, and the states 1310, 1340 of FIG. 13.

In the state 1410 where the split screen is displayed within the display 140, a user of the electronic device 101 may perform a designated input of changing the posture and/or the shape of the electronic device 101. The designated input may include a user's operation of bending or folding at least a portion of the display 140 not to cover or occlude any portion of the display 140 by the housing of the electronic device 101. For example, the designated input may correspond to an input of rotating the plurality of housings (for example, the first housing 210 and the second housing 220 of FIG. 2C) of the electronic device 101 about a rotation axis. In response to the designated input being received, the electronic device according to an embodiment may enter into a state 1420 from the state 1410.

In the state 1420, the electronic device 101 may identify a portion of the display region of the display 140 that is seen for the user. For example, in the state 1410, a portion of the display 140 on which the first screen A is displayed may face the user, and the other portion of the display 140 may be occluded from the user. In response to the portion of the display region seen for the user being identified, the electronic device 101 according to an embodiment may reduce volumes of other audio signals distinct from an audio signal provided from an application corresponding to the identified portion.

Referring to FIG. 14, a graph 1430 visualizing changes in volumes of the plurality of audio signals outputted by the electronic device 101 when the electronic device switches between the states 1410, 1420 is illustrated. Referring to the graph 1430, a line 1432-1 indicating a change in a volume of a first audio signal related to the first screen A in each of the states 1410, 1420 and a line 1432-2 indicating a change in a volume of a second audio signal related to the second screen B are illustrated. The first audio signal and the second audio signal may be provided from a first application and a second application corresponding to the first screen A and the second screen B.

Referring to a time period corresponding to the state 1410 in the graph 1430, the electronic device 101 may output the first audio signal at a first volume $V_A$ lower than a master volume $V_M$ while outputting the second audio signal at the master volume $V_M$. For example, when the second screen B corresponds to a main window, the electronic device 101 may output the second audio signal at the master volume $V_M$. In this case, the user of the electronic device may hear the second audio signal corresponding to the second screen B, which is the main window, at a volume higher than that of the first audio signal.

As the electronic device 101 enters into the state 1420 from the state 1410, the second screen B may be occluded from the user and only the first screen A may be disposed to face the user. In this case, the electronic device 101 may determine the first screen A seen for the user as the main window. Referring to a time period corresponding to the state 1420 in the graph 1430, as the first screen A is determined as the main window, the electronic device 101 may increase the volume of the first audio signal related to the first screen A to the master volume $V_M$. The electronic device 101 may reduce the volume of the second audio signal related to the second screen B, which is distinct from the main window, to a volume lower than the master volume $V_M$, for example, the first volume $V_A$.

The electronic device 101 may adjust the volumes of the plurality of audio signals as described above, in response to an execution state of at least one of the plurality of applications being changed in the split screen state, the shape of the electronic device 101 being changed, or a user input being received in a designated window for adjusting the volume. Alternatively, the electronic device 101 may adjust the volumes of the plurality of audio signals on the basis of sizes of a plurality of screens displayed within the display concurrently and corresponding to the plurality of audio signals, respectively.

Figure 15:
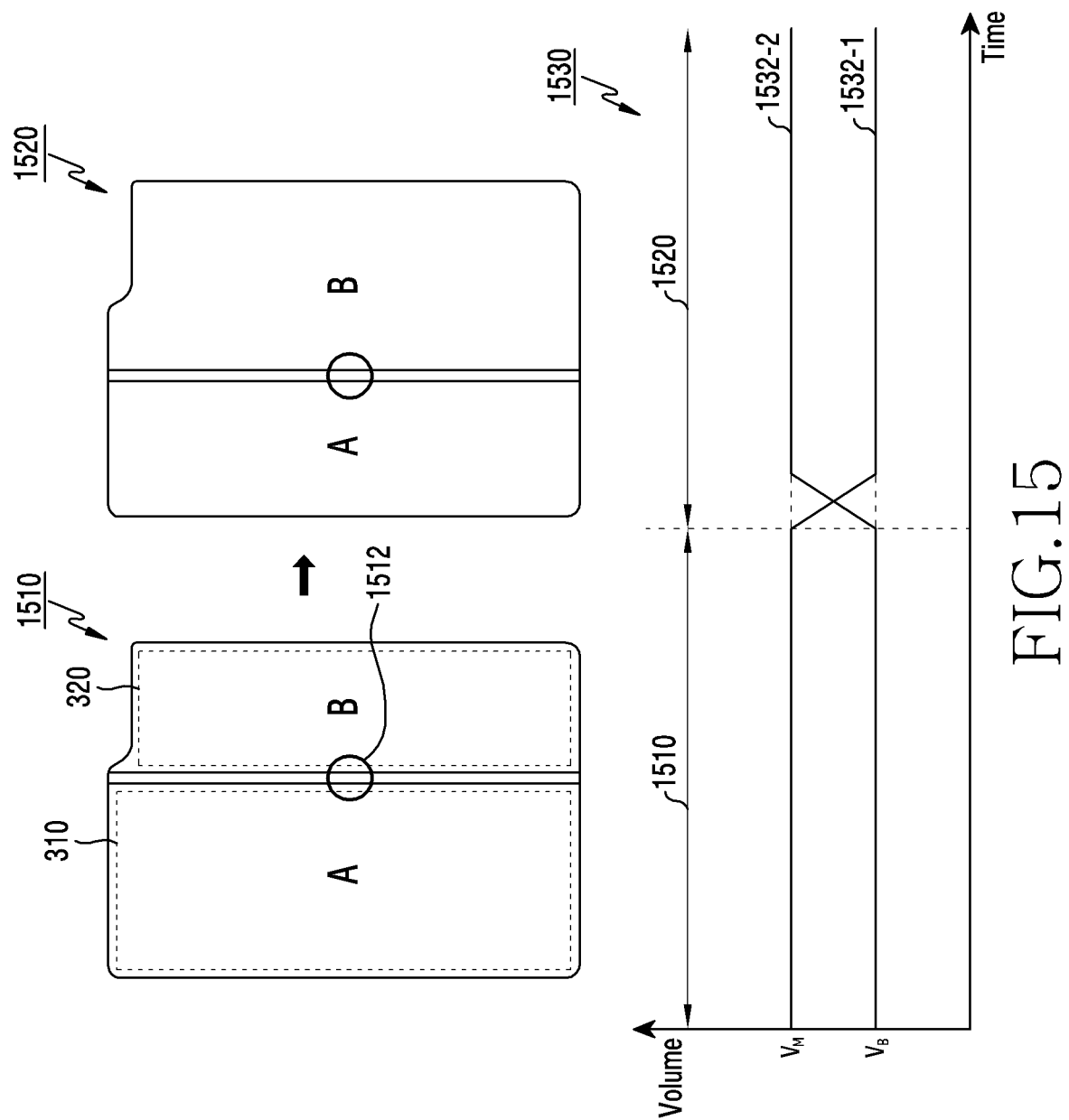
FIG. 15 is a view to illustrate an operation of an electronic device adjusting volumes of a plurality of audio signals, on the basis of sizes of a plurality of screens displayed within a display according to an embodiment of the disclosure.

FIG. 15 is a view to illustrate an operation of an electronic device adjusting volumes of a plurality of audio signals on the basis of sizes of a plurality of screens displayed within a display according to an embodiment of the disclosure.

The electronic device of FIG. 15 may correspond to the electronic device of FIGS. 1A and 1B and/or FIGS. 2A, 2B, and 2C. The electronic device of FIG. 15 may display a plurality of execution screens identified from a plurality of applications within the display, on the basis of the split screen of FIGS. 3A and 3B.

Referring to FIG. 15, in a state 1510, the electronic device according to an embodiment may display a first screen A provided from a first application and a second screen B provided from a second application on the first sub region 310 and the second sub region 320 of the display, respectively. The electronic device may display a visual element (for example, a designated axis of a linear form and/or a frame) between the first sub region 310 and the second sub region 320 to adjust sizes of the first sub region 310 and the second sub region 320.

When a user drags a portion 1512 of the visual element, the electronic device may adjust the sizes of the first sub region 310 and the second sub region 320 on the basis of a position of the dragged portion 1512. For example, in response to the user input of dragging the portion 1512 of the visual element, the electronic device may switch from the state 1510 to a state 1520. In the state 1520, the size and/or area of the second sub region 320 may exceed the size and/or area of the first sub region 310 according to the user input. However, this should not be considered as limiting.

Referring to FIG. 15, a graph 1530 visualizing changes in volumes of the plurality of audio signals outputted by the electronic device when the electronic device switches between the states 1510, 1520 is illustrated. Referring to the graph 1530, a line 1532-1 indicating a change in a volume of a first audio signal related to the first screen A in each of the states 1510, 1520 and a line 1532-1 indicating a change in a volume of a second audio signal related to the second screen B are illustrated. When the plurality of audio signals are provided from the first application and the second application in the state 1510, the electronic device according to an embodiment may output the audio signals by mixing the plurality of audio signals.

For example, referring to a time period corresponding to the state 1510 in the graph 1530, when the first screen A is determined as a main window, the electronic device may determine a volume of a first audio signal related to the first screen A to be a master volume $V_M$, and may determine a volume of a second audio signal distinct from the first audio signal to be a volume $V_B$ lower than the master volume $V_M$. As the electronic device outputs the first audio signal and the second audio signal by mixing the first audio signal and the second audio signal on the basis of the master volume $V_M$ and the volume $V_B$ lower than the master volume $V_M$, the user may hear a synthesized audio signal in which the first audio signal is highlighted.

In response to a user input of dragging the portion 1512 of the visual element, the electronic device may enter into the state 1520, and accordingly, the volumes of the plurality of audio signals may be adjusted on the basis of the sizes of the first sub region 310 and the second sub region 320 which are changed according to the user input. For example, as the size of the second sub region 320 exceeds the first sub region 310, the second screen B displayed within the second sub region 320 may be changed to the main window. As the second screen B is changed to the main window, the electronic device may increase the volume of the second audio signal to the master volume $V_M$. The electronic device may reduce the volume of the first audio signal related to the first screen A which is not the main window to a volume (for example, the volume $V_B$) lower than the master volume $V_M$.

Figure 16:
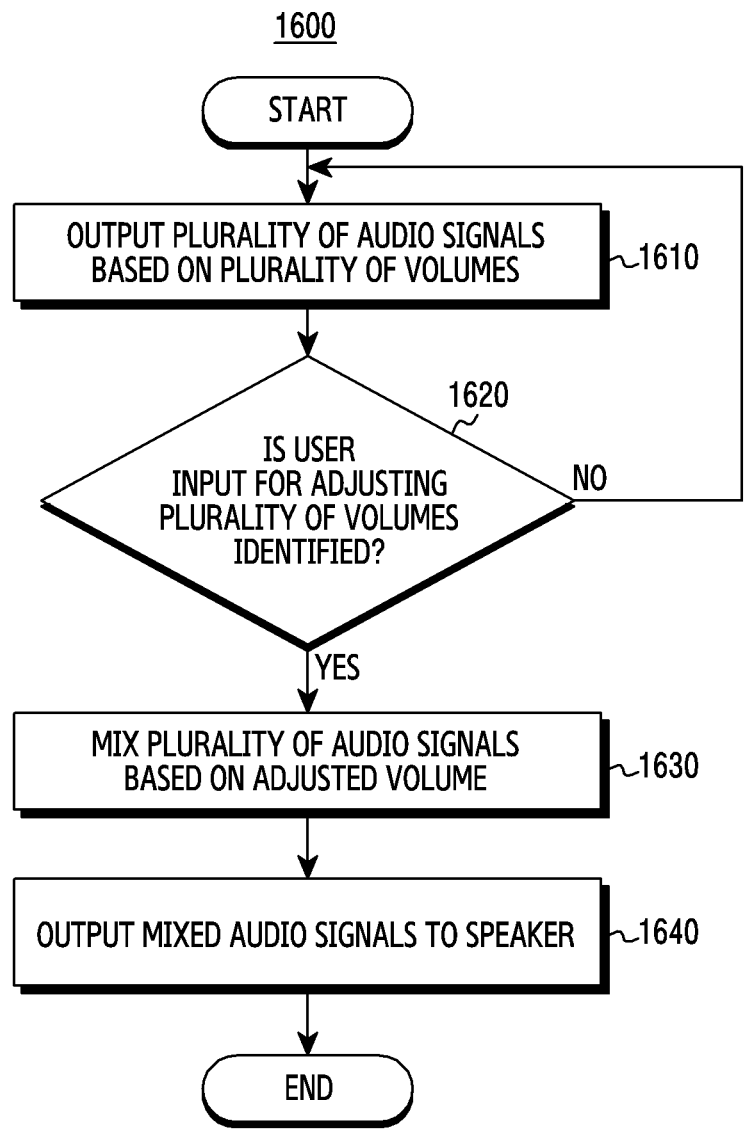
FIG. 16 is a flowchart to illustrate an operation of an electronic device according to an embodiment of the disclosure.

FIG. 16 is a flowchart to illustrate an operation of an electronic device according to an embodiment of the disclosure.

The electronic device of FIG. 16 may correspond to the electronic device 101 of FIGS. 1A and 1B and FIGS. 2A, 2B, and 2C. At least one of the operations of FIG. 16 may be performed by the electronic device 101 of FIGS. 1A and 1B and/or the processor 120. At least one of the operations of FIG. 16 may be based on the operations of FIGS. 5 and 6, or may be performed similarly.

Referring to FIG. 16, in a method 1600, in operation 1610, the electronic device according to various embodiments may output a plurality of audio signals on the basis of a plurality of volumes. Operation 1610 may be performed based on operation 540 of FIG. 5 and/or the operations of FIG. 6. For example, in the state where the split screen of FIGS. 3A and 3B is displayed, the electronic device according to an embodiment may output the plurality of audio signals by mixing the audio signals based on operation 1610. The volumes of the plurality of audio signals may be different from one another. For example, a volume of an audio signal provided from an application corresponding to a main window from among the plurality of audio signals may be identical to a master volume $V_M$, and the volumes of the other audio signals may be lower than the master volume $V_M$.

In the state where the plurality of audio signals are outputted based on operation 1610, the electronic device may identify a user input for adjusting the plurality of volumes in operation 1620. In an embodiment, the user input may include, as an input performed on the display of the electronic device, a user input (for example, the input 406 of FIG. 4B) for executing a new application within the split screen.

In an embodiment, the user input may include a user input for outputting an audio signal (for example, a user input of touching the thumbnail 714 of FIG. 7 and/or the button 812 of FIG. 8). In an embodiment, the user input may include a user input (for example, a user input of dragging the indicator 1044-3 of FIG. OD) performed within a designated window (for example, the screens 910-2, 910-3, 910-4, 920-2, 920-3, 920-4 of FIGS. 9A and 9B, the windows 1012, 1014, 1016, 1020, 1030, 1040 of FIGS. 10A, 10B, 10C, and 10D) of the display.

In an embodiment, the user input may include a user input for displaying the split screen (for example, a user input of selecting any one of the objects 1112, 1114, 1116 of FIG. 11). In an embodiment, the user input may include, as an input of changing the shape of the electronic device, folding and/or unfolding the electronic device 101 of FIGS. 12, 13, and 14. In an embodiment, the user input may include a user input of changing the sizes of the screens on which the plurality of audio signals are reproduced (for example, a user input of dragging the portion 1512 of FIG. 15).

When the user input is not identified (1620—No), the electronic device according to various embodiments may maintain outputting the plurality of audio signals based on operation 1610. In this case, the volumes corresponding to the plurality of audio signals may be maintained.

When the user input is identified (1620—Yes), the electronic device may mix the plurality of audio signals on the basis of the volumes adjusted by the user input in operation 1630. As described in FIGS. 7, 8, 9A, 9B, 10A, 10B, 10C, 10D, 11, 12, 13, 14, and 15, the plurality of volumes corresponding to the plurality of audio signals, respectively, may be changed by the user input. In response to the plurality of volumes being changed, the electronic device may mix the plurality of audio signals according to the changed volumes.

Referring to FIG. 16, in operation 1640, the electronic device according to various embodiments may output the mixed audio signals to at least one speaker. Operation 1640 may be performed similarly to operation 1610, but the volumes of the plurality of audio signals may be different from the plurality of volumes of operation 1610 (for example, volumes adjusted by the user input in operation 1620).

In the state where the electronic device displays a plurality of screens provided from a plurality of applications within different portions of the display, the electronic device may output a plurality of audio signals provided from the plurality of applications concurrently. In the state where the electronic device according to various embodiments outputs one or more audio signals concurrently, in response to other audio signals distinct from the one or more audio signals being identified, the electronic device may increase and/or reduce the volume of the one or more audio signal and the volumes of the other audio signals. For example, the electronic device may increase a volume of an audio signal related to a main window, or may reduce volumes of other audio signals distinct from the audio signal related to the main window.

An electronic device according to various embodiments may include: a display; at least one speaker; at least one memory configured to store instructions; and at least one processor operatively connected to the display, the at least one speaker, and the at least one memory, and, when executing the instructions, the at least one processor may be configured to: display a plurality of screens based on applications which are distinct from one another, within sub regions which are distinct from one another within a display region of the display; in a state where the plurality of screens are displayed, output a first audio signal provided from a first application from among the applications at a first volume through the at least one speaker; while outputting the first audio signal, identify a user input for outputting a second audio signal related to a second application within a screen provided from the second application from among the plurality of screens; in response to the user input being identified, reduce the first volume of the first audio signal being outputted through the at least one speaker; and output the second audio signal provided from the second application at a second volume which is higher than the reduced first volume through the at least one speaker.

In the electronic device according to an embodiment, when executing the instructions, the at least one processor may be configured to increase the reduced first volume of the first audio signal in response to ceasing to output the second audio signal being identified.

In the electronic device according to an embodiment, when executing the instructions, the at least one processor may be configured to: while outputting the first audio signal at the reduced first volume and outputting the second audio signal at the second volume, identify a second user input for outputting a third audio signal related to a third application within a screen provided from the third application from among the plurality of screens; in response to the second user input being identified, reduce the second volume of the second audio signal being outputted through the at least one speaker; and output the third audio signal provided from the third application at a third volume which is higher than the reduced second volume through the at least one speaker.

In the electronic device according to an embodiment, when executing the instructions, the at least one processor may be configured to: in response to the user input being identified, determine whether to reduce the first volume of the first audio signal, on the basis of information related to a type of the first application and a type of the second application; and, when it is determined that the first volume of the first audio signal is not reduced, output the second audio signal provided from the second application at a third volume which is lower than the first volume, while outputting the first audio signal at the first volume.

In the electronic device according to an embodiment, when executing the instructions, the at least one processor may be configured to: in response to the user input being identified, identify a size of a first screen related to the first application from among the plurality of screens, and a size of a second screen related to the second application; and, in response to the size of the second screen larger than the size of the first screen being identified, reduce the first volume of the first audio signal.

In the electronic device according to an embodiment, when executing the instructions, the at least one processor may be configured to: while outputting the first audio signal at the reduced first volume and outputting the second audio signal at the second volume, identify a second user input of adjusting at least one of a size of a first screen related to the first application from among the plurality of screens, or a size of a second screen related to the second application; and, in response to the second user input being identified, adjust at least one of the reduced first volume of the first audio signal or the second volume of the second audio signal, on the basis of at least one of the adjusted size of the first screen or the adjusted size of the second screen.

In the electronic device according to an embodiment, when executing the instructions, the at least one processor may be configured to, in response to the user input being identified, gradually reduce the first volume of the first audio signal within a designated time period after the user input.

In the electronic device according to an embodiment, when executing the instructions, the at least one processor may be configured to: determine the first volume of the first audio signal as a third volume used to adjust a magnitude of a sound wave being outputted from the at least one speaker; and, in response to the user input being identified, reduce the first volume of the first audio signal to be lower than the third volume on the basis of a designated ratio.

An electronic device according to various embodiments may include: a display; at least one speaker; at least one memory configured to store instructions; and at least one processor operatively connected to the display, the at least one speaker, and the at least one memory, and, when executing the instructions, the at least one processor may be configured to: identify a plurality of audio signals provided from a plurality of applications which are being executed in the processor, the plurality of applications displaying a plurality of screens within sub regions of the display which are distinct from one another; in response to the plurality of audio signals being identified, identify a first screen corresponding to a main window from among the plurality of screens, and a first audio signal corresponding to the first screen from among the plurality of audio signals; in response to the first audio signal being identified, obtain a first volume corresponding to the first audio signal, and at least one second volume corresponding to at least one second audio signal distinct from the first audio signal from among the plurality of audio signals; combine the plurality of audio signals including the first audio signal and the at least one second audio signal, on the basis of the first volume and the at least one second volume; and output the combined audio signals through the at least one speaker.

In the electronic device according to an embodiment, when executing the instructions, the at least one processor may be configured to obtain the first volume and the at least one second volume such that the first volume has a value greater than the at least one second volume.

In the electronic device according to an embodiment, when executing the instructions, the at least one processor may be configured to identify the first screen which is activated by a user input from among the plurality of screens in order to identify the main window.

In the electronic device according to an embodiment, when executing the instructions, the at least one processor may be configured to identify a size of at least one of the plurality of screens in order to determine the first screen which is the largest screen from among the plurality of screens as the main window.

In the electronic device according to an embodiment, when executing the instructions, the at least one processor may be configured to identify the first screen corresponding to the main window and the first audio signal, on the basis of a type of at least one of the plurality of applications.

In the electronic device according to an embodiment, when executing the instructions, the at least one processor may be configured to, in response to the at least one second volume lower than the first volume being obtained, gradually reduce a volume of the at least one second audio signal from the second volume to the at least one second volume during a designated time period.

In the electronic device according to an embodiment, when executing the instructions, the at least one processor may be configured to determine the first volume of the first audio signal as a third volume used to adjust a magnitude of a sound wave being outputted from the at least one speaker.

A method of an electronic device according to various embodiments may include: displaying a plurality of screens based on applications which are distinct from one another, within sub regions which are distinct from one another within a display region of a display of the electronic device; in a state where the plurality of screens are displayed, outputting a first audio signal provided from a first application from among the applications at a first volume through at least one speaker of the electronic device; while outputting the first audio signal, identifying a user input for outputting a second audio signal related to a second application within a screen provided from the second application from among the plurality of screens; in response to the user input being identified, reducing the first volume of the first audio signal being outputted through the at least one speaker; and outputting the second audio signal provided from the second application at a second volume which is higher than the reduced first volume through the at least one speaker.

The method of the electronic device according an embodiment may further include, while outputting the first audio signal at the reduced first volume and outputting the second audio signal at the second volume, increasing the reduced first volume of the first audio signal in response to ceasing to output the second audio signal being identified.

The method of the electronic device according an embodiment may further include: in response to the user input being identified, determining whether to reduce the first volume of the first audio signal, on the basis of information related to a type of the first application and a type of the second application; and, when it is determined that the first volume of the first audio signal is not reduced, outputting the second audio signal provided from the second application at a third volume which is lower than the first volume, while outputting the first audio signal at the first volume.

In the method of the electronic device according an embodiment, reducing the first volume may include: in response to the user input being identified, identifying a size of a first screen related to the first application from among the plurality of screens, and a size of a second screen related to the second application; and, in response to the size of the second screen larger than the size of the first screen being identified, reducing the first volume of the first audio signal.

The method of the electronic device according an embodiment may further include: while outputting the first audio signal at the reduced first volume and outputting the second audio signal at the second volume, identifying a second user input of adjusting at least one of a size of a first screen related to the first application from among the plurality of screens, or a size of a second screen related to the second application; and, in response to the second user input being identified, adjusting at least one of the reduced first volume of the first audio signal or the second volume of the second audio signal, on the basis of at least one of the adjusted size of the first screen or the adjusted size of the second screen.

When outputting a plurality of multimedia contents, concurrently, through a plurality of screens provided from a plurality of applications on different portions of the display, the electronic device may differently adjust volumes of a plurality of audio signals corresponding to the plurality of multimedia contents, respectively, thereby highlighting an audio signal corresponding to one multimedia content in which a user has an interest.

The effects achieved in the disclosure by the electronic device and the method thereof according to various embodiments are not limited to those mentioned above, and other effects that are not mentioned above may be clearly understood to those skilled in the art based on the description provided above.

Methods based on the claims or the embodiments disclosed in the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

The program (the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to a device which performs the embodiments of the disclosure. In addition, an additional storage device on a communication network may access to a device which performs the embodiments of the disclosure.

In the above-described specific embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a display;
   at least one speaker;
   at least one memory configured to store instructions; and
   at least one processor operatively connected to the display, the at least one speaker, and the at least one memory,
   wherein, when executing the instructions, the at least one processor is configured to:
      display a plurality of screens based on applications which are distinct from one another, within sub regions which are distinct from one another within a display region of the display,
      in a state where the plurality of screens are displayed, output a first audio signal provided from a first application from among the applications at a first volume through the at least one speaker,
      while outputting the first audio signal, identify a user input for outputting a second audio signal related to a second application within a screen provided from the second application from among the plurality of screens,
      in response to the user input being identified, gradually reduce the first volume of the first audio signal being outputted through the at least one speaker within a designated time period after the user input, and
      output the second audio signal provided from the second application at a second volume which is higher than the reduced first volume through the at least one speaker.

2. The electronic device of claim 1, wherein, when executing the instructions, the at least one processor is further configured to increase the reduced first volume of the first audio signal in response to ceasing to output the second audio signal being identified.

3. The electronic device of claim 1, wherein, when executing the instructions, the at least one processor is further configured to:
   while outputting the first audio signal at the reduced first volume and outputting the second audio signal at the second volume, identify a second user input for outputting a third audio signal related to a third application within a screen provided from the third application from among the plurality of screens,
   in response to the second user input being identified, reduce the second volume of the second audio signal being outputted through the at least one speaker, and
   output the third audio signal provided from the third application at a third volume which is higher than the reduced second volume through the at least one speaker.

4. The electronic device of claim 1, wherein, when executing the instructions, the at least one processor is further configured to:

in response to the user input being identified, determine whether to reduce the first volume of the first audio signal, based on information related to a type of the first application and a type of the second application, and when it is determined that the first volume of the first audio signal is not reduced, output the second audio signal provided from the second application at a third volume which is lower than the first volume, while outputting the first audio signal at the first volume.

5. The electronic device of claim 1, wherein, when executing the instructions, the at least one processor is further configured to:

in response to the user input being identified, identify a size of a first screen related to the first application from among the plurality of screens, and a size of a second screen related to the second application, and in response to the size of the second screen larger than the size of the first screen being identified, reduce the first volume of the first audio signal.

6. The electronic device of claim 1, wherein, when executing the instructions, the at least one processor is further configured to:

while outputting the first audio signal at the reduced first volume and outputting the second audio signal at the second volume, identify a second user input of adjusting at least one of a size of a first screen related to the first application from among the plurality of screens, or a size of a second screen related to the second application, and in response to the second user input being identified, adjust at least one of the reduced first volume of the first audio signal or the second volume of the second audio signal, based on at least one of the adjusted size of the first screen or the adjusted size of the second screen.

7. The electronic device of claim 1, wherein, when executing the instructions, the at least one processor is further configured to:

determine the first volume of the first audio signal as a third volume used to adjust a magnitude of a sound wave being outputted from the at least one speaker, and in response to the user input being identified, reduce the first volume of the first audio signal to be lower than the third volume based on a designated ratio.

8. An electronic device comprising:
a display;
at least one speaker;
at least one memory configured to store instructions; and
at least one processor operatively connected to the display, the at least one speaker, and the at least one memory,
wherein, when executing the instructions, the at least one processor is configured to:
identify a plurality of audio signals provided from a plurality of applications which are being executed in the processor, the plurality of applications displaying a plurality of screens within sub regions of the display which are distinct from one another,
in response to the plurality of audio signals being identified, identify a first screen corresponding to a main window from among the plurality of screens, and a first audio signal corresponding to the first screen from among the plurality of audio signals,
in response to the first audio signal being identified, obtain a first volume corresponding to the first audio signal, and at least one second volume corresponding to at least one second audio signal distinct from the first audio signal from among the plurality of audio signals, in response to the at least one second volume lower than the first volume being obtained, gradually reduce a volume of the at least one second audio signal from a second volume to the at least one second volume during a designated time period, combine the plurality of audio signals comprising the first audio signal and the at least one second audio signal, based on the first volume and the at least one second volume, and output the combined audio signals through the at least one speaker.

9. The electronic device of claim 8, wherein, when executing the instructions, the at least one processor is further configured to obtain the first volume and the at least one second volume such that the first volume has a value greater than the at least one second volume.

10. The electronic device of claim 8, wherein, when executing the instructions, the at least one processor is further configured to identify the first screen which is activated by a user input from among the plurality of screens in order to identify the main window.

11. The electronic device of claim 8, wherein, when executing the instructions, the at least one processor is further configured to identify a size of at least one of the plurality of screens in order to determine the first screen which is the largest screen from among the plurality of screens as the main window.

12. The electronic device of claim 8, wherein, when executing the instructions, the at least one processor is further configured to identify the first screen corresponding to the main window and the first audio signal, based on a type of at least one of the plurality of applications.

13. The electronic device of claim 8, wherein, when executing the instructions, the at least one processor is further configured to determine the first volume of the first audio signal as a third volume used to adjust a magnitude of a sound wave being outputted from the at least one speaker.

14. A method of an electronic device, the method comprising:

displaying a plurality of screens based on applications which are distinct from one another, within sub regions which are distinct from one another within a display region of a display of the electronic device;

in a state where the plurality of screens are displayed, outputting a first audio signal provided from a first application from among the applications at a first volume through at least one speaker of the electronic device;

while outputting the first audio signal, identifying a user input for outputting a second audio signal related to a second application within a screen provided from the second application from among the plurality of screens;

in response to the user input being identified, gradually reducing the first volume of the first audio signal being outputted through the at least one speaker within a designated time period after the user input; and outputting the second audio signal provided from the second application at a second volume which is higher than the reduced first volume through the at least one speaker.

15. The method of claim 14, further comprising, while outputting the first audio signal at the reduced first volume and outputting the second audio signal at the second volume, increasing the reduced first volume of the first audio signal in response to ceasing to output the second audio signal being identified.

16. The method of claim 14, further comprising:

in response to the user input being identified, determining whether to reduce the first volume of the first audio signal, based on information related to a type of the first application and a type of the second application; and when it is determined that the first volume of the first audio signal is not reduced, outputting the second audio signal provided from the second application at a third volume which is lower than the first volume, while outputting the first audio signal at the first volume.

17. The method of claim 14, wherein reducing the first volume comprises:

in response to the user input being identified, identifying a size of a first screen related to the first application from among the plurality of screens, and a size of a second screen related to the second application; and in response to identifying the size of the second screen being larger than the size of the first screen, reducing the first volume of the first audio signal.

18. The method of claim 14, further comprising:

while outputting the first audio signal at the reduced first volume and outputting the second audio signal at the second volume, identifying a second user input of adjusting at least one of a size of a first screen related to the first application from among the plurality of screens, or a size of a second screen related to the second application; and in response to the second user input being identified, adjusting at least one of the reduced first volume of the first audio signal or the second volume of the second audio signal, based on at least one of the adjusted size of the first screen or the adjusted size of the second screen.

\* \* \* \* \*